(12) United States Patent
Brancaccio

(10) Patent No.: US 10,157,515 B2
(45) Date of Patent: *Dec. 18, 2018

(54) BANKING SYSTEMS CONTROLLED BY DATA BEARING RECORDS

(71) Applicant: Bank of America Corporation, Charlotte, NC (US)

(72) Inventor: Joan C. Brancaccio, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,269

(22) Filed: Jun. 19, 2017

(65) Prior Publication Data

US 2017/0301190 A1 Oct. 19, 2017

Related U.S. Application Data

(63) Continuation of application No. 15/099,928, filed on Apr. 15, 2016, now Pat. No. 9,715,793.

(51) Int. Cl.
*G06Q 20/00* (2012.01)
*G07F 19/00* (2006.01)
(Continued)

(52) U.S. Cl.
CPC ..... *G07D 11/0021* (2013.01); *G06Q 20/1085* (2013.01); *G07F 19/202* (2013.01); *G07F 19/203* (2013.01)

(58) Field of Classification Search
CPC ............... G06F 19/00; G07D 11/0021; G06Q 20/1085; G07F 19/202; G07F 19/203
(Continued)

(56) References Cited

U.S. PATENT DOCUMENTS 5,633,870 A 5/1997 Gaytan et al.
5,813,510 A 9/1998 Rademacher
(Continued)

OTHER PUBLICATIONS

Dec. 15, 2016 U.S. Non-Final Office Action—U.S. Appl. No. 15/099,928.
(Continued)

*Primary Examiner* — Daniel A Hess
(74) *Attorney, Agent, or Firm* — Banner & Witcoff, Ltd.; Michael A. Springs

(57) ABSTRACT

A cash handling device may receive a request to perform a deposit transaction at a deployment location of the device. The device may receive at least one deposit item. The device may validate the at least one deposit item and generate a deposit transaction record, which may include information directing a server to apply a provisional credit to at least one treasury account. The device may send the deposit transaction record to the server. The device may receive a request to perform a change order transaction and may receive at least one change order item. The device may validate the at least one change order item and may dispense one or more currency items to complete the change order transaction. The device may generate and send, to the server, a change order transaction record, which may include information directing the server to update one or more transaction history records.

18 Claims, 32 Drawing Sheets

(51) Int. Cl.
*G07D 11/00* (2006.01)
*G06Q 20/10* (2012.01)
(58) Field of Classification Search
USPC .......................................... 235/379; 705/39
See application file for complete search history.

(56) References Cited

U.S. PATENT DOCUMENTS

| | | | |
|---|---|---|---|
| 6,029,887 A | 2/2000 | Furuhashi et al. | |
| 6,308,887 B1 | 10/2001 | Korman et al. | |
| 6,676,018 B1 | 1/2004 | Trelawney et al. | |
| 6,754,217 B1 | 6/2004 | Ahn | |
| 6,761,308 B1 | 7/2004 | Hanna et al. | |
| 8,078,534 B1 | 12/2011 | Nichols et al. | |
| 8,157,078 B1 | 4/2012 | Folk et al. | |
| 8,275,650 B1 | 9/2012 | Corbett et al. | |
| 8,407,119 B2 | 3/2013 | Folk et al. | |
| 8,428,332 B1 | 4/2013 | Csulits et al. | |
| 8,602,295 B1 | 12/2013 | Sanders et al. | |
| 8,640,945 B1 | 2/2014 | McCormick | |
| 8,768,836 B1 | 7/2014 | Acharya | |
| 8,840,016 B1 | 9/2014 | Schott et al. | |
| 9,047,728 B1 | 6/2015 | Irudayam et al. | |
| 9,715,793 B1 * | 7/2017 | Brancaccio | G07F 19/00 |
| 2001/0001148 A1 | 5/2001 | Martin et al. | |
| 2001/0014881 A1 | 8/2001 | Drummond et al. | |
| 2002/0062285 A1 | 5/2002 | Amann et al. | |
| 2002/0065775 A1 | 5/2002 | Monaghan | |
| 2002/0082962 A1 | 6/2002 | Farris et al. | |
| 2002/0147684 A1 | 10/2002 | Kirkhope et al. | |
| 2003/0033249 A1 | 2/2003 | Ingram et al. | |
| 2003/0033250 A1 | 2/2003 | Mayes et al. | |
| 2003/0046231 A1 | 3/2003 | Wu | |
| 2003/0085271 A1 | 5/2003 | Laskowski | |
| 2003/0120597 A1 | 6/2003 | Drummond et al. | |
| 2003/0141360 A1 | 7/2003 | De Leo et al. | |
| 2003/0177028 A1 | 9/2003 | Cooper et al. | |
| 2003/0191709 A1 | 10/2003 | Elston et al. | |
| 2003/0217005 A1 | 11/2003 | Drummond et al. | |
| 2004/0024709 A1 | 2/2004 | Yu et al. | |
| 2004/0215566 A1 | 10/2004 | Meurer | |
| 2005/0061872 A1 | 3/2005 | Paschini et al. | |
| 2005/0109832 A1 | 5/2005 | Izawa et al. | |
| 2005/0145696 A1 | 7/2005 | Ichihara | |
| 2006/0073883 A1 | 4/2006 | Franks | |
| 2006/0163342 A1 | 7/2006 | Carpenter et al. | |
| 2008/0120232 A1 | 5/2008 | Herrin et al. | |
| 2008/0121692 A1 | 5/2008 | MacPhail et al. | |
| 2009/0032580 A1 | 2/2009 | Blachowicz et al. | |
| 2009/0159661 A1 | 6/2009 | Sanches | |
| 2009/0212107 A1 | 8/2009 | Crucs et al. | |
| 2010/0036771 A1 | 2/2010 | Daniel et al. | |
| 2010/0082483 A1 | 4/2010 | Sanders et al. | |
| 2010/0127070 A1 | 5/2010 | Sanders et al. | |
| 2010/0138249 A1 | 6/2010 | Rackham | |
| 2010/0161466 A1 | 6/2010 | Gilder | |
| 2010/0174640 A1 | 7/2010 | Cole et al. | |
| 2010/0217994 A1 | 8/2010 | Ginter et al. | |
| 2010/0250497 A1 | 9/2010 | Redlich et al. | |
| 2011/0040682 A1 | 2/2011 | Vasten | |
| 2011/0047054 A1 | 2/2011 | Ginter et al. | |
| 2011/0047077 A1 | 2/2011 | Ginter et al. | |
| 2011/0047078 A1 | 2/2011 | Ginter et al. | |
| 2011/0047389 A1 | 2/2011 | Ginter et al. | |
| 2011/0118004 A1 | 5/2011 | Kelly et al. | |
| 2011/0137795 A1 | 6/2011 | Nambiar et al. | |
| 2011/0251868 A1 | 10/2011 | Mikurak | |
| 2011/0258090 A1 | 10/2011 | Bosch et al. | |
| 2011/0261049 A1 | 10/2011 | Cardno et al. | |
| 2011/0282737 A1 | 11/2011 | Libman | |
| 2011/0288933 A1 | 11/2011 | Libman | |
| 2012/0054095 A1 | 3/2012 | Lesandro et al. | |
| 2012/0078765 A1 | 3/2012 | Gopynadhan | |
| 2012/0084135 A1 | 4/2012 | Nissan et al. | |
| 2012/0089410 A1 | 4/2012 | Mikurak | |
| 2012/0179602 A1 | 7/2012 | Wheelock | |
| 2012/0180071 A1 | 7/2012 | Lesandro et al. | |
| 2012/0190386 A1 | 7/2012 | Anderson | |
| 2012/0253852 A1 | 10/2012 | Pourfallah et al. | |
| 2012/0259722 A1 | 10/2012 | Mikurak | |
| 2012/0296748 A1 | 11/2012 | Libman | |
| 2013/0024364 A1 | 1/2013 | Shrivastava et al. | |
| 2013/0024371 A1 | 1/2013 | Hariramani et al. | |
| 2013/0166332 A1 | 6/2013 | Hammad | |
| 2013/0204785 A1 | 8/2013 | Monk et al. | |
| 2013/0225270 A1 | 8/2013 | Kelly et al. | |
| 2013/0226798 A1 | 8/2013 | Orttung et al. | |
| 2013/0232064 A1 | 9/2013 | Bosch | |
| 2013/0275279 A1 | 10/2013 | Raymond et al. | |
| 2013/0282608 A1 | 10/2013 | Raymond et al. | |
| 2013/0317986 A1 | 11/2013 | Tucker | |
| 2013/0325449 A1 | 12/2013 | Levien et al. | |
| 2014/0019352 A1 | 1/2014 | Shrivastava | |
| 2014/0039882 A1 | 2/2014 | Levien et al. | |
| 2014/0040128 A1 | 2/2014 | Park | |
| 2014/0046842 A1 | 2/2014 | Irudayam et al. | |
| 2014/0046872 A1 | 2/2014 | Arnott et al. | |
| 2014/0087846 A1 | 3/2014 | Bryan et al. | |
| 2014/0141868 A1 | 5/2014 | Kelly et al. | |
| 2014/0149283 A1 | 5/2014 | Roselli et al. | |
| 2014/0222610 A1 | 8/2014 | Mikurak | |
| 2014/0279638 A1 | 9/2014 | Raymond et al. | |
| 2014/0316909 A1 | 10/2014 | Libman | |
| 2014/0330724 A1 | 11/2014 | Davis et al. | |
| 2014/0337175 A1 | 11/2014 | Katzin et al. | |
| 2014/0380408 A1 | 12/2014 | Ginter et al. | |
| 2015/0081493 A1 | 3/2015 | Johnson | |
| 2015/0178697 A1 | 6/2015 | Rossmann et al. | |
| 2015/0242255 A1 | 8/2015 | Lesandro et al. | |
| 2015/0269617 A1 | 9/2015 | Mikurak | |
| 2015/0356366 A1 | 12/2015 | Jones et al. | |
| 2015/0356630 A1 | 12/2015 | Hussain | |
| 2016/0012465 A1 | 1/2016 | Sharp | |
| 2016/0034889 A1 | 2/2016 | Downs et al. | |
| 2017/0162004 A1 | 6/2017 | Hughes | |

OTHER PUBLICATIONS

Jan. 19, 2017 U.S. Non-Final Office Action—U.S. Appl. No. 15/130,063.
Sep. 23, 2016 U.S. Non-Final Office Action—U.S. Appl. No. 15/099,965.
Mar. 29, 2017 U.S. Notice of Allowance—U.S. Appl. No. 15/099,928.
May 19, 2017 U.S. Notice of Allowance—U.S. Appl. No. 15/130,063.
Jul. 12, 2017 U.S. Notice of Allowance—U.S. Appl. No. 15/099,965.
Sep. 13, 2017 U.S. Non-Final Office Action—U.S. Appl. No. 15/686,677.
Sep. 21, 2017 U.S. Non-Final Office Action—U.S. Appl. No. 15/686,478.
Feb. 9, 2018 U.S. Final Office Action—U.S. Appl. No. 15/686,677.
Feb. 12, 2018 U.S. Notice of Allowance—U.S. Appl. No. 15/686,478.
Jul. 30, 2018 U.S. Non-Final Office Action—U.S. Appl. No. 15/969,915.

* cited by examiner

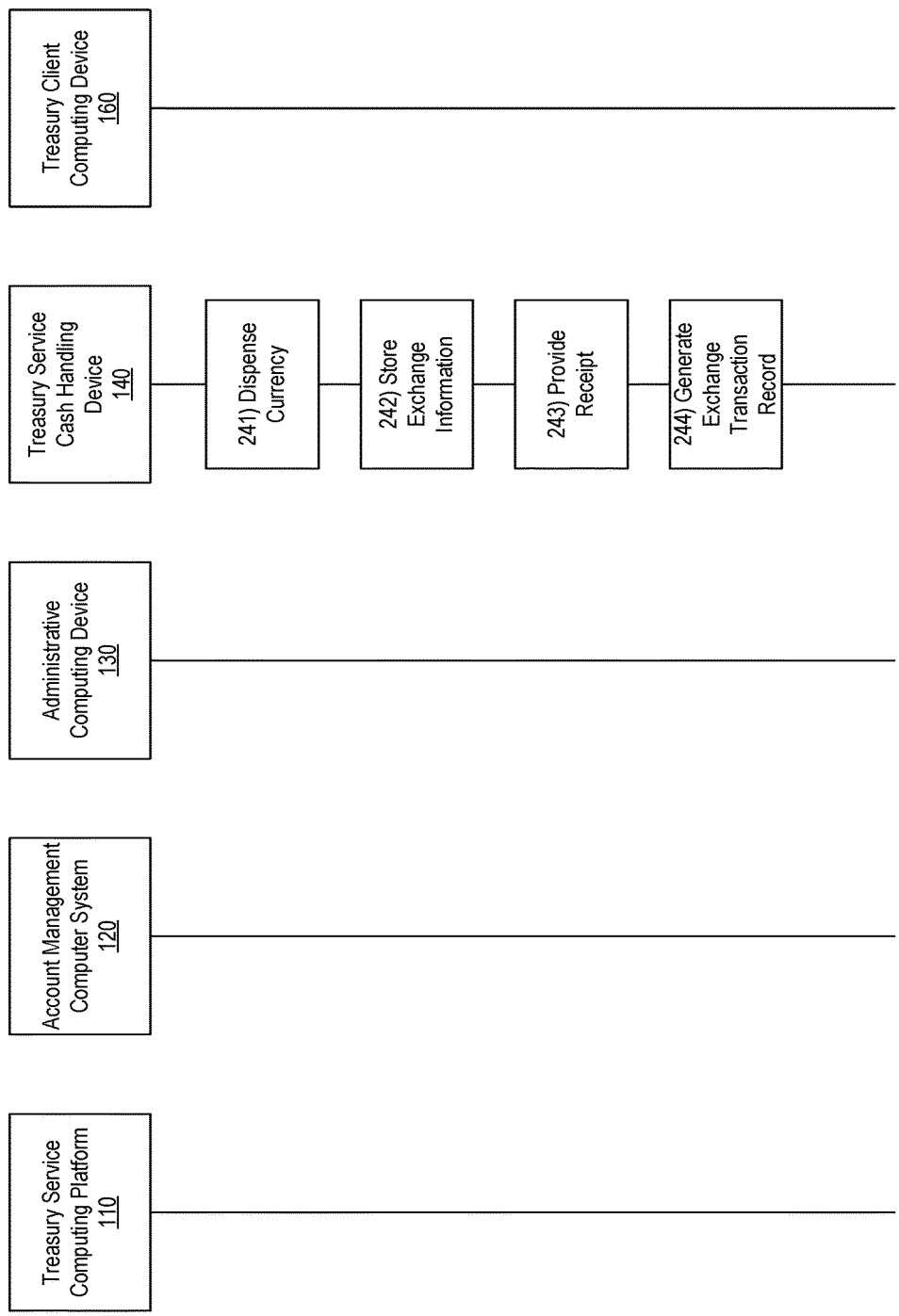

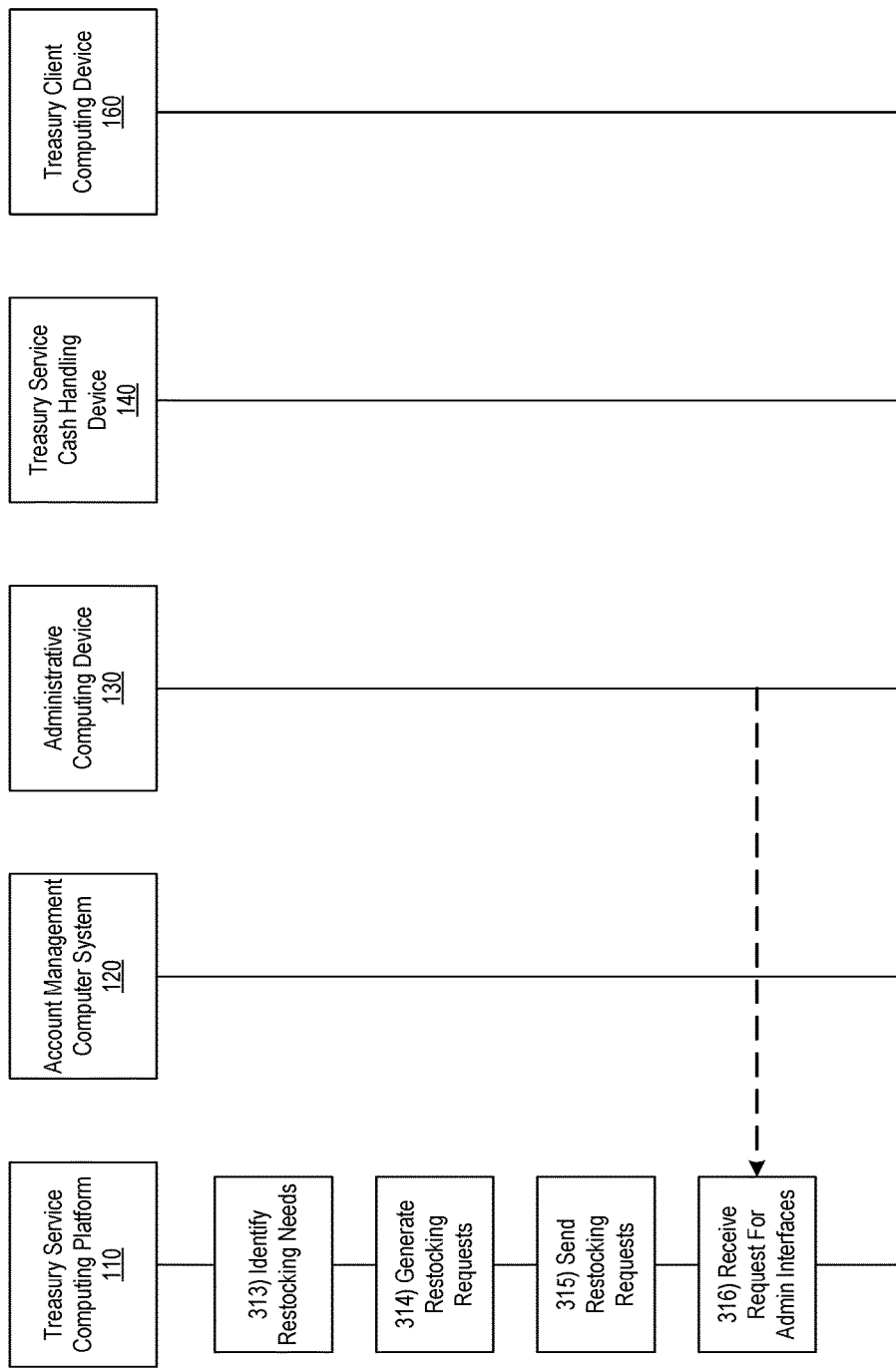

BANKING SYSTEMS CONTROLLED BY DATA BEARING RECORDS

CROSS-REFERENCE TO RELATED APPLICATIONS

This application claims the benefit of and is a continuation of U.S. patent application Ser. No. 15/099,928, filed Apr. 15, 2016, and entitled "Banking Systems Controlled by Data Bearing Records," which is incorporated by reference herein in its entirety.

BACKGROUND

Aspects of the disclosure relate to banking systems controlled by data bearing records. In particular, one or more aspects of the disclosure relate to utilizing cash handling devices to provide treasury functions, including deposit functions and change order functions, and implementing a computing platform to control a plurality of cash handling devices.

Cash handling devices may be used in operating centers and other locations to provide various functions that, in some instances, may otherwise be provided by personnel. Deploying and utilizing these devices may provide many benefits to clients, including increased convenience, security, and efficiency. In many instances, however, it may be difficult to integrate such cash handling devices with the technical infrastructure that supports banking operations and other operations while also optimizing the efficient and effective technical operations of the cash handling devices and various related computer systems.

SUMMARY

Aspects of the disclosure provide effective, efficient, scalable, and convenient technical solutions that address and overcome the technical problems associated with utilizing cash handling devices to provide treasury functions and implementing a computing platform to control a plurality of cash handling devices.

In accordance with one or more embodiments, a cash handling device having at least one processor, a communication interface, an item accepting device, an item dispensing device, and a memory may receive, from a first user of the cash handling device, a request to perform a deposit transaction at a deployment location of the cash handling device. Based on receiving the request to perform the deposit transaction at the deployment location of the cash handling device, the cash handling device may receive, via the item accepting device, at least one deposit item for deposit at the deployment location of the cash handling device. Subsequently, the cash handling device may validate the at least one deposit item received for deposit at the deployment location of the cash handling device. Based on validating the at least one deposit item received for deposit at the deployment location of the cash handling device, the cash handling device may generate a deposit transaction record associated with the request to perform the deposit transaction, and the deposit transaction record may include deposit information directing at least one banking server to apply a provisional credit to at least one treasury account associated with the first user of the cash handling device. Subsequently, the cash handling device may send, via the communication interface, and to the at least one banking server, the deposit transaction record. Thereafter, the cash handling device may receive, from a second user of the cash handling device, a request to perform a change order transaction at the deployment location of the cash handling device. Based on receiving the request to perform the change order transaction at the deployment location of the cash handling device, the cash handling device may receive, via the item accepting device, at least one change order item for exchange at the deployment location of the cash handling device. Subsequently, the cash handling device may validate the at least one change order item received for exchange at the deployment location of the cash handling device. Based on validating the at least one change order item received for exchange at the deployment location of the cash handling device, the cash handling device may dispense, via the item dispensing device, one or more currency items to complete the change order transaction. Subsequently, the cash handling device may generate a change order transaction record associated with the request to perform the change order transaction, and the change order transaction record may include change order information directing the at least one banking server to update one or more transaction history records associated with the second user of the cash handling device. Then, the cash handling device may send, via the communication interface, and to the at least one banking server, the change order transaction record.

In some embodiments, the cash handling device further may include an internal currency scanning system, an internal currency transport system, and one or more currency storage cartridges. In addition, validating the at least one deposit item received for deposit at the deployment location of the cash handling device may include: scanning, by the internal currency scanning system, one or more deposit items received for deposit; sorting, by the internal currency transport system, the one or more deposit items received for deposit; and physically storing, by the internal currency transport system, in the one or more currency storage cartridges, the one or more deposit items received for deposit. In addition, validating the at least one change order item received for exchange at the deployment location of the cash handling device may include: scanning, by the internal currency scanning system, one or more change order items received for exchange; sorting, by the internal currency transport system, the one or more change order items received for exchange; and physically storing, by the internal currency transport system, in the one or more currency storage cartridges, the one or more change order items received for exchange.

In some embodiments, the deployment location of the cash handling device may be a retail banking center operated by a financial institution. In other embodiments, the deployment location of the cash handling device may be a shopping mall in which a plurality of retailers operate retail stores.

In some embodiments, the at least one deposit item received for deposit may include one or more currency notes. In some embodiments, the at least one deposit item received for deposit may include one or more currency coins. In some embodiments, the at least one deposit item received for deposit may include one or more checks.

In some embodiments, the deposit information may directs the at least one banking server to credit the at least one treasury account associated with the first user of the cash handling device with an amount of funds associated with the at least one deposit item received for deposit at the deployment location of the cash handling device and validated by the cash handling device.

In some embodiments, the at least one change order item received for exchange may include one or more currency notes. In some embodiments, the at least one change order item received for exchange may include one or more currency coins.

In some embodiments, the cash handling device may receive, from a third user of the cash handling device, input defining one or more configuration settings for the cash handling device. Subsequently, the cash handling device may store configuration information based on receiving the input defining the one or more configuration settings for the cash handling device from the third user of the cash handling device.

In some embodiments, the cash handling device may receive, via the communication interface, and from the at least one banking server, configuration information defining one or more configuration settings for the cash handling device. Subsequently, the cash handling device may store the configuration information defining the one or more configuration settings for the cash handling device received from the at least one banking server.

In some embodiments, configuration information stored by the cash handling device may define one or more usage limits. In some instances, validating the at least one deposit item received for deposit at the deployment location of the cash handling device may include enforcing the one or more usage limits defined by the configuration information stored by the cash handling device. In addition, validating the at least one change order item received for exchange at the deployment location of the cash handling device may include enforcing the one or more usage limits defined by the configuration information stored by the cash handling device.

In some embodiments, configuration information stored by the cash handling device may define one or more alert thresholds. In some instances, validating the at least one deposit item received for deposit at the deployment location of the cash handling device may include generating at least one deposit alert based on the one or more alert thresholds defined by the configuration information stored by the cash handling device. In addition, validating the at least one change order item received for exchange at the deployment location of the cash handling device may include generating at least one exchange alert based on the one or more alert thresholds defined by the configuration information stored by the cash handling device.

In some embodiments, the cash handling device may receive, via the communication interface, and from the at least one banking server, user profile information defining one or more user settings for the cash handling device. Subsequently, the cash handling device may store the user profile information defining the one or more user settings for the cash handling device received from the at least one banking server.

In some embodiments, prior to receiving the request to perform the deposit transaction at the deployment location of the cash handling device, the cash handling device may authenticate the first user of the cash handling device based on the user profile information defining the one or more user settings for the cash handling device received from the at least one banking server. In addition, prior to receiving the request to perform the change order transaction at the deployment location of the cash handling device, the cash handling device may authenticate the second user of the cash handling device based on the user profile information defining the one or more user settings for the cash handling device received from the at least one banking server.

In some embodiments, based on validating the at least one deposit item received for deposit at the deployment location of the cash handling device, the cash handling device may provide a deposit receipt associated with the request to perform the deposit transaction. In addition, based on validating the at least one change order item received for exchange at the deployment location of the cash handling device, the cash handling device may provide an exchange receipt associated with the request to perform the change order transaction.

In some embodiments, the deposit transaction record may include information identifying one or more denominations of currency received by the cash handling device, one or more quantities of specific denominations of currency received by the cash handling device, a time at which the deposit transaction was completed, a user that performed the deposit transaction, a quantity of deposit items rejected, and one or more destination accounts into which currency was deposited.

In accordance with one or more additional and/or alternative embodiments, a computing platform having at least one processor, a memory, and a communication interface may receive, via the communication interface, and from one or more cash handling devices, aggregated activity information comprising a plurality of transaction records. Subsequently, the computing platform may identify one or more deposit transactions based on the aggregated activity information comprising the plurality of transaction records received from the one or more cash handling devices. Based on identifying the one or more deposit transactions based on the aggregated activity information comprising the plurality of transaction records received from the one or more cash handling devices, the computing platform may generate one or more account credit commands, and the one or more account credit commands may direct at least one account management computer system to apply one or more provisional credits to one or more treasury accounts associated with the one or more deposit transactions. Subsequently, the computing platform may send, via the communication interface, to the at least one account management computer system, the one or more account credit commands directing the at least one account management computer system to apply the one or more provisional credits to the one or more treasury accounts associated with the one or more deposit transactions.

In some embodiments, the plurality of transaction records received from the one or more cash handling devices may include information identifying, for each transaction, a specific user who performed the transaction, an amount of currency involved in the transaction, a time at which the transaction occurred, and a specific cash handling device on which the transaction was performed.

In some embodiments, receiving the aggregated activity information may include: receiving, via the communication interface, and from a first cash handling device of the one or more cash handling devices, first activity information comprising a first plurality of transaction records associated with transactions performed by the first cash handling device; and receiving, via the communication interface, and from a second cash handling device of the one or more cash handling devices, second activity information comprising a second plurality of transaction records associated with transaction performed by the second cash handling device.

In some instances, the first cash handling device may be located at a first deployment location, and the second cash handling device may be located at a second deployment location different from the first deployment location.

In some instances, the first deployment location may be a retail banking center operated by a financial institution, and the second deployment location may be a shopping mall in which a plurality of retailers operate retail stores.

In some embodiments, the computing platform may generate a client alert message based on the aggregated activity information comprising the plurality of transaction records received from the one or more cash handling devices. Subsequently, the computing platform may send, via the communication interface, to a client computing device, the client alert message generated based on the aggregated activity information comprising the plurality of transaction records received from the one or more cash handling devices.

In some embodiments, the computing platform may generate an internal alert message based on the aggregated activity information comprising the plurality of transaction records received from the one or more cash handling devices. Subsequently, the computing platform may send, via the communication interface, to an administrative computing device, the internal alert message generated based on the aggregated activity information comprising the plurality of transaction records received from the one or more cash handling devices.

In some embodiments, the computing platform may evaluate a currency level indicative of an amount of currency stored in a first cash handling device of the one or more cash handling devices. Subsequently, the computing platform may identify a restocking need based on evaluating the currency level indicative of the amount of currency stored in the first cash handling device of the one or more cash handling devices. Based on identifying the restocking need, the computing platform may generate a restocking request, and the restocking request may direct a transport agent to restock the first cash handling device of the one or more cash handling devices. Subsequently, the computing platform may send, via the communication interface, to a transport computer system, the restocking request directing the transport agent to restock the first cash handling device of the one or more cash handling devices.

In some embodiments, the computing platform may receive, via the communication interface, from an administrative computing device, a request for an administrative portal. Based on receiving the request for the administrative portal, the computing platform may provide, via the communication interface, to the administrative computing device, at least one administrative interface. Subsequently, the computing platform may receive, via the communication interface, from the administrative computing device, configuration input defining one or more configuration settings for at least one cash handling device of the one or more cash handling devices. Such configuration input may have been received by the administrative computing device via the at least one administrative interface. Thereafter, the computing platform may send, via the communication interface, and to the at least one cash handling device of the one or more cash handling devices, configuration information directing the at least one cash handling device of the one or more cash handling devices to implement the one or more configuration settings.

In some embodiments, the computing platform may receive, via the communication interface, from a client computing device, a request for a client management portal. Based on receiving the request for the client management portal, the computing platform may provide, via the communication interface, to the client computing device, at least one client management interface. Subsequently, the computing platform may receive, via the communication interface, from the client computing device, configuration input defining one or more configuration settings for at least one cash handling device of the one or more cash handling devices. Such configuration input may have been received by the client computing device via the at least one client management interface. Thereafter, the computing platform may send, via the communication interface, and to the at least one cash handling device of the one or more cash handling devices, configuration information directing the at least one cash handling device of the one or more cash handling devices to implement the one or more configuration settings.

In some embodiments, the computing platform may generate one or more reports based on the aggregated activity information comprising the plurality of transaction records received from the one or more cash handling devices. Subsequently, the computing platform may provide, via the communication interface, to at least one computing device, the one or more reports generated based on the aggregated activity information comprising the plurality of transaction records received from the one or more cash handling devices.

In some embodiments, the computing platform may receive, via the communication interface, from an administrative computing device, reconciliation information associated with at least one deposit transaction completed at the one or more cash handling devices. Based on receiving the reconciliation information associated with the at least one deposit transaction completed at the one or more cash handling devices, the computing platform may generate one or more account update commands, and the one or more account update commands may direct the at least one account management computer system to convert at least one previously-applied provisional credit to non-provisional credit. Subsequently, the computing platform may send, via the communication interface, to the at least one account management computer system, the one or more account update commands directing the at least one account management computer system to convert the at least one previously-applied provisional credit to non-provisional credit.

In accordance with one or more additional and/or alternative embodiments, a cash handling device having at least one processor, a communication interface, an item accepting device, an item dispensing device, an internal currency scanning system, an internal currency transport system, one or more currency storage cartridges, and a memory may receive, from a first user of the cash handling device, a request to perform a deposit transaction at a deployment location of the cash handling device. Based on receiving the request to perform the deposit transaction at the deployment location of the cash handling device, the cash handling device may receive, via the item accepting device, at least one deposit item for deposit at the deployment location of the cash handling device. Subsequently, the cash handling device may validate the at least one deposit item received for deposit at the deployment location of the cash handling device. Based on validating the at least one deposit item received for deposit at the deployment location of the cash handling device, the cash handling device may generate a deposit transaction record associated with the request to perform the deposit transaction, the deposit transaction record comprising deposit information directing at least one banking server to apply a provisional credit to at least one treasury account associated with the first user of the cash handling device. Subsequently, the cash handling device may send, via the communication interface, and to the at least one banking server, the deposit transaction record.

In some embodiments, validating the at least one deposit item received for deposit at the deployment location of the cash handling device may include: scanning, by the internal currency scanning system, one or more deposit items received for deposit; sorting, by the internal currency transport system, the one or more deposit items received for deposit; and physically storing, by the internal currency transport system, in the one or more currency storage cartridges, the one or more deposit items received for deposit.

In some embodiments, the cash handling device may receive, from a second user of the cash handling device, a request to perform a change order transaction at the deployment location of the cash handling device. Based on receiving the request to perform the change order transaction at the deployment location of the cash handling device, the cash handling device may receive, via the item accepting device, at least one change order item for exchange at the deployment location of the cash handling device. Subsequently, the cash handling device may validate the at least one change order item received for exchange at the deployment location of the cash handling device. Based on validating the at least one change order item received for exchange at the deployment location of the cash handling device, the cash handling device may dispense, via the item dispensing device, one or more currency items to complete the change order transaction. Subsequently, the cash handling device may generate a change order transaction record associated with the request to perform the change order transaction, the change order transaction record comprising change order information directing the at least one banking server to update one or more transaction history records associated with the second user of the cash handling device. Thereafter, the cash handling device may send, via the communication interface, and to the at least one banking server, the change order transaction record.

In some embodiments, validating the at least one change order item received for exchange at the deployment location of the cash handling device may include: scanning, by the internal currency scanning system, one or more change order items received for exchange; sorting, by the internal currency transport system, the one or more change order items received for exchange; and physically storing, by the internal currency transport system, in the one or more currency storage cartridges, the one or more change order items received for exchange.

In some instances, the deployment location of the cash handling device may be a retail banking center operated by a financial institution. In some instances, the deployment location of the cash handling device may be a shopping mall in which a plurality of retailers operate retail stores. In some instances, the at least one deposit item received for deposit may include one or more currency notes. In some instances, the at least one deposit item received for deposit may include one or more currency coins. In some instances, the at least one deposit item received for deposit may include one or more checks. In some instances, the at least one change order item received for exchange may include one or more currency notes. In some instances, the at least one change order item received for exchange may include one or more currency coins.

In some embodiments, the deposit information may direct the at least one banking server to credit the at least one treasury account associated with the first user of the cash handling device with an amount of funds associated with the at least one deposit item received for deposit at the deployment location of the cash handling device and validated by the cash handling device.

In some embodiments, the cash handling device may receive, from a third user of the cash handling device, input defining one or more configuration settings for the cash handling device. Subsequently, the cash handling device may store configuration information based on receiving the input defining the one or more configuration settings for the cash handling device from the third user of the cash handling device.

In some embodiments, the cash handling device may receive, via the communication interface, and from the at least one banking server, configuration information defining one or more configuration settings for the cash handling device. Subsequently, the cash handling device may store the configuration information defining the one or more configuration settings for the cash handling device received from the at least one banking server.

In some embodiments, configuration information stored by the cash handling device may define one or more usage limits. In addition, validating the at least one deposit item received for deposit at the deployment location of the cash handling device may include enforcing the one or more usage limits defined by the configuration information stored by the cash handling device. In addition, validating the at least one change order item received for exchange at the deployment location of the cash handling device may include enforcing the one or more usage limits defined by the configuration information stored by the cash handling device.

In some embodiments, configuration information stored by the cash handling device may define one or more alert thresholds. In addition, validating the at least one deposit item received for deposit at the deployment location of the cash handling device may include generating at least one deposit alert based on the one or more alert thresholds defined by the configuration information stored by the cash handling device. In addition, validating the at least one change order item received for exchange at the deployment location of the cash handling device may include generating at least one exchange alert based on the one or more alert thresholds defined by the configuration information stored by the cash handling device.

In some embodiments, the cash handling device may receive, via the communication interface, and from the at least one banking server, user profile information defining one or more user settings for the cash handling device. Subsequently, the cash handling device may store the user profile information defining the one or more user settings for the cash handling device received from the at least one banking server.

In some embodiments, prior to receiving the request to perform the deposit transaction at the deployment location of the cash handling device, the cash handling device may authenticate the first user of the cash handling device based on the user profile information defining the one or more user settings for the cash handling device received from the at least one banking server. In addition, prior to receiving the request to perform the change order transaction at the deployment location of the cash handling device, the cash handling device may authenticate the second user of the cash handling device based on the user profile information defining the one or more user settings for the cash handling device received from the at least one banking server.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2M depict an illustrative event sequence for utilizing cash handling devices to provide treasury functions and implementing a computing platform to control a plurality of cash handling devices in accordance with one or more example embodiments;

FIGS. 3A-3H depict another illustrative event sequence for utilizing cash handling devices to provide treasury functions and implementing a computing platform to control a plurality of cash handling devices in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
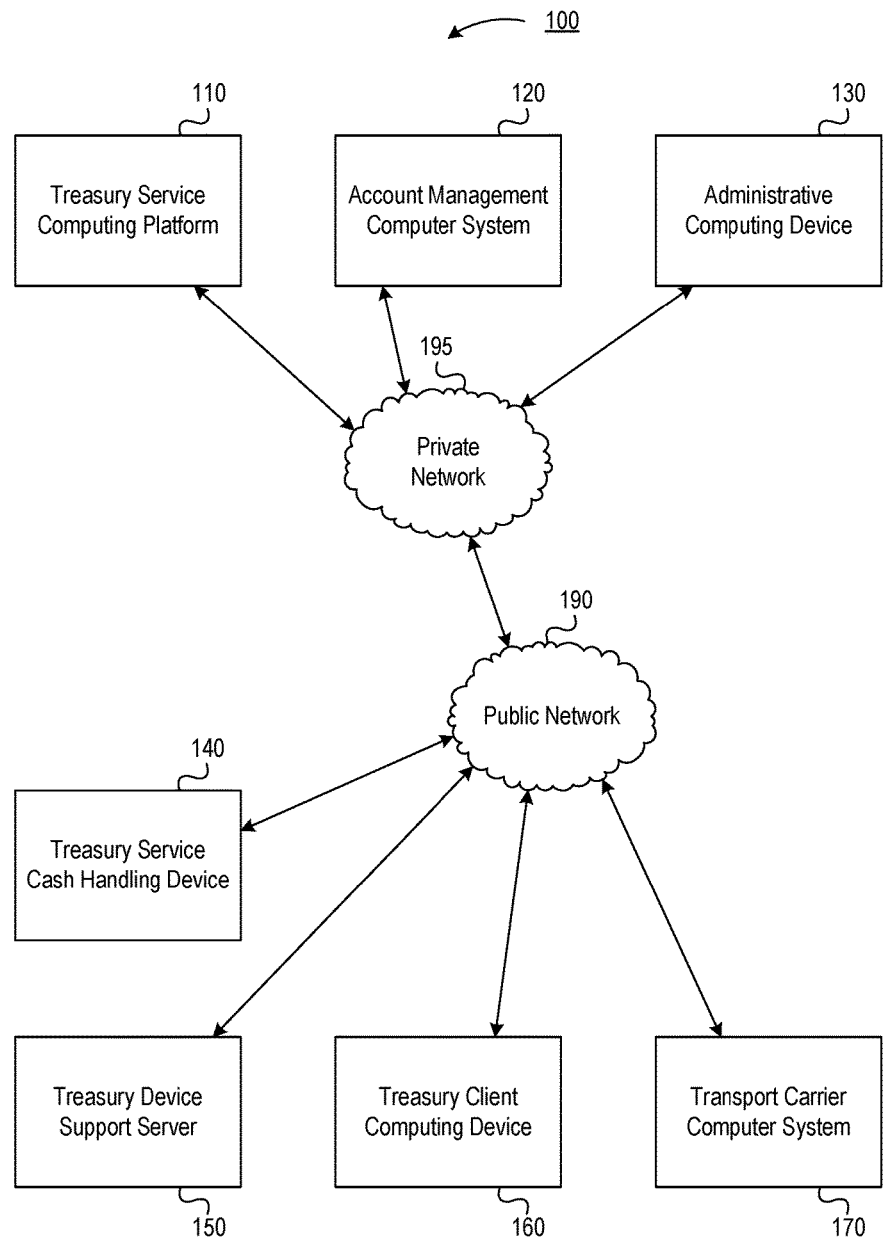
FIGS. 1A, 1B, and 1C depict an illustrative computing environment for utilizing cash handling devices to provide treasury functions and implementing a computing platform to control a plurality of cash handling devices in accordance with one or more example embodiments.
Figure 1B:
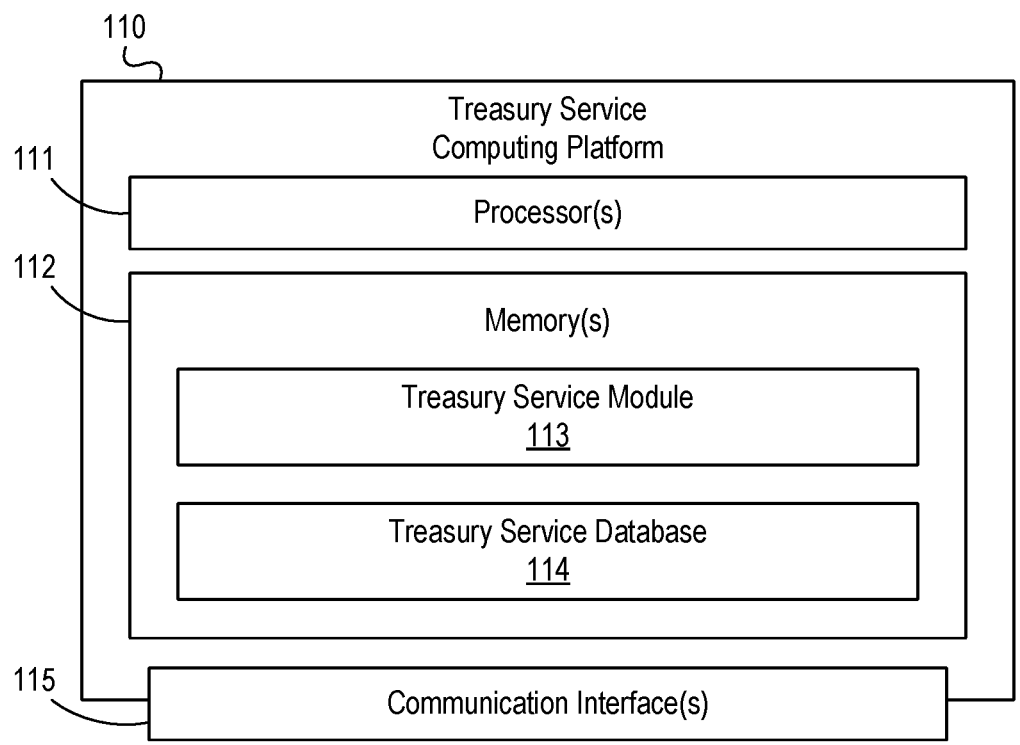
Figure 1C:
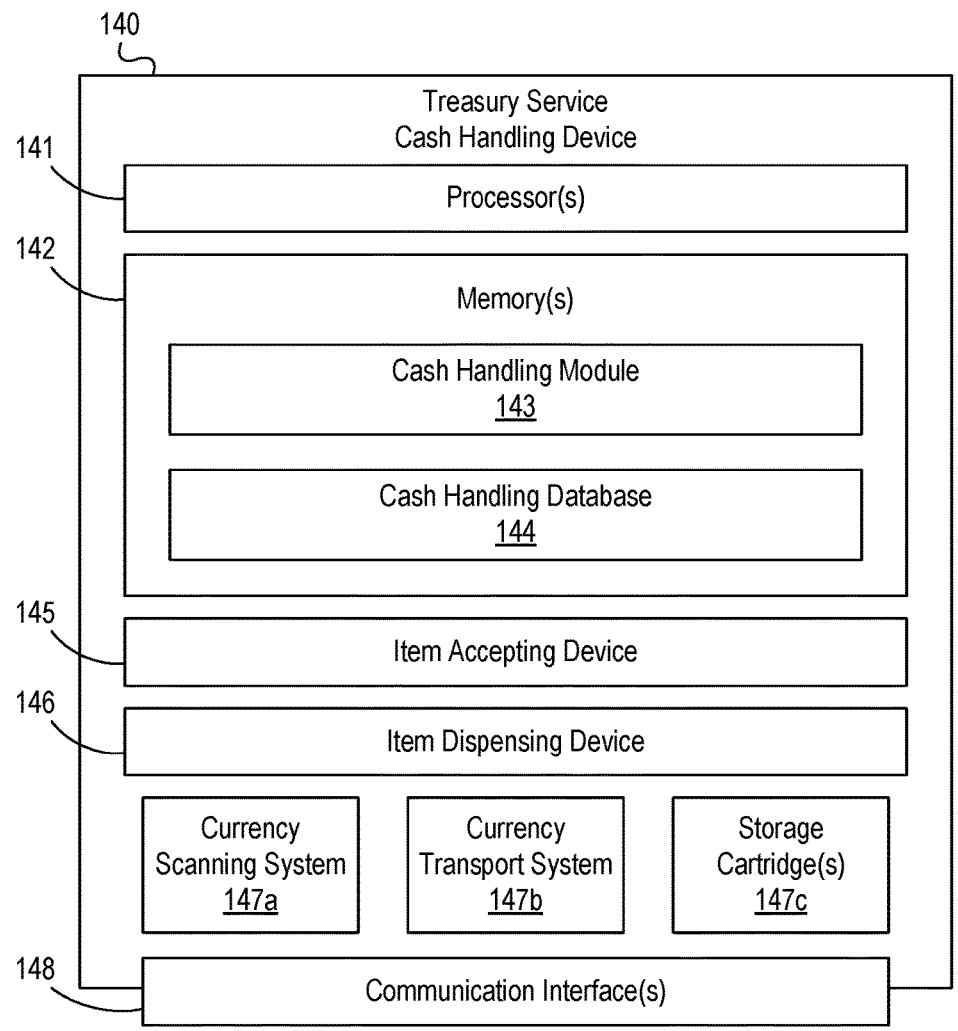

FIGS. 1A, 1B, and 1C depict an illustrative computing environment for utilizing cash handling devices to provide treasury functions and implementing a computing platform to control a plurality of cash handling devices in accordance with one or more example embodiments. Referring to FIG. 1A, computing environment 100 may include one or more computing devices. For example, computing environment 100 may include an account management computer system 120, an administrative computing device 130, a treasury device support server 150, a treasury client computing device 160, and a transport carrier computer system 170.

Account management computer system 120 may be configured to store and/or maintain account information for one or more customers of an organization. For instance, account management computer system 120 may be configured to store and/or maintain account information for one or more customers of a financial institution, including one or more non-commercial customers, one or more treasury clients (which may, e.g., be retailers, restaurants, and/or other small businesses), and/or one or more other clients. Administrative computing device 130 may be configured to provide one or more interfaces that allow for configuration and management of one or more other computing devices and/or computer systems included in computing environment 100.

Treasury device support server 150 may be configured to communicate with and support the operations of one or more cash handling devices that may be included in computing environment 100, for instance, by aggregating activity information received from various cash handling devices and communicating such aggregated activity information to one or more servers and/or computing platforms, as discussed in greater detail below. Treasury client computing device 160 may be configured to be used by a client of an organization, such as a treasury client of a financial institution. Transport carrier computer system 170 may be configured to be used by a transport agent or other transport carrier entity, which may restock one or more cash handling devices, as discussed in greater detail below.

In one or more arrangements, account management computer system 120, administrative computing device 130, treasury device support server 150, treasury client computing device 160, and transport carrier computer system 170 may be any type of computing device capable of receiving a user interface, receiving input via the user interface, and communicating the received input to one or more other computing devices. For example, account management computer system 120, administrative computing device 130, treasury device support server 150, treasury client computing device 160, and transport carrier computer system 170 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of account management computer system 120, administrative computing device 130, treasury device support server 150, treasury client computing device 160, and transport carrier computer system 170 may, in some instances, be special-purpose computing devices configured to perform specific functions.

Computing environment 100 also may include one or more computing platforms. For example, computing environment 100 may include treasury service computing platform 110. As illustrated in greater detail below, treasury service computing platform 110 may include one or more computing devices configured to perform one or more of the functions described herein. For example, treasury service computing platform 110 may include one or more computers (e.g., laptop computers, desktop computers, servers, server blades, or the like).

Computing environment 100 also may include one or more cash handling devices. For example, computing environment 100 may include treasury service cash handling device 140. As illustrated in greater detail below, treasury service cash handling device 140 may include one or more computing devices and/or other components configured to perform one or more of the functions described herein. For example, treasury service cash handling device 140 may include various components configured to enable treasury service cash handling device 140 to accept deposits of currency (which may, e.g., be made by treasury clients and/or other non-consumer clients of a financial institution, such as one or more retailers, small businesses, or the like), process change order transactions in which an amount of currency in a first set of denominations is exchanged for an amount of currency in a second, different set of denominations, and/or perform other functions, as discussed in greater detail below.

Computing environment 100 also may include one or more networks, which may interconnect one or more of treasury service computing platform 110, account management computer system 120, administrative computing device 130, treasury service cash handling device 140, treasury device support server 150, treasury client computing device 160, and transport carrier computer system 170. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, treasury service computing platform 110, account management computer system 120, and administrative computing device 130 may be associated with an organization (e.g., a financial institution), and private network 195 may be associated with and/or operated by the organization, and may include one or more networks (e.g., LANs, WANs, virtual private networks (VPNs), or the like) that interconnect treasury service computing platform 110, account management computer system 120, and administrative computing device 130 and one or more other computing devices and/or computer systems that are used by, operated by, and/or otherwise associated with the organization. Public network 190 may connect private network 195 and/or one or more computing devices connected thereto (e.g., treasury service computing platform 110, account management computer system 120, and administrative computing device 130) with one or more networks and/or computing devices that are not associated with the organization. For example, treasury service cash handling device 140, treasury device support server 150, treasury client computing device 160, and transport carrier computer system 170 might not be associated with an organization that operates private network 195 (e.g., because treasury service cash handling device 140, treasury device support server 150, treasury client computing device 160, and transport carrier computer system 170 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect treasury service cash handling device 140, treasury device support server 150, treasury client computing device 160, and transport carrier computer system 170 to private network 195 and/or one or more computing devices connected thereto (e.g., treasury service computing platform 110, account management computer system 120, and administrative computing device 130).

Referring to FIG. 1B, treasury service computing platform 110 may include one or more processors 111, memory 112, and communication interface 115. A data bus may interconnect processor(s) 111, memory 112, and communication interface 115. Communication interface 115 may be a network interface configured to support communication between treasury service computing platform 110 and one or more networks (e.g., private network 195, public network 190, or the like). Memory 112 may include one or more program modules having instructions that when executed by processor(s) 111 cause treasury service computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of treasury service computing platform 110 and/or by different computing devices that may form and/or otherwise make up treasury service computing platform 110. For example, memory 112 may have, store, and/or include a treasury service module 113 and a treasury service database 114. Treasury service module 113 may have instructions that direct and/or cause treasury service computing platform 110 to manage and/or control a plurality of cash handling devices and/or perform other functions, as discussed in greater detail below. Treasury service database 114 may store information used by treasury service module 113 and/or treasury service computing platform 110 in managing and/or controlling cash handling devices and/or in performing other functions.

Referring to FIG. 1C, treasury service cash handling device 140 may include one or more processors 141, memory 142, item accepting device 145, item dispensing device 146, currency scanning system 147a, currency transport system 147b, storage cartridges 147c, and communication interface 148. Item accepting device 145 may include one or more slots, trays, rollers, scanners, scales, and/or processing units that may be configured to receive, accept, and/or reject one or more currency notes, coins, checks, and/or other items (e.g., from a user of treasury service cash handling device 140). Item dispensing device 146 may include one or more slots, trays, rollers, scanners, scales, and/or processing units that may be configured to output and/or dispense one or more currency notes, coins, and/or other items (e.g., to a user of treasury service cash handling device 140). In some instances, item accepting device 145 and item dispensing device 146 may be incorporated into and/or physically integrated with treasury service cash handling device 140, while in other instances, item accepting device 145 and item dispensing device 146 may be stand-alone devices that are physically separated from each other and controlled by treasury service cash handling device 140. Currency scanning system 147a may include one or more scanners and/or rollers that may be configured to scan one or more currency notes, coins, checks, and/or other items. Currency transport system 147b may include one or more rollers and/or stackers that may be configured to move, organize, and/or store currency (e.g., within treasury service cash handling device 140 and/or in one or more cartridges). Storage cartridges 147c may include one or more currency notes and/or coins and may be used by treasury service cash handling device 140 to store and/or hold currency of various denominations and/or other items received and/or dispensed by treasury service cash handling device 140.

Communication interface 148 may be a network interface configured to support communication between treasury service cash handling device 140 and one or more networks (e.g., private network 195, public network 190, or the like).

Memory 142 may include one or more program modules having instructions that when executed by processor(s) 141 cause treasury service cash handling device 140 to perform one or more functions described herein and/or one or more databases that may store and/or otherwise maintain information which may be used by such program modules and/or processor(s) 141. In some instances, the one or more program modules and/or databases may be stored by and/or maintained in different memory units of treasury service cash handling device 140 and/or by different computing devices that may form and/or otherwise make up treasury service cash handling device 140. For example, memory 142 may have, store, and/or include a cash handling module 143 and a cash handling database 144. Cash handling module 143 may have instructions that direct and/or cause treasury service cash handling device 140 to process one or more transactions, including deposit transactions and/or change order transactions, and/or perform other functions, as discussed in greater detail below. Cash handling database 144 may store information used by cash handling module 143 and/or treasury service cash handling device 140 in processing transactions and/or in performing other functions.

In some arrangements, treasury service cash handling device 140 may be configured to operate as a cash recycling device (which may, e.g., also be referred to as a "cash recycler" and/or a "currency recycler"), such that currency items (e.g., notes, coins, and/or the like) which are deposited at treasury service cash handling device 140 may be later dispensed by treasury service cash handling device 140 without first being transported to a financial institution, banking center, or other location remote from treasury service cash handling device 140 for manual sorting and/or verification. In these arrangements, treasury service cash handling device 140 may thus recycle currency items, for instance, by dispensing currency that was previously deposited at treasury service cash handling device 140. For example, treasury service cash handling device 140 may receive and store one or more currency items in storage cartridges 147c during a first transaction (which may, e.g., be a deposit transaction), and then during a second transaction (which may, e.g., be a withdrawal transaction or a change order transaction), treasury service cash handling device 140 may dispense the same one or more currency items from storage cartridges 147c. In this example, the first transaction and the second transaction may be performed by different users of treasury service cash handling device 140 who may, for instance, be associated with different treasury clients of a financial institution operating treasury service cash handling device 140. In other arrangements, treasury service cash handling device 140 might not be configured to operate as a cash recycling device. In such arrangements, treasury service cash handling device 140 may store currency items received in connection with one or more deposit transactions in a first set of storage cartridges, and treasury service cash handling device 140 may store currency items for dispensing in connection with one or more withdrawal transactions and/or change order transactions in a second set of storage cartridges different from the first set of storage cartridges. For example, in arrangements in which treasury service cash handling device 140 is not configured to operate as a cash recycling device, treasury service cash handling device 140 may keep deposited currency separate from other currency that is stored by treasury service cash handling device 140 for purposes of dispensing.

FIGS. 2A-2M depict an illustrative event sequence for utilizing cash handling devices to provide treasury functions and implementing a computing platform to control a plurality of cash handling devices in accordance with one or more example embodiments. As discussed in greater detail below, the event sequence shown in FIGS. 2A-2M illustrates, among other things, how a cash handling device, such as treasury service cash handling device 140, may be configured, as well as how the cash handling device may authenticate one or more users, process one or more transactions, and provide updates to treasury service computing platform 110, treasury device support server 150, and/or one or more other servers or devices.

Figure 2A:
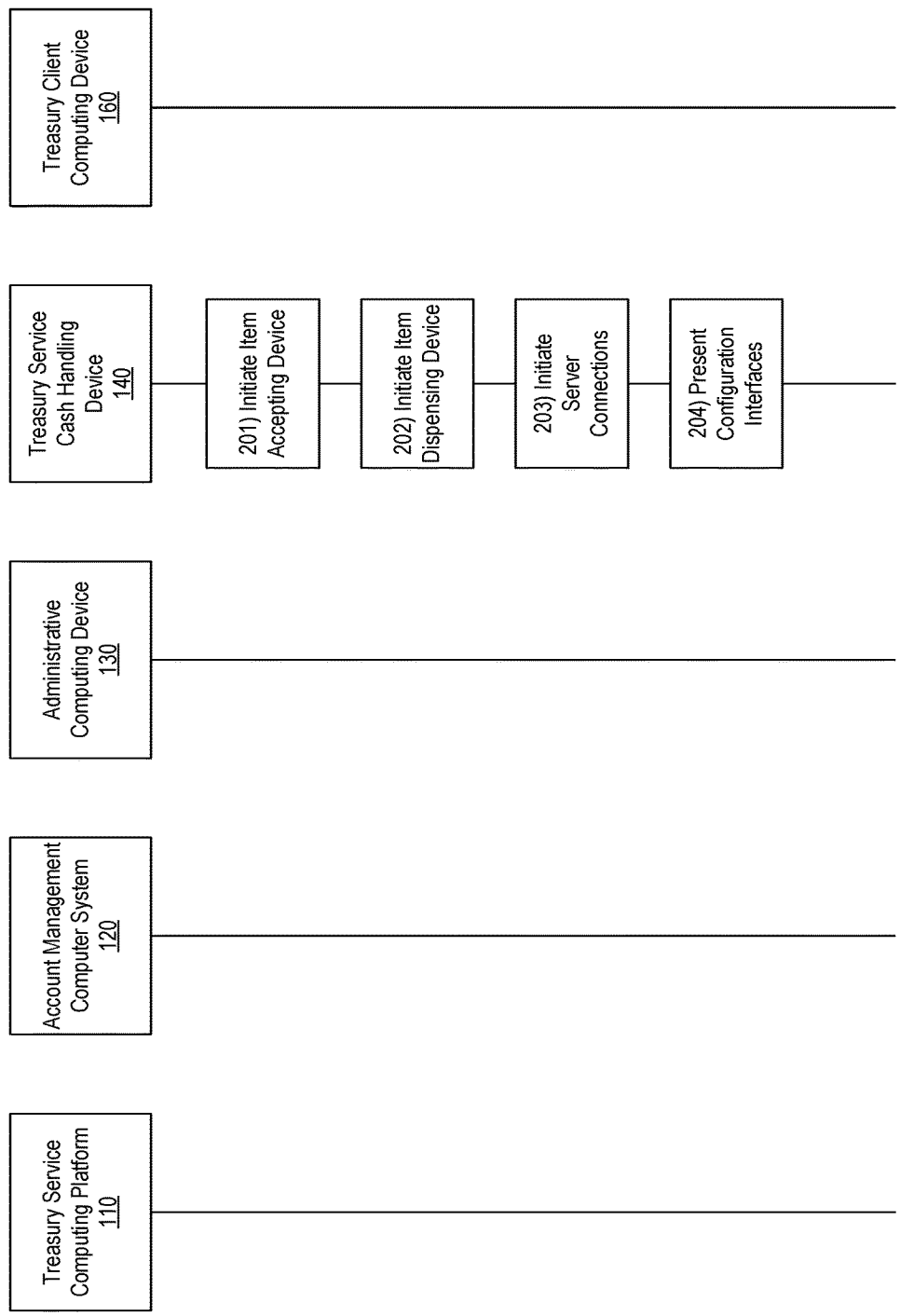
Figure 2B:
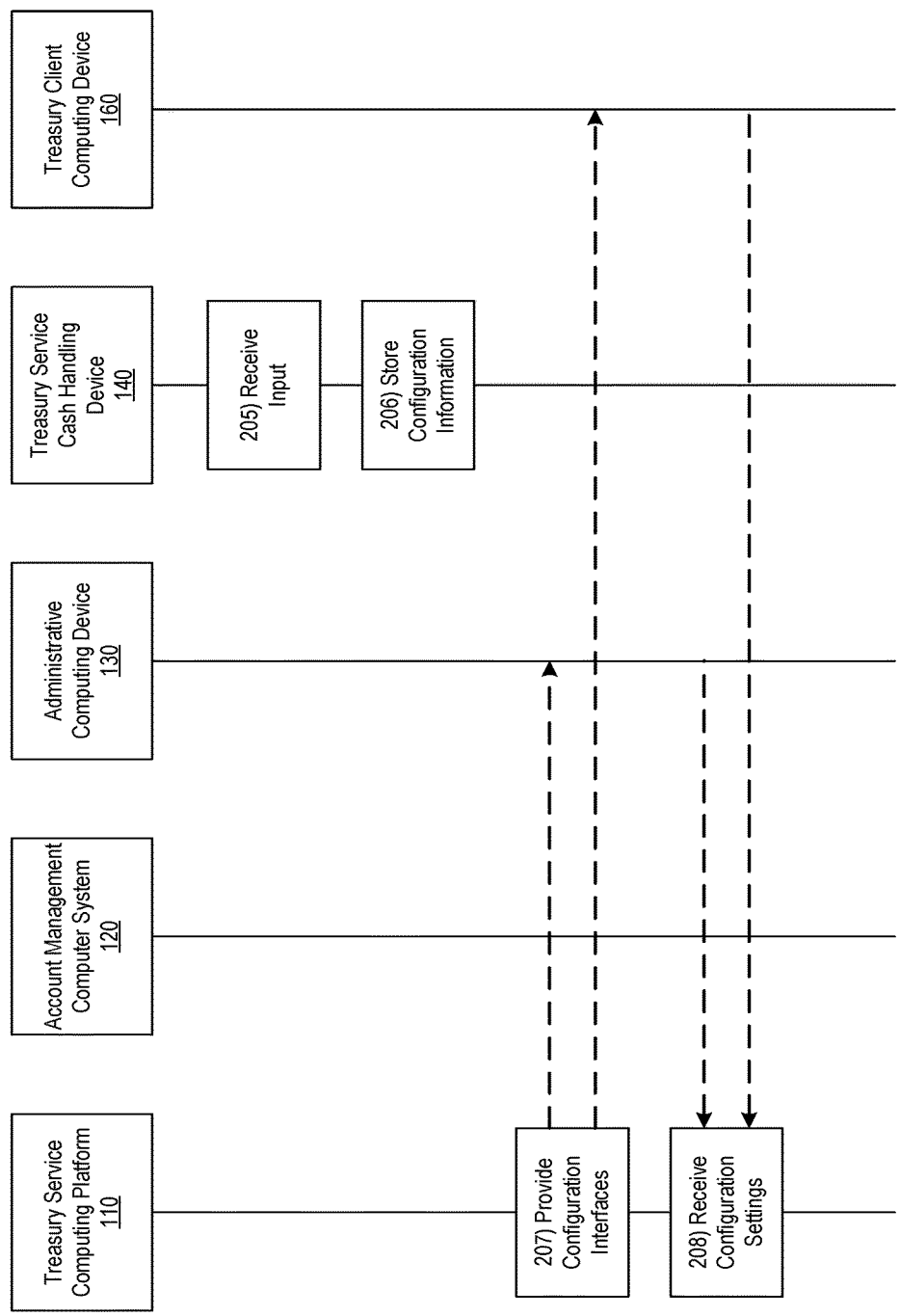

Referring to FIG. 2A, at step 201, treasury service cash handling device 140 may initiate an item accepting device. For example, at step 201, treasury service cash handling device 140 may power on item accepting device 145 and/or one or more components of item accepting device 145, initiate one or more connections to and/or with item accepting device 145 and/or one or more components of item accepting device 145, and begin executing one or more event monitoring threads to monitor item accepting device 145 and/or one or more components of item accepting device 145. At step 202, treasury service cash handling device 140 may initiate an item dispensing device. For example, at step 202, treasury service cash handling device 140 may power on item dispensing device 146 and/or one or more components of item dispensing device 146, initiate one or more connections to and/or with item dispensing device 146 and/or one or more components of item dispensing device 146, and begin executing one or more event monitoring threads to monitor item dispensing device 146 and/or one or more components of item dispensing device 146. At step 203, treasury service cash handling device 140 may initiate one or more server connections. For example, at step 203, treasury service cash handling device 140 may establish connections to and/or with treasury service computing platform 110 and/or treasury device support server 150. Additionally or alternatively, treasury service cash handling device 140 may notify treasury service computing platform 110 and/or treasury device support server 150 that treasury service cash handling device 140 is online and/or that item accepting device 145 and/or item dispensing device 146 have been initiated.

After initiating various devices, components, and/or connections, treasury service cash handling device 140 may receive and/or store configuration information based on input received from a user of treasury service cash handling device 140, as illustrated in greater detail below. Such input and/or configuration information may, for instance, identify the location of treasury service cash handling device 140 (e.g., at a specific banking center, at a specific shopping mall, in a particular geographic region, and/or the like), specify one or more usage limits for treasury service cash handling device 140 (e.g., maximum deposit limits, change order restrictions, compliance limits, bank-imposed limits, client-imposed limits, and/or the like), and/or specify one or more alert thresholds for treasury service cash handling device 140 (e.g., restocking alerts, security alerts, and/or the like).

At step 204, treasury service cash handling device 140 may present one or more configuration interfaces. For example, at step 204, treasury service cash handling device 140 may display and/or otherwise present one or more graphical user interfaces to a user of treasury service cash handling device 140 that may be configured to allow the user of treasury service cash handling device 140 to define various configuration parameters, preferences, and/or other settings controlling operation of and/or otherwise affecting treasury service cash handling device 140. Referring to FIG.

2B, at step 205, treasury service cash handling device 140 may receive input via the one or more configuration interfaces. For example, at step 205, treasury service cash handling device 140 may receive, from a user of the cash handling device (e.g., treasury service cash handling device 140), input defining one or more configuration settings for the cash handling device (e.g., treasury service cash handling device 140). The input defining the one or more configuration settings for the cash handling device (e.g., treasury service cash handling device 140) may, for instance, define one or more usage limits, alert thresholds, and/or other settings for the cash handling device (e.g., treasury service cash handling device 140). At step 206, treasury service cash handling device 140 may store configuration information (e.g., based on the input received via the one or more configuration interfaces). For example, at step 206, treasury service cash handling device 140 may store configuration information based on receiving the input defining the one or more configuration settings for the cash handling device (e.g., treasury service cash handling device 140) from the user of the cash handling device (e.g., treasury service cash handling device 140).

In addition to or instead of receiving configuration information and/or corresponding input from a user of treasury service cash handling device 140, treasury service cash handling device 140 may receive and/or store configuration information from treasury service computing platform 110. Such configuration information may be received directly from treasury service computing platform 110 and/or may be received via treasury device support server 150. Additionally or alternatively, the configuration information received by treasury service cash handling device 140 from treasury service computing platform 110 may be similar to the configuration information and/or corresponding input received from the user of treasury service computing platform 110. For example, the configuration information received from treasury service computing platform 110 may, for instance, identify the location of treasury service cash handling device 140 (e.g., at a specific banking center, at a specific shopping mall, in a particular geographic region, and/or the like), specify one or more usage limits for treasury service cash handling device 140 (e.g., maximum deposit limits, change order restrictions, compliance limits, bank-imposed limits, client-imposed limits, and/or the like), and/or specify one or more alert thresholds for treasury service cash handling device 140 (e.g., restocking alerts, security alerts, and/or the like). In some instances, treasury service cash handling device 140 may be configured to only receive configuration information from treasury service computing platform 110 (e.g., and not from a user of treasury service cash handling device 140), while in other instances, treasury service cash handling device 140 may be configured to only receive configuration information from a user of treasury service cash handling device 140 (e.g., and not from treasury service computing platform 110).

Figure 4:
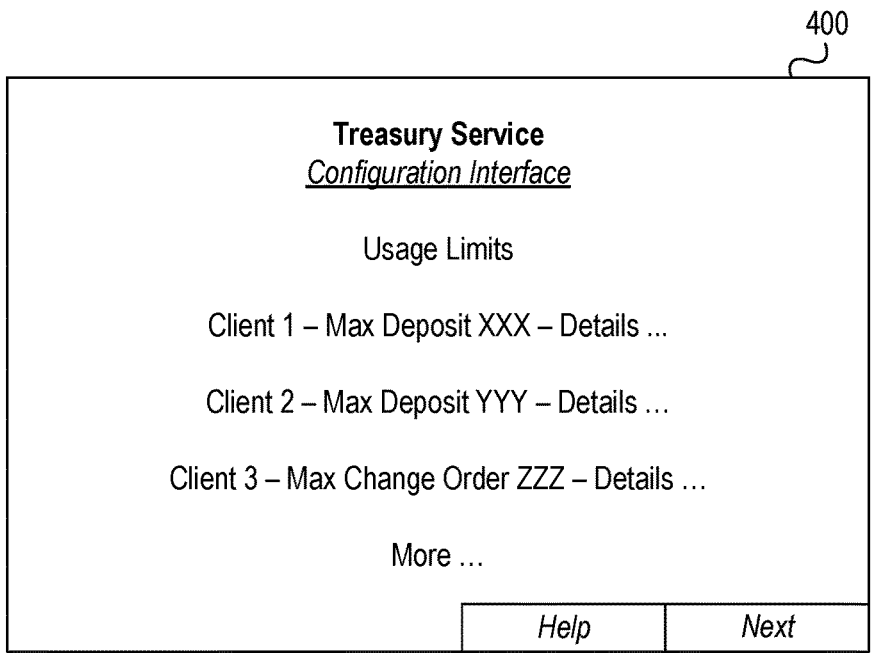
FIGS. 4-13 depict example graphical user interfaces for utilizing cash handling devices to provide treasury functions and implementing a computing platform to control a plurality of cash handling devices in accordance with one or more example embodiments.

At step 207, treasury service computing platform 110 may provide one or more configuration interfaces (e.g., to administrative computing device 130, treasury client computing device 160, and/or one or more other computing devices). For example, at step 207, treasury service computing platform 110 may generate and/or send (e.g., to administrative computing device 130, treasury client computing device 160, and/or one or more other computing devices) one or more graphical user interfaces that may be configured to allow a user (e.g., of administrative computing device 130, treasury client computing device 160, or another computing device) to define various configuration parameters, preferences, and/or other settings controlling operation of and/or otherwise affecting treasury service cash handling device 140. In providing the one or more configuration interfaces to administrative computing device 130 and/or treasury client computing device 160, treasury service computing platform 110 may cause, control, and/or direct administrative computing device 130 and/or treasury client computing device 160 to display and/or otherwise present a graphical user interface similar to graphical user interface 400, which is illustrated in FIG. 4. As seen in FIG. 4, graphical user interface 400 may include one or more user interface controls and/or other elements that may enable a user of administrative computing device 130 and/or treasury client computing device 160 interacting with graphical user interface 400 to define one or more usage limits for a cash handling device, such as treasury service cash handling device 140. Such usage limits may, for instance, include a first maximum deposit amount for a first client, a second maximum deposit amount for a second client (which may, e.g., be different from the first maximum deposit amount for the first client), a maximum change order amount for a third client, and/or additional usage limits.

Figure 5:
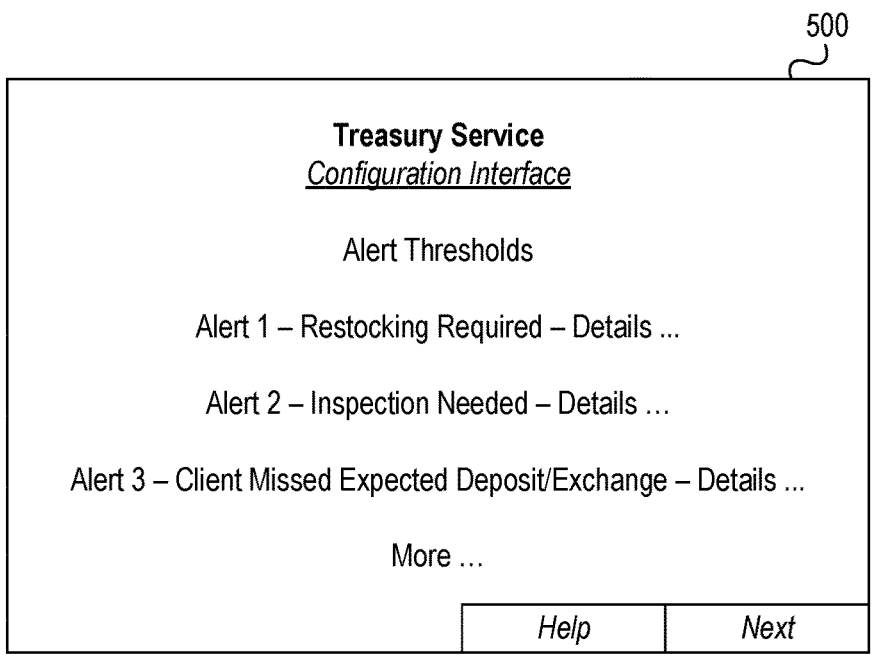

Additionally or alternatively, in providing the one or more configuration interfaces to administrative computing device 130 and/or treasury client computing device 160, treasury service computing platform 110 may cause, control, and/or direct administrative computing device 130 and/or treasury client computing device 160 to display and/or otherwise present a graphical user interface similar to graphical user interface 500, which is illustrated in FIG. 5. As seen in FIG. 5, graphical user interface 500 may include one or more user interface controls and/or other elements that may enable a user of administrative computing device 130 and/or treasury client computing device 160 interacting with graphical user interface 500 to define one or more alert thresholds for a cash handling device, such as treasury service cash handling device 140. Such alert thresholds may, for instance, include a first alert threshold for identifying when restocking is required at a particular cash handling device, a second alert threshold for identifying when inspecting is needed at a particular cash handling device, a third alert threshold for indicating when an expected deposit and/or exchange transaction has been missed by a particular client, and/or additional alert thresholds.

Figure 2C:
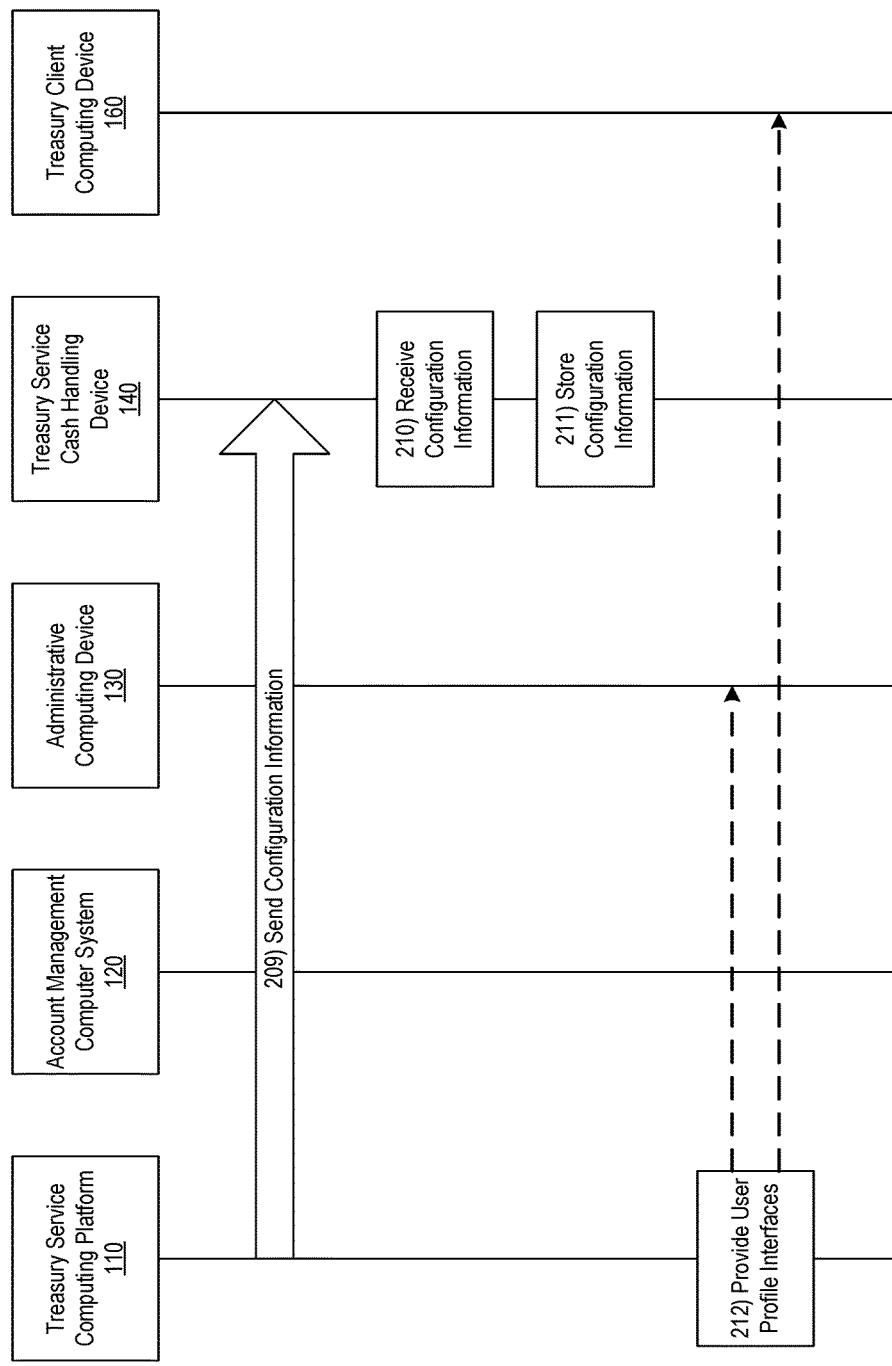

At step 208, treasury service computing platform 110 may receive one or more configuration settings (e.g., from administrative computing device 130, treasury client computing device 160, and/or one or more other computing devices). Such configuration settings may, for example, be received via the one or more configuration interfaces provided at step 207. Referring to FIG. 2C, at step 209, treasury service computing platform 110 may send configuration information to treasury service cash handling device 140 (e.g., based on the one or more configuration settings received at step 208, to direct and/or otherwise cause treasury service cash handling device 140 to implement the one or more configuration settings received at step 208).

At step 210, treasury service cash handling device 140 may receive the configuration information from treasury service computing platform 110. For example, at step 210, treasury service cash handling device 140 may receive, via a communication interface (e.g., communication interface 148), and from at least one banking server (e.g., treasury service computing platform 110), configuration information defining one or more configuration settings for the cash handling device (e.g., treasury service cash handling device 140). For instance, the configuration information defining one or more configuration settings for the cash handling device (e.g., treasury service cash handling device 140) may define one or more usage limits for treasury service cash handling device 140, one or more alert thresholds for treasury service cash handling device 140, and/or other configuration settings. Such configuration information may be received by treasury service cash handling device 140 directly from treasury service computing platform 110 and/or may be received via and/or from treasury device support server 150. For example, treasury service computing platform 110 may, in some instances, communicate configuration information to treasury device support server 150, and treasury device support server 150 may in turn communicate configuration information to treasury service cash handling device 140. At step 211, treasury service cash handling device 140 may store the configuration information received from treasury service computing platform 110. For example, at step 211, treasury service cash handling device 140 may store the configuration information defining the one or more configuration settings for the cash handling device (e.g., treasury service cash handling device 140) received from the at least one banking server (e.g., treasury service computing platform 110).

In addition to receiving and/or storing configuration information, treasury service cash handling device 140 also may receive and/or store user profile information, as illustrated in greater detail below. Such user profile information may, for instance, be received from treasury service computing platform 110 (e.g., directly and/or via treasury device support server 150). In addition, the user profile information may, for instance, define which treasury clients are authorized to use one or more cash handling devices, one or more usernames and/or passwords and/or personal identification numbers ("PIN numbers") to be used by particular organizations and/or particular users associated with such organizations (e.g., organization PIN numbers, employee PIN numbers, and/or the like) when logging into the one or more cash handling devices, language settings and/or accessibility settings for particular users of the one or more cash handling devices, and/or other user settings.

Figure 6:
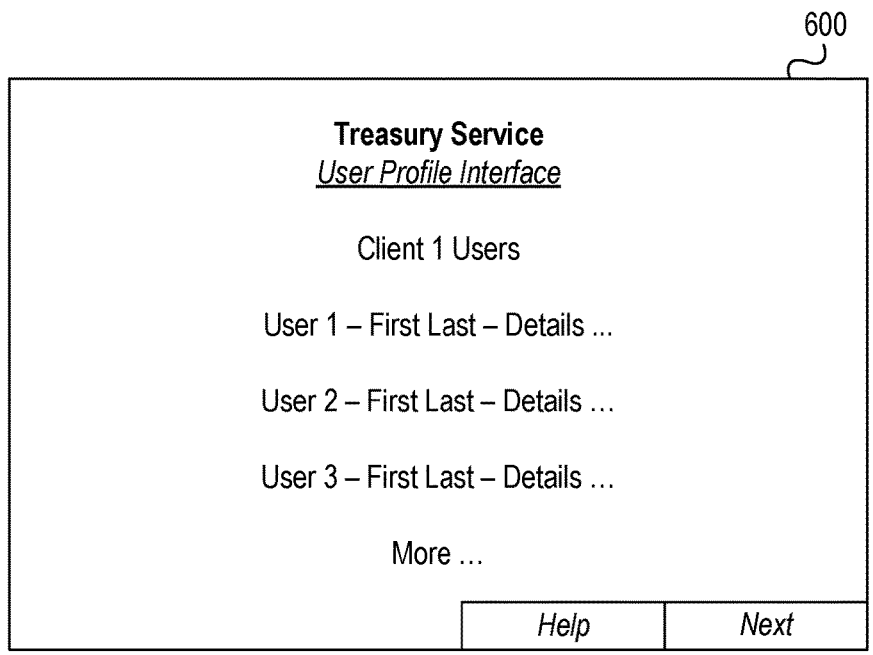
Figure 7:
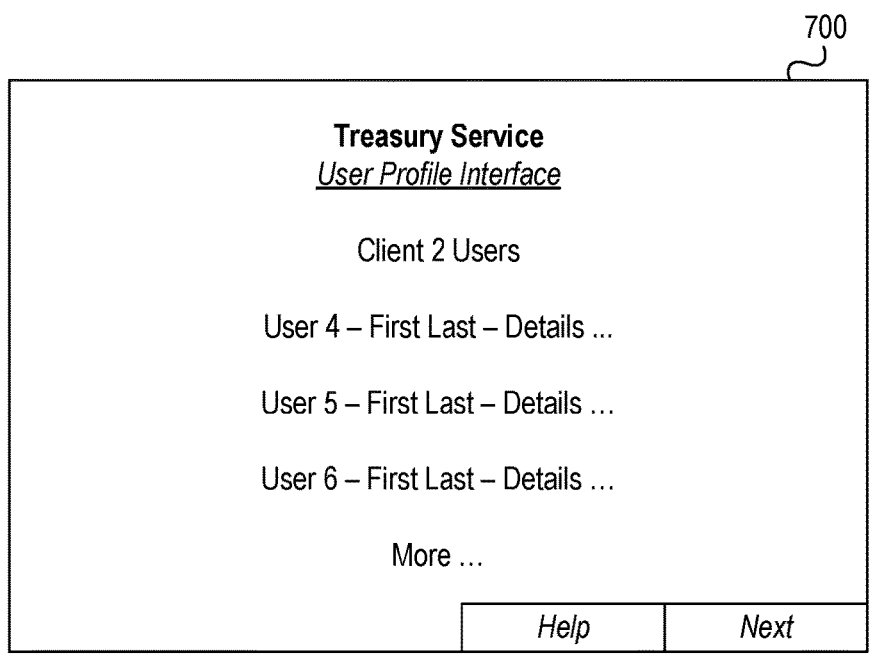

At step 212, treasury service computing platform 110 may provide one or more user profile interfaces (e.g., to administrative computing device 130, treasury client computing device 160, and/or one or more other computing devices). For example, at step 212, treasury service computing platform 110 may generate and/or send (e.g., to administrative computing device 130, treasury client computing device 160, and/or one or more other computing devices) one or more graphical user interfaces that may be configured to allow a user (e.g., of administrative computing device 130, treasury client computing device 160, or another computing device) to define various user profiles and/or other user settings for treasury service cash handling device 140 and/or one or more other cash handling devices. In providing the one or more user profile interfaces to administrative computing device 130 and/or treasury client computing device 160, treasury service computing platform 110 may cause, control, and/or direct administrative computing device 130 and/or treasury client computing device 160 to display and/or otherwise present a graphical user interface similar to graphical user interface 600, which is illustrated in FIG. 6. As seen in FIG. 6, graphical user interface 600 may include one or more user interface controls and/or other elements that may enable a user of administrative computing device 130 and/or treasury client computing device 160 interacting with graphical user interface 600 to define one or more user profiles for one or more authorized users of treasury service cash handling device 140 and/or one or more other cash handling devices. Such user profiles may, for instance, be associated with a first treasury client of a financial institution operating treasury service computing platform 110, and in some instances, user profiles associated with a second treasury client different from the first treasury client may be defined on a different screen. For example, in providing the one or more user profile interfaces to administrative computing device 130 and/or treasury client computing device 160, treasury service computing platform 110 may additionally or alternatively cause, control, and/or direct administrative computing device 130 and/or treasury client computing device 160 to display and/or otherwise present a graphical user interface similar to graphical user interface 700, which is illustrated in FIG. 7. As seen in FIG. 7, graphical user interface 700 may include one or more user interface controls and/or other elements that may enable a user of administrative computing device 130 and/or treasury client computing device 160 interacting with graphical user interface 700 to define one or more user profiles for one or more authorized users of treasury service cash handling device 140 and/or one or more other cash handling devices, and such user profiles may be associated with the second treasury client different from the first treasury client.

Figure 2D:
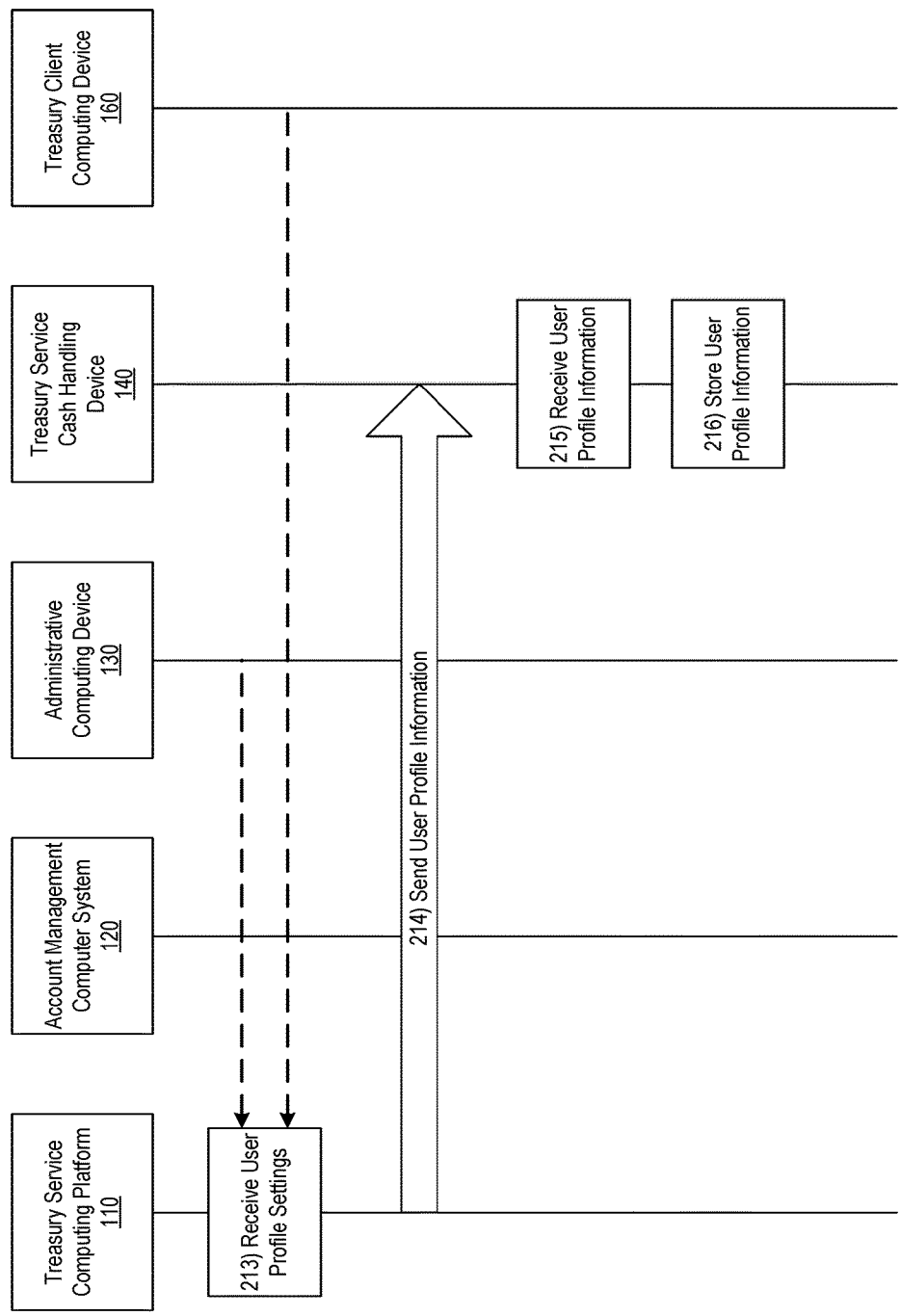

Referring to FIG. 2D, at step 213, treasury service computing platform 110 may receive one or more user profile settings (e.g., from administrative computing device 130, treasury client computing device 160, and/or one or more other computing devices). Such user profile settings may, for example, be received via the one or more user profile interfaces provided at step 212. At step 214, treasury service computing platform 110 may send user profile information to treasury service cash handling device 140 (e.g., based on the one or more user profile settings received at step 213, to direct and/or otherwise cause treasury service cash handling device 140 to implement the one or more user profile settings received at step 213).

At step 215, treasury service cash handling device 140 may receive the user profile information from treasury service computing platform 110. For example, at step 215, treasury service cash handling device 140 may receive, via the communication interface (e.g., communication interface 148), and from the at least one banking server (e.g., treasury service computing platform 110), user profile information defining one or more user settings for the cash handling device. Such user profile information may be received by treasury service cash handling device 140 directly from treasury service computing platform 110 and/or may be received via and/or from treasury device support server 150. For example, treasury service computing platform 110 may, in some instances, communicate user profile information to treasury device support server 150, and treasury device support server 150 may in turn communicate user profile information to treasury service cash handling device 140. At step 216, treasury service cash handling device 140 may store the user profile information received from treasury service computing platform 110. For example, at step 216, treasury service cash handling device 140 may store the user profile information defining the one or more user settings for the cash handling device (e.g., treasury service cash handling device 140) received from the at least one banking server (e.g., treasury service computing platform 110). In some instances, one or more user profile settings may be defined directly on treasury service cash handling device 140 via one or more user interfaces presented by treasury service cash handling device 140 instead of and/or in addition to being defined via one or more interfaces provided by treasury service computing platform 110.

After treasury service cash handling device 140 has been initiated and various settings have been defined, treasury service cash handling device 140 may, for example, begin normal operations, in which treasury service cash handling device 140 may, for instance, authenticate one or more users and/or perform one or more transactions, as illustrated in greater detail below. For example, treasury service cash handling device 140 may perform one or more treasury deposit transactions in which treasury service cash handling device 140 may accept bulk notes, coins, and/or checks; scan, sort, accept, and/or reject various notes, coins, checks, and/or other items that may be received for deposit; record the quantity of various denominations received, the times at which deposits are made, the users that made such deposits, the destination accounts for such deposits, whether any items were rejected and/or the like. Additionally or alternatively, treasury service cash handling device 140 may enforce one or more deposit limits and/or other limits, prompt a user through a process to handle rejected items, provide one or more receipts, and/or perform one or more other functions, as illustrated in greater detail below.

Figure 2E:
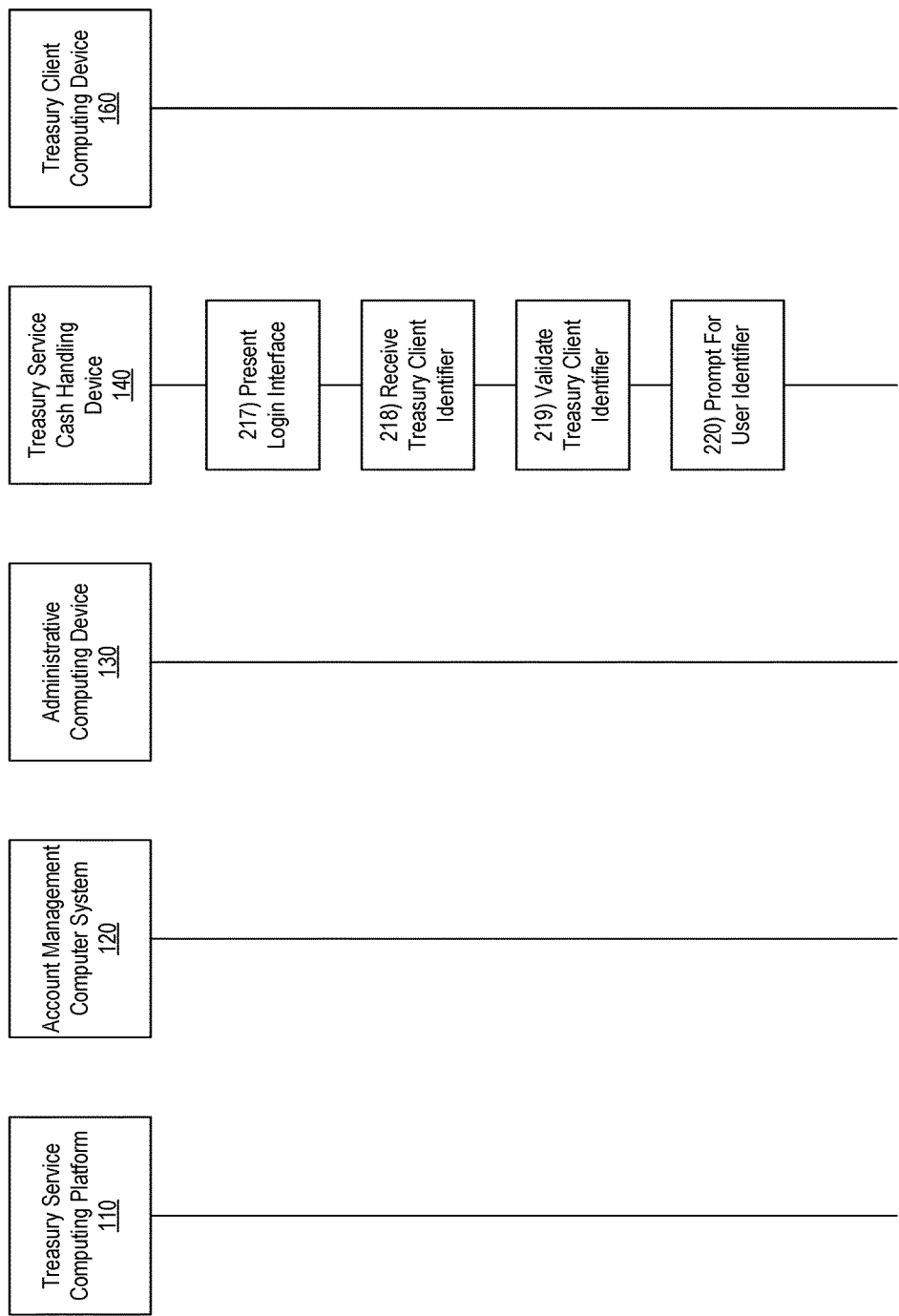

Referring to FIG. 2E, at step 217, treasury service cash handling device 140 may present a login interface. For example, at step 217, treasury service cash handling device 140 may display and/or otherwise present a login interface while operating in a standby mode, for instance, while waiting for a user to approach and/or request to use treasury service cash handling device 140 to perform one or more transactions. At step 218, treasury service cash handling device 140 may receive a treasury client identifier. For example, at step 218, treasury service cash handling device 140 may receive user input that includes a treasury client identifier associated with a particular entity (which may, e.g., be an organization having one or more users who are authorized to use treasury service cash handling device 140). At step 219, treasury service cash handling device 140 may validate the treasury client identifier (e.g., based on configuration information, user profile information, and/or the like). At step 220, treasury service cash handling device 140 may prompt the user of treasury service cash handling device 140 to enter a user identifier.

Figure 2F:
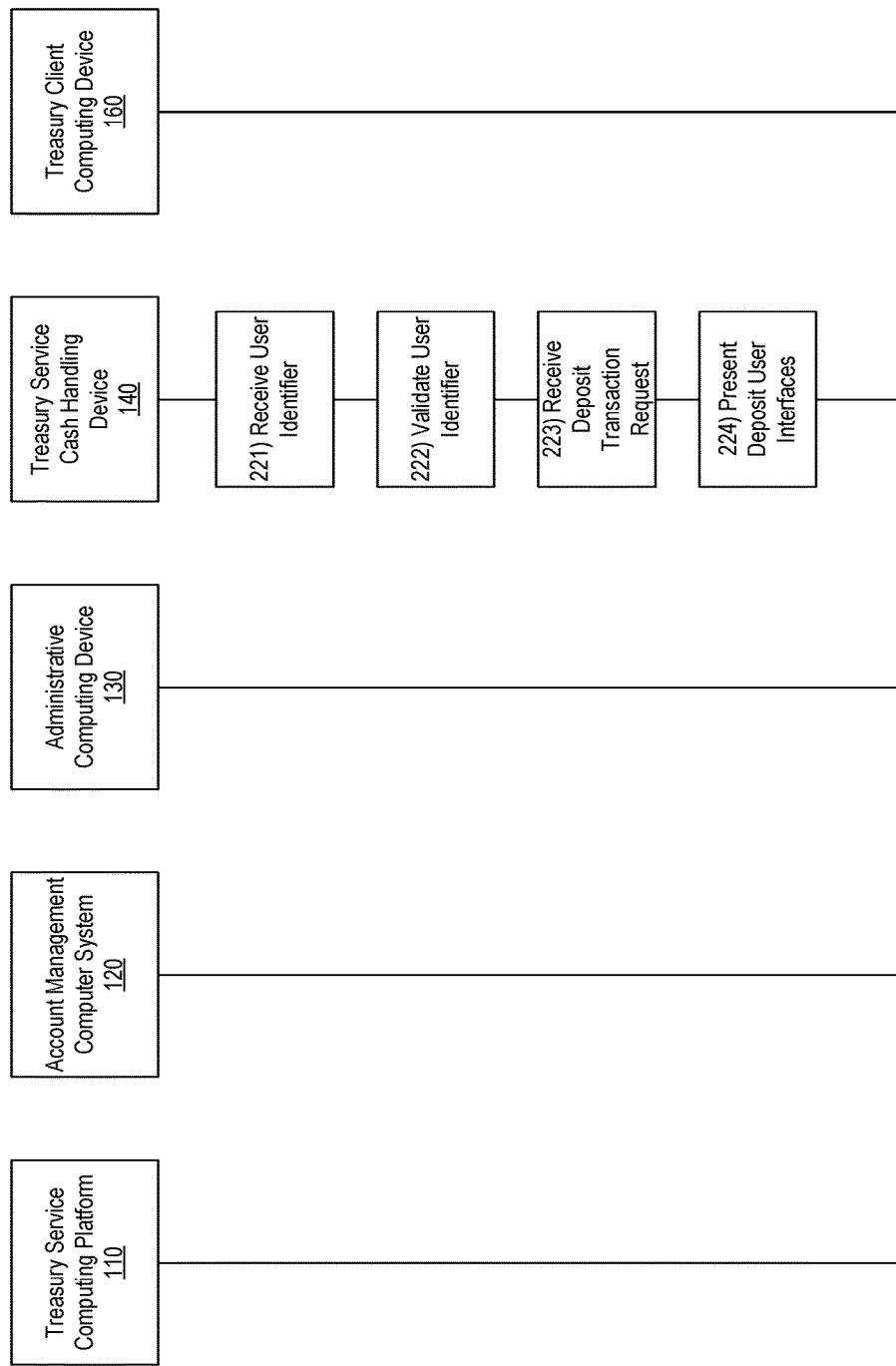

Referring to FIG. 2F, at step 221, treasury service cash handling device 140 may receive a user identifier. For example, at step 221, treasury service cash handling device 140 may receive user input that includes a user identifier associated with a particular user (who may, e.g., be employed by and/or otherwise affiliated with the organization corresponding to the treasury client identifier validated by treasury service cash handling device 140 at step 219). At step 222, treasury service cash handling device 140 may validate the user identifier received at step 221 (e.g., based on user profile information and/or other information). For example, at step 222, treasury service cash handling device 140 may authenticate the first user of the cash handling device (e.g., treasury service cash handling device 140) based on the user profile information defining the one or more user settings for the cash handling device (e.g., treasury service cash handling device 140) received from the at least one banking server (e.g., treasury service computing platform 110). In some instances, the user may be authenticated by treasury service cash handling device 140 based on a client identifier and a user identifier entered by the user, while in other instances, the user may additionally or alternatively be authenticated by treasury service cash handling device 140 based on treasury service cash handling device 140 scanning and/or extracting information from a data bearing token, such as a card with a magnetic stripe, a radio frequency identification (RFID) tag, and/or the like.

At step 223, treasury service cash handling device 140 may receive a deposit transaction request. For example, at step 223, treasury service cash handling device 140 may receive, from a first user of the cash handling device (e.g., treasury service cash handling device 140), a request to perform a deposit transaction at a deployment location of the cash handling device (e.g., treasury service cash handling device 140). Such a request may, for instance, correspond to and/or include user input received by treasury service cash handling device 140 via a user interface displayed and/or otherwise presented by treasury service cash handling device 140.

In some embodiments, the deployment location of the cash handling device may be a retail banking center operated by a financial institution. For example, the deployment location of the cash handling device (e.g., treasury service cash handling device 140) may be a retail banking center operated by a financial institution (which may, e.g., operate treasury service cash handling device 140 and/or treasury service computing platform 110). In some embodiments, the deployment location of the cash handling device may be a shopping mall in which a plurality of retailers operate retail stores. For example, the deployment location of the cash handling device (e.g., treasury service cash handling device 140) may be a shopping mall in which a plurality of retailers operate retail stores (and which might not, e.g., be associated with the financial institution operating treasury service cash handling device 140 and/or treasury service computing platform 110).

At step 224, treasury service cash handling device 140 may present one or more deposit user interfaces. For example, at step 224, treasury service cash handling device 140 may display and/or otherwise present one or more user interfaces prompting the user of treasury service cash handling device 140 to insert one or more bills, coins, checks, and/or other items for deposit.

Figure 2G:
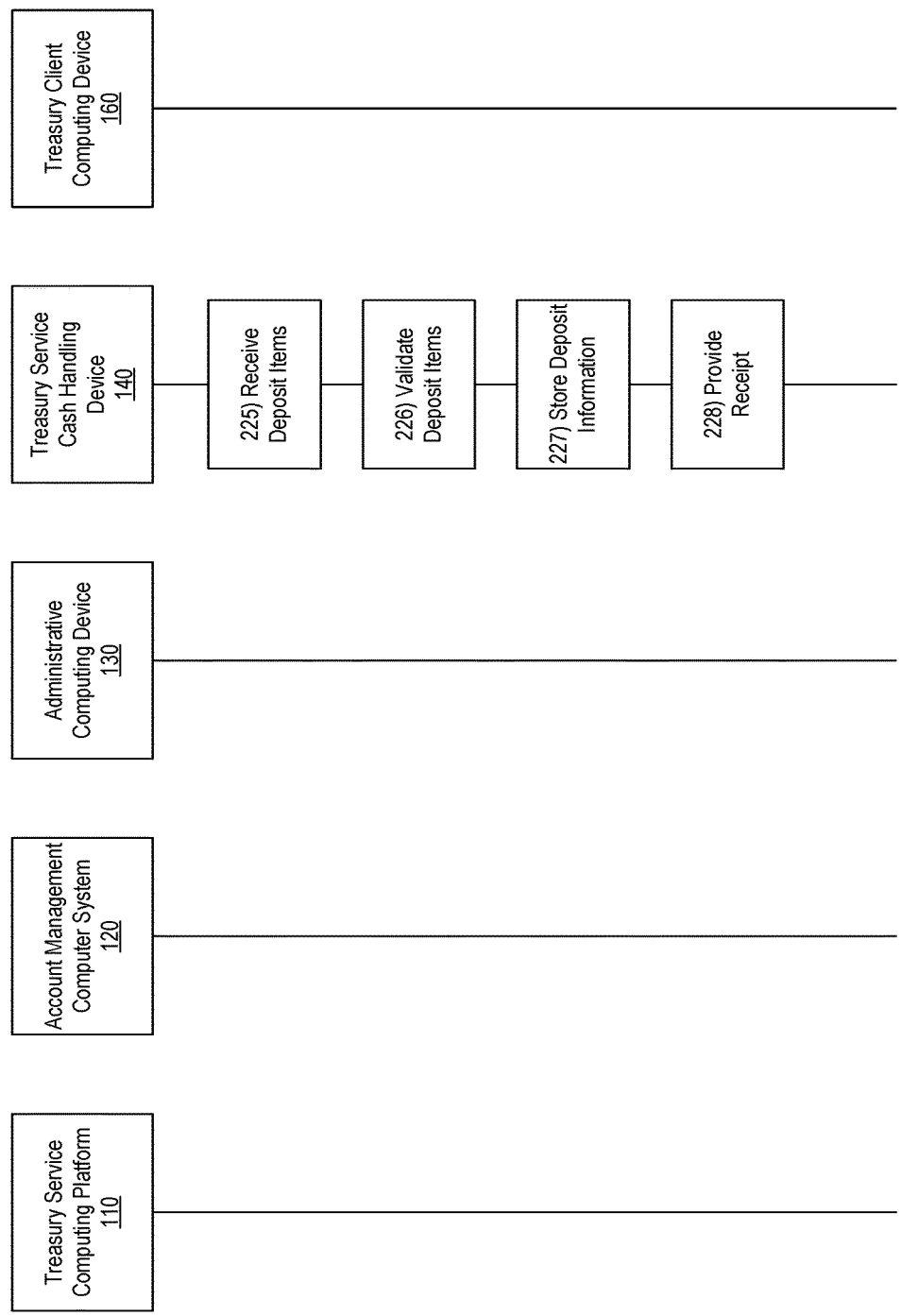

Referring to FIG. 2G, at step 225, treasury service cash handling device 140 may receive one or more deposit items. For example, at step 225, based on receiving the request to perform the deposit transaction at the deployment location of the cash handling device (e.g., treasury service cash handling device 140), treasury service cash handling device 140 may receive, via the item accepting device (e.g., item accepting device 145), at least one deposit item for deposit at the deployment location of the cash handling device (e.g., treasury service cash handling device 140).

In some embodiments, the at least one deposit item received for deposit may include one or more currency notes. For example, the at least one deposit item received for deposit by treasury service cash handling device 140 at step 225 may include one or more currency notes. Additionally or alternatively, the at least one deposit item received for deposit may include one or more currency coins. For example, the at least one deposit item received for deposit by treasury service cash handling device 140 at step 225 may include one or more currency coins. Additionally or alternatively, the at least one deposit item received for deposit may include one or more checks. For example, the at least one deposit item received for deposit by treasury service cash handling device 140 at step 225 may include one or more checks.

At step 226, treasury service cash handling device 140 may validate the one or more deposit items. For example, at step 226, treasury service cash handling device 140 may validate the at least one deposit item received for deposit at the deployment location of the cash handling device (e.g., treasury service cash handling device 140). For example, in validating the one or more deposit items at step 226, treasury service cash handling device 140 may scan and/or sort the one or more items received for deposit, accept and/or physically store one or more items that are deemed to be valid bills and/or coins and/or otherwise acceptable items, reject and/or physically return one or more items that are deemed to be invalid bills and/or coins and/or otherwise unacceptable items, present one or more graphical user interfaces having information about the deposit transaction (e.g., identifying items that were accepted and/or rejected, informing the user why one or more items were rejected, prompting the user through a process for re-depositing rejected items, informing the user about deposit limits and/or other usage limits, and/or the like).

In some embodiments, validating the at least one deposit item received for deposit at the deployment location of the cash handling device may include: scanning, by the internal currency scanning system, one or more deposit items received for deposit; sorting, by the internal currency transport system, the one or more deposit items received for deposit; and physically storing, by the internal currency transport system, in the one or more currency storage cartridges, the one or more deposit items received for deposit. For example, in validating the at least one deposit item received for deposit at the deployment location of the cash handling device (e.g., treasury service cash handling device 140), treasury service cash handling device 140 may scan, by the internal currency scanning system (e.g., currency scanning system 147a), one or more deposit items received for deposit. In addition, treasury service cash handling device 140 may store, by the internal currency transport system (e.g., currency transport system 147b), the one or more deposit items received for deposit. In addition, treasury service cash handling device 140 may physically store, by the internal currency transport system (e.g., currency transport system 147b), in the one or more currency storage cartridges (e.g., storage cartridges 147c), the one or more deposit items received for deposit.

In some embodiments, configuration information stored by the cash handling device may define one or more usage limits, and validating the at least one deposit item received for deposit at the deployment location of the cash handling device may include enforcing the one or more usage limits defined by the configuration information stored by the cash handling device. For example, configuration information stored by the cash handling device (e.g., treasury service cash handling device 140) may define one or more usage limits, and in validating the at least one deposit item received for deposit at the deployment location of the cash handling device (e.g., treasury service cash handling device 140), treasury service cash handling device 140 may enforce the one or more usage limits defined by the configuration information stored by the cash handling device (e.g., treasury service cash handling device 140). Such usage limits may be defined by a financial institution operating treasury service cash handling device 140 and/or treasury service computing platform 110 and/or may be defined by a client of the financial institution operating treasury service cash handling device 140 and/or treasury service computing platform 110. In some instances, such usage limits may, for instance, include a maximum deposit limit defining a maximum amount of currency that can be deposited by one user of treasury service cash handling device 140 and/or in one transaction.

In some embodiments, configuration information stored by the cash handling device may define one or more alert thresholds, and validating the at least one deposit item received for deposit at the deployment location of the cash handling device may include generating at least one deposit alert based on the one or more alert thresholds defined by the configuration information stored by the cash handling device. For example, configuration information stored by the cash handling device (e.g., treasury service cash handling device 140) may define one or more alert thresholds, and in validating the at least one deposit item received for deposit at the deployment location of the cash handling device (e.g., treasury service cash handling device 140), treasury service cash handling device 140 may generate at least one deposit alert based on the one or more alert thresholds defined by the configuration information stored by the cash handling device (e.g., treasury service cash handling device 140). Such an alert may, for instance, be sent (e.g., by treasury service cash handling device 140, treasury device support server 150, treasury service computing platform 110) to a treasury client and/or a device associated with the treasury client (e.g., treasury client computing device 160) to notify the treasury client of the deposit transaction being performed.

At step 227, treasury service cash handling device 140 may store deposit information. For example, at step 227, treasury service cash handling device 140 may store deposit information to record the quantities of items received in connection with the deposit transaction, the denominations of the items received, the time at which such items were received, the user that performed the deposit transaction, details associated with any items that were rejected, and/or other information associated with the deposit transaction. At step 228, treasury service cash handling device 140 may provide a receipt. For example, at step 228, based on validating the at least one deposit item received for deposit at the deployment location of the cash handling device (e.g., treasury service cash handling device 140), treasury service cash handling device 140 may provide a deposit receipt associated with the request to perform the deposit transaction. In providing such a deposit receipt, treasury service cash handling device 140 may print, dispense, and/or otherwise physically output a receipt for collection by the user, and such a receipt may include information associated with the deposit transaction. For example, the deposit receipt may include any and/or all of the deposit information stored by treasury service cash handling device 140 at step 227.

After treasury service cash handling device 140 has received and/or validated one or more deposit items in connection with performing a deposit transaction, treasury service cash handling device 140 may update treasury service computing platform 110, treasury device support server 150, and/or one or more other servers. For example, treasury service cash handling device 140 may send commands and/or other information to treasury service computing platform 110 and/or treasury device support server 150 to cause treasury service computing platform 110 and/or treasury device support server 150 to credit one or more accounts for the items deposited at treasury service cash handling device 140, generate and/or send one or more alerts based on the deposit transaction being performed, generate and/or send one or more reports based on the deposit transaction being performed, evaluate restocking and/or transport needs at treasury service cash handling device 140, and/or perform other functions, as illustrated in greater detail below.

Figure 2H:
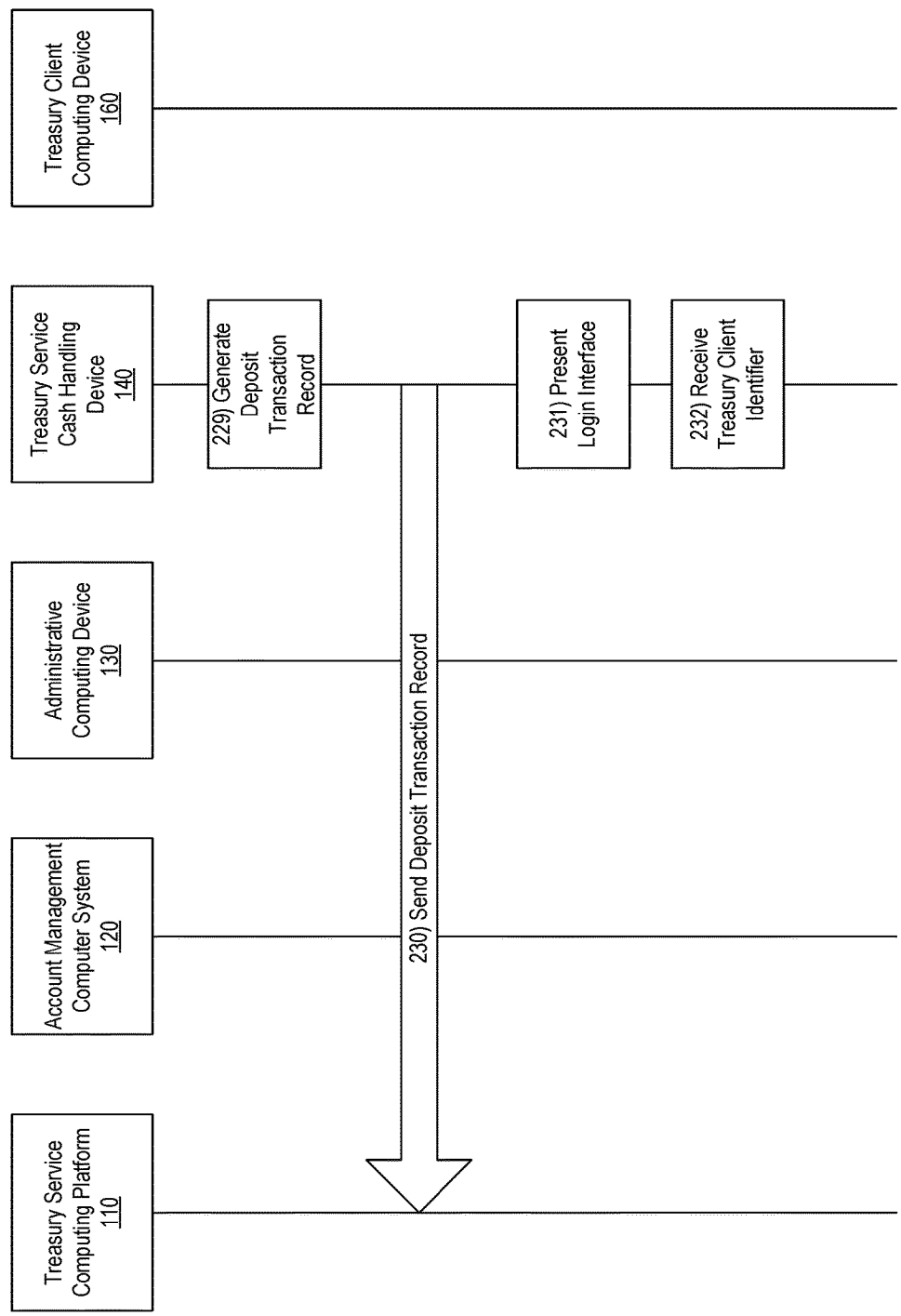

Referring to FIG. 2H, at step 229, treasury service cash handling device 140 may generate a deposit transaction record. For example, at step 229, based on validating the at least one deposit item received for deposit at the deployment location of the cash handling device (e.g., treasury service cash handling device 140), treasury service cash handling device 140 may generate a deposit transaction record associated with the request to perform the deposit transaction, the deposit transaction record comprising deposit information directing at least one banking server (e.g., treasury service computing platform 110) to apply a provisional credit to at least one treasury account associated with the first user of the cash handling device (e.g., treasury service cash handling device 140). For instance, treasury service cash handling device 140 may generate the deposit transaction record to direct and/or otherwise cause treasury service computing platform 110 to credit the appropriate client for the deposit received by treasury service cash handling device 140, and the credit may be provisional in nature as it may be subject to verification (e.g., by the financial institution operating treasury service cash handling device 140 and/or treasury service computing platform 110) before being confirmed, reconciled, and made non-provisional, as illustrated in greater detail below. Additionally or alternatively, the deposit transaction record generated by treasury service cash handling device 140 at step 229 may include some or all of the deposit information stored by treasury service cash handling device 140 at step 227 (e.g., based on the configuration settings for treasury service cash handling device 140 and/or other deployment parameters).

In some embodiments, the deposit information may direct the at least one banking server to credit the at least one treasury account associated with the first user of the cash handling device with an amount of funds associated with the at least one deposit item received for deposit at the deployment location of the cash handling device and validated by the cash handling device. For example, the deposit information (which may, e.g., be included in the deposit transaction record generated by treasury service cash handling device 140 at step 229) may direct the at least one banking server (e.g., treasury service computing platform 110) to credit the at least one treasury account associated with the first user of the cash handling device (e.g., treasury service cash handling device 140) with an amount of funds associated with the at least one deposit item received for deposit at the deployment location of the cash handling device (e.g., treasury service cash handling device 140) and validated by the cash handling device (e.g., treasury service cash handling device 140). For instance, if treasury service cash handling device 140 received $400 in deposit items and accepted and validated $370 of the deposit items (e.g., and rejected the other $30 of the deposit items), then treasury service cash handling device 140 may generate a deposit transaction record having deposit information directing treasury service computing platform 110 to credit an account associated with the depositor in the amount of $370. As noted above, the account may be a treasury account maintained by the financial institution for a small business, retailer, or other organization, and the deposit may be made by an employee or other affiliate of the organization. In addition, treasury service cash handling device 140 and/or one or more other cash handling devices may be deployed by the financial institution solely for use by such treasury clients (e.g., organizational clients) and might not be usable by retail clients (e.g., personal or individual clients) of the financial institution, for instance.

In some embodiments, the deposit transaction record may include information identifying one or more denominations of currency received by the cash handling device, one or more quantities of specific denominations of currency received by the cash handling device, a time at which the deposit transaction was completed, a user that performed the deposit transaction, a quantity of deposit items rejected, and one or more destination accounts into which currency was deposited. For example, the deposit transaction record (which may, e.g., be generated by treasury service cash handling device 140 at step 229) may include information identifying one or more denominations of currency received by the cash handling device (e.g., treasury service cash handling device 140), one or more quantities of specific denominations of currency received by the cash handling device (e.g., treasury service cash handling device 140), a time at which the deposit transaction was completed, a user that performed the deposit transaction, a quantity of deposit items rejected, and one or more destination accounts into which currency was deposited. An example of the information that may be included in a deposit transaction record generated by treasury service cash handling device 140 is illustrated in the following table:

TABLE A

| Deposit Transaction Record | |
|---|---|
| Unique Record Identifier Number | AAAAAA |
| Unique Cash Handling Device Identifier | BBBBBB |
| Quantity of Currency Received | 275 notes, 400 coins |
| Denominations Received | $100, $50, $20, $1, $0.25 |
| Quantities of Denominations Received | 25 × $100, 25 × $50, 25 × $20, 200 × $1, 400 × $0.25 |
| Time of Completion | Mar. 19, 2016, at 2:00 PM ET |
| User Performing Transaction | First M. Last |
| Quantity of Items Rejected | 3 notes |
| Destination Account(s) | Treasury Client Account 1 |

At step 230, treasury service cash handling device 140 may send the deposit transaction record to treasury service computing platform 110. For example, at step 230, treasury service cash handling device 140 may send, via the communication interface (e.g., communication interface 148), and to the at least one banking server (e.g., treasury service computing platform 110), the deposit transaction record. Treasury service cash handling device 140 may, for instance, send the deposit transaction record to treasury service computing platform 110 to facilitate the crediting of one or more accounts in connection with the deposit, to facilitate the generation of one or more alerts, notifications, and/or reports, and/or to facilitate inventory monitoring and/or restocking of treasury service cash handling device 140. In some instances, in sending the deposit transaction record to treasury service computing platform 110, treasury service cash handling device 140 may send the deposit transaction record directly to treasury service computing platform 110 (e.g., via a connection established between treasury service computing platform 110 and treasury service cash handling device 140), while in other instances, in sending the deposit transaction record to treasury service computing platform 110, treasury service cash handling device 140 may send the deposit transaction record to treasury service computing platform 110 via treasury device support server 150. For instance, treasury service cash handling device 140 may send the deposit transaction record to treasury device support server 150, which in turn may send the deposit transaction record to treasury service computing platform 110.

After performing one transaction, such as the deposit transaction illustrated above, treasury service cash handling device 140 may perform another transaction, such as a change order transaction, for example, as illustrated in greater detail below. In performing such a change order transaction, treasury service cash handling device 140 may, for instance, authenticate a user, accept bulk notes and/or coins; scan, sort, accept, and/or reject various notes, coins, checks, and/or other items that may be received for exchange; receive input requesting specific quantities and/or denominations of notes and/or coins into which inserted currency should be exchanged; calculate specific quantities and/or denominations of notes and/or coins into which inserted currency should be exchanged to ensure an even exchange; dispense one or more bills and/or rolled coins (e.g., wrapped rolls of coins of particular denominations); record the quantity of various denominations received, the time at which the exchange is made, the user that made the exchange, any accounts involved, whether any items were rejected and/or the like. Additionally or alternatively, treasury service cash handling device 140 may enforce one or more usage limits and/or other limits, prompt a user through a process to handle rejected items, provide one or more receipts, and/or perform one or more other functions, as illustrated in greater detail below.

At step 231, treasury service cash handling device 140 may present a login interface. For example, at step 231, treasury service cash handling device 140 may display and/or otherwise present a login interface while operating in a standby mode, for instance, while waiting for a user to approach and/or request to use treasury service cash handling device 140 to perform one or more transactions. In some instances, treasury service cash handling device 140 may skip one or more user authentication steps if the previous user of treasury service cash handling device 140 is still authenticated and wishes to perform another transaction, while in other instances, treasury service cash handling device 140 may return to the login interface after each transaction is completed as a default security measure.

Figure 2I:
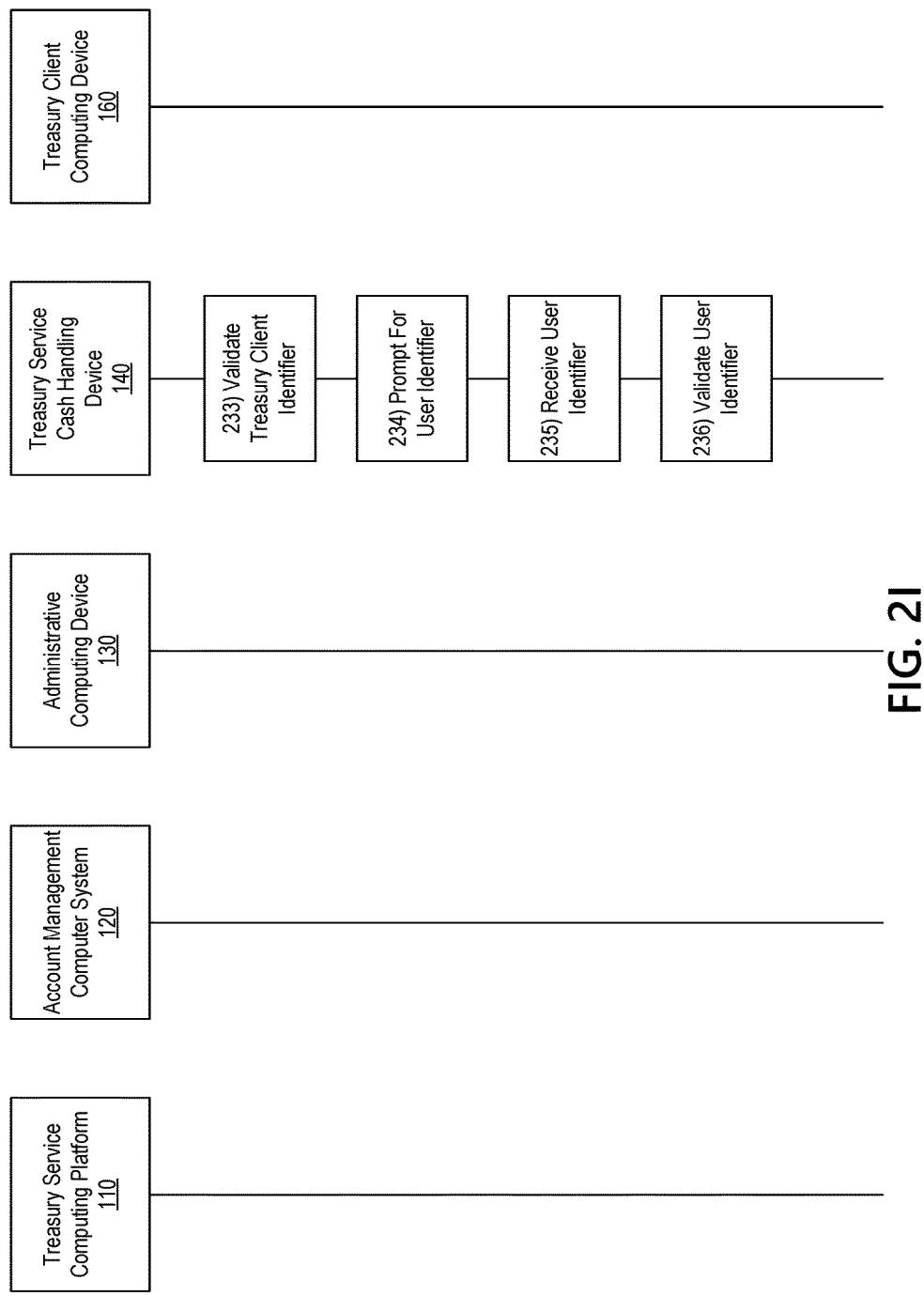

At step 232, treasury service cash handling device 140 may receive a treasury client identifier. For example, at step 232, treasury service cash handling device 140 may receive user input that includes a treasury client identifier associated with a particular entity (which may, e.g., be an organization having one or more users who are authorized to use treasury service cash handling device 140). Referring to FIG. 2I, at step 233, treasury service cash handling device 140 may validate the treasury client identifier (e.g., based on configuration information, user profile information, and/or the like). At step 234, treasury service cash handling device 140 may prompt the user of treasury service cash handling device 140 to enter a user identifier.

At step 235, treasury service cash handling device 140 may receive a user identifier. For example, at step 235, treasury service cash handling device 140 may receive user input that includes a user identifier associated with a particular user (who may, e.g., be employed by and/or otherwise affiliated with the organization corresponding to the treasury client identifier validated by treasury service cash handling device 140 at step 233). At step 236, treasury service cash handling device 140 may validate the user identifier received at step 235 (e.g., based on user profile information and/or other information). For example, at step 236, treasury service cash handling device 140 may authenticate the second user of the cash handling device (e.g., treasury service cash handling device 140) based on the user profile information defining the one or more user settings for the cash handling device (e.g., treasury service cash handling device 140) received from the at least one banking server (e.g., treasury service computing platform 110). In some instances, the user may be authenticated by treasury service cash handling device 140 based on a client identifier and a user identifier entered by the user, while in other instances, the user may additionally or alternatively be authenticated by treasury service cash handling device 140 based on treasury service cash handling device 140 scanning and/or extracting information from a data bearing token, such as a card with a magnetic stripe, a radio frequency identification (RFID) tag, and/or the like.

Figure 2J:
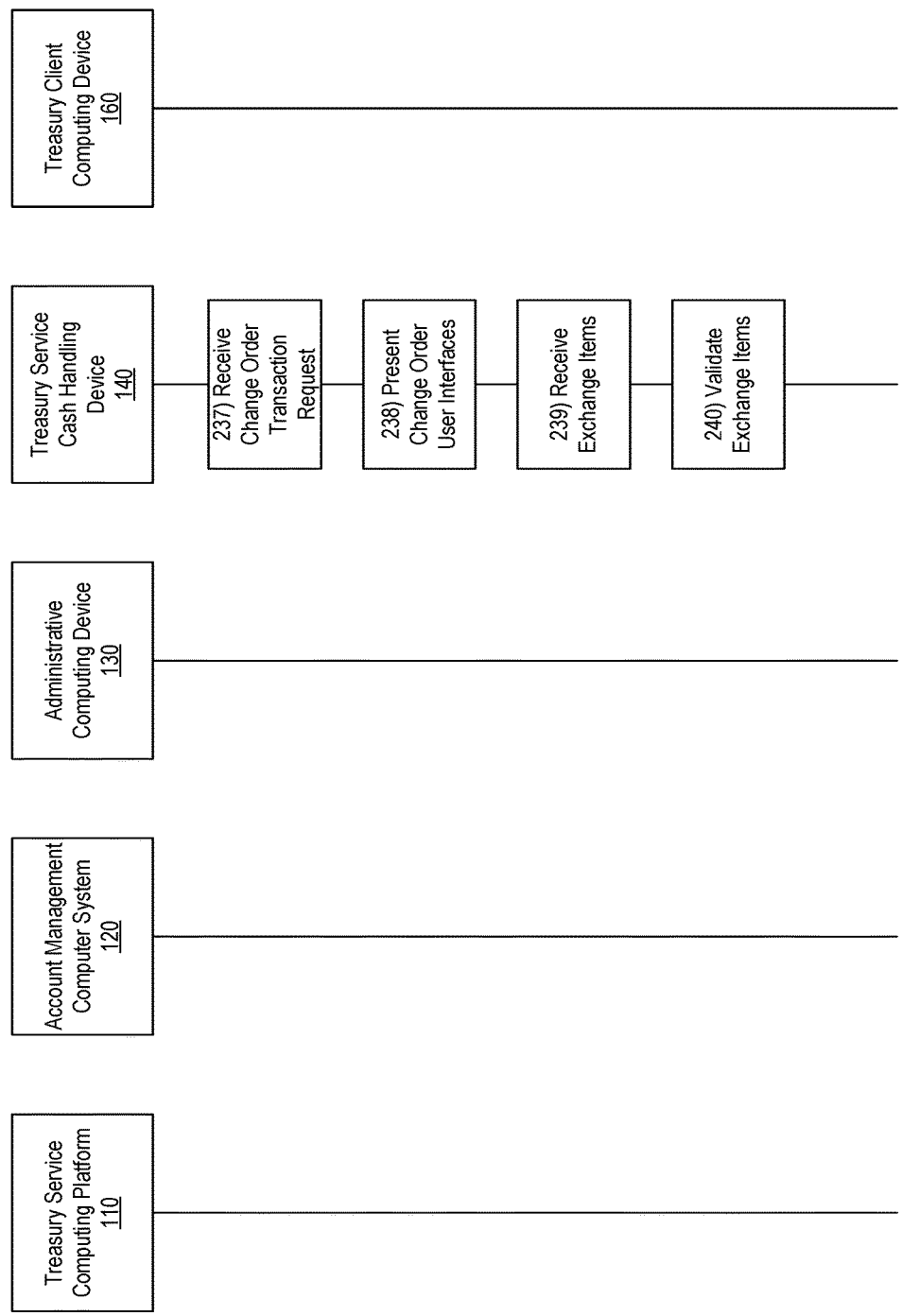

Referring to FIG. 2J, at step 237, treasury service cash handling device 140 may receive a change order transaction request. For example, at step 237, treasury service cash handling device 140 may receive, from a second user of the cash handling device (e.g., treasury service cash handling device 140), a request to perform a change order transaction at the deployment location of the cash handling device (e.g., treasury service cash handling device 140). Such a request may, for instance, correspond to and/or include user input received by treasury service cash handling device 140 via a user interface displayed and/or otherwise presented by treasury service cash handling device 140. At step 238, treasury service cash handling device 140 may present one or more change order user interfaces. For example, at step 238, treasury service cash handling device 140 may display and/or otherwise present one or more user interfaces prompting the user of treasury service cash handling device 140 to insert one or more bills and/or coins to be exchanged, indicate what specific denominations/quantities into which the inserted items should be changed, and/or the like.

At step 239, treasury service cash handling device 140 may receive one or more exchange items. For example, at step 239, based on receiving the request to perform the change order transaction at the deployment location of the cash handling device (e.g., treasury service cash handling device 140), treasury service cash handling device 140 may receive, via the item accepting device (e.g., item accepting device 145), at least one change order item for exchange at the deployment location of the cash handling device (e.g., treasury service cash handling device 140).

In some embodiments, the at least one change order item received for exchange may include one or more currency notes. For example, the at least one change order item received for exchange by treasury service cash handling device 140 at step 239 may include one or more currency notes. In some embodiments, the at least one change order item received for exchange may include one or more currency coins. For example, the at least one change order item received for exchange by treasury service cash handling device 140 at step 239 may include one or more currency coins.

At step 240, treasury service cash handling device 140 may validate the one or more change order items for exchange (which may, e.g., also be referred to as "exchange items"). For example, at step 240, treasury service cash handling device 140 may validate the at least one change order item received for exchange at the deployment location of the cash handling device (e.g., treasury service cash handling device 140). For example, in validating the one or more exchange items at step 240, treasury service cash handling device 140 may scan and/or sort the one or more items received for exchange, accept and/or physically store one or more items that are deemed to be valid bills and/or coins and/or otherwise acceptable items, reject and/or physically return one or more items that are deemed to be invalid bills and/or coins and/or otherwise unacceptable items, present one or more graphical user interfaces having information about the exchange transaction (e.g., identifying items that were accepted and/or rejected, informing the user why one or more items were rejected, prompting the user through a process for re-depositing rejected items, informing the user about exchange limits and/or other usage limits, and/or the like).

In some embodiments, validating the at least one change order item received for exchange at the deployment location of the cash handling device may include: scanning, by the internal currency scanning system, one or more change order items received for exchange; sorting, by the internal currency transport system, the one or more change order items received for exchange; and physically storing, by the internal currency transport system, in the one or more currency storage cartridges, the one or more change order items received for exchange. For example, in validating the at least one change order item received for exchange at the deployment location of the cash handling device (e.g., treasury service cash handling device 140), treasury service cash handling device 140 may scan, by the internal currency scanning system (e.g., currency scanning system 147a), one or more change order items received for exchange. In addition, treasury service cash handling device 140 may sort, by the internal currency transport system (e.g., currency transport system 147b), the one or more change order items received for exchange. In addition, treasury service cash handling device 140 may physically store, by the internal currency transport system (e.g., currency transport system 147b), in the one or more currency storage cartridges (e.g., storage cartridges 147c), the one or more change order items received for exchange. In some instances, items received for exchange and items received for deposit may be separately stored and maintained by treasury service cash handling device 140 in different storage cartridges (e.g., storage cartridges 147c), while in other instances, deposit items and exchange items may be commingled.

In some embodiments, configuration information stored by the cash handling device may define one or more usage limits, and validating the at least one change order item received for exchange at the deployment location of the cash handling device may include enforcing the one or more usage limits defined by the configuration information stored by the cash handling device. For example, configuration information stored by the cash handling device (e.g., treasury service cash handling device 140) may define one or more usage limits, and in validating the at least one change order item received for exchange at the deployment location of the cash handling device (e.g., treasury service cash handling device 140), treasury service cash handling device 140 may enforce the one or more usage limits defined by the configuration information stored by the cash handling device (e.g., treasury service cash handling device 140). Such usage limits may be defined by a financial institution operating treasury service cash handling device 140 and/or treasury service computing platform 110 and/or may be defined by a client of the financial institution operating treasury service cash handling device 140 and/or treasury service computing platform 110. In some instances, such usage limits may, for instance, include a maximum exchange limit defining a maximum amount of currency that can be exchanged by one user of treasury service cash handling device 140 and/or in one transaction.

In some embodiments, configuration information stored by the cash handling device may define one or more alert thresholds, and validating the at least one change order item received for exchange at the deployment location of the cash handling device may include generating at least one exchange alert based on the one or more alert thresholds defined by the configuration information stored by the cash handling device. For example, configuration information stored by the cash handling device (e.g., treasury service cash handling device 140) may define one or more alert thresholds, and in validating the at least one change order item received for exchange at the deployment location of the cash handling device (e.g., treasury service cash handling device 140), treasury service cash handling device 140 may generate at least one exchange alert based on the one or more alert thresholds defined by the configuration information stored by the cash handling device (e.g., treasury service cash handling device 140).

Such an alert may, for instance, be sent (e.g., by treasury service cash handling device 140, treasury device support server 150, treasury service computing platform 110) to a treasury client and/or a device associated with the treasury client (e.g., treasury client computing device 160) to notify the treasury client of the exchange transaction being performed.

Referring to FIG. 2K, at step 241, treasury service cash handling device 140 may dispense currency. For example, at step 241, based on validating the at least one change order item received for exchange at the deployment location of the cash handling device (e.g., treasury service cash handling device 140), treasury service cash handling device 140 may dispense, via the item dispensing device (e.g., item dispensing device 146), one or more currency items to complete the change order transaction. In dispensing one or more currency items, treasury service cash handling device 140 may, for example, dispense one or more bills and/or notes, rolls of coins (which may also be referred to as "rolled coin"), and/or other items, in accordance with the denominations and/or quantities requested by the user of treasury service cash handling device 140 and/or determined by treasury service cash handling device 140 itself (e.g., to ensure an even exchange of funds).

At step 242, treasury service cash handling device 140 may store exchange information. For example, at step 242, treasury service cash handling device 140 may store exchange information to record the quantities of items received in connection with the exchange transaction, the denominations of the items received, the time at which such items were received, the user that performed the deposit transaction, details associated with any items that were rejected, and/or other information associated with the exchange transaction. At step 243, treasury service cash handling device 140 may provide a receipt. For example, based on validating the at least one change order item received for exchange at the deployment location of the cash handling device (e.g., treasury service cash handling device 140), treasury service cash handling device 140 may provide an exchange receipt associated with the request to perform the change order transaction. In providing such an exchange receipt, treasury service cash handling device 140 may print, dispense, and/or otherwise physically output a receipt for collection by the user, and such a receipt may include information associated with the exchange transaction. For example, the exchange receipt may include any and/or all of the exchange information stored by treasury service cash handling device 140 at step 242.

After treasury service cash handling device 140 has received and/or validated one or more exchange items and dispensed one or more currency items in connection with performing an exchange transaction, treasury service cash handling device 140 may update treasury service computing platform 110, treasury device support server 150, and/or one or more other servers. For example, treasury service cash handling device 140 may send commands and/or other information to treasury service computing platform 110 and/or treasury device support server 150 to cause treasury service computing platform 110 and/or treasury device support server 150 to update one or more transaction history records to reflect the items exchanged at treasury service cash handling device 140, generate and/or send one or more alerts based on the exchange transaction being performed, generate and/or send one or more reports based on the exchange transaction being performed, evaluate restocking and/or transport needs at treasury service cash handling device 140, and/or perform other functions, as illustrated in greater detail below.

At step 244, treasury service cash handling device 140 may generate an exchange transaction record. For example, at step 244, treasury service cash handling device 140 may generate a change order transaction record associated with the request to perform the change order transaction, the change order transaction record comprising change order information directing the at least one banking server (e.g., treasury service computing platform 110) to update one or more transaction history records associated with the second user of the cash handling device (e.g., treasury service cash handling device 140). For instance, treasury service cash handling device 140 may generate the exchange transaction record to direct and/or otherwise cause treasury service computing platform 110 to update various records, including account history and/or transaction history records, maintained by treasury service computing platform 110 to reflect the exchange transaction being performed by treasury service cash handling device 140. Additionally or alternatively, the exchange transaction record generated by treasury service cash handling device 140 at step 244 may include some or all of the exchange information stored by treasury service cash handling device 140 at step 242 (e.g., based on the configuration settings for treasury service cash handling device 140 and/or other deployment parameters).

Figure 2L:
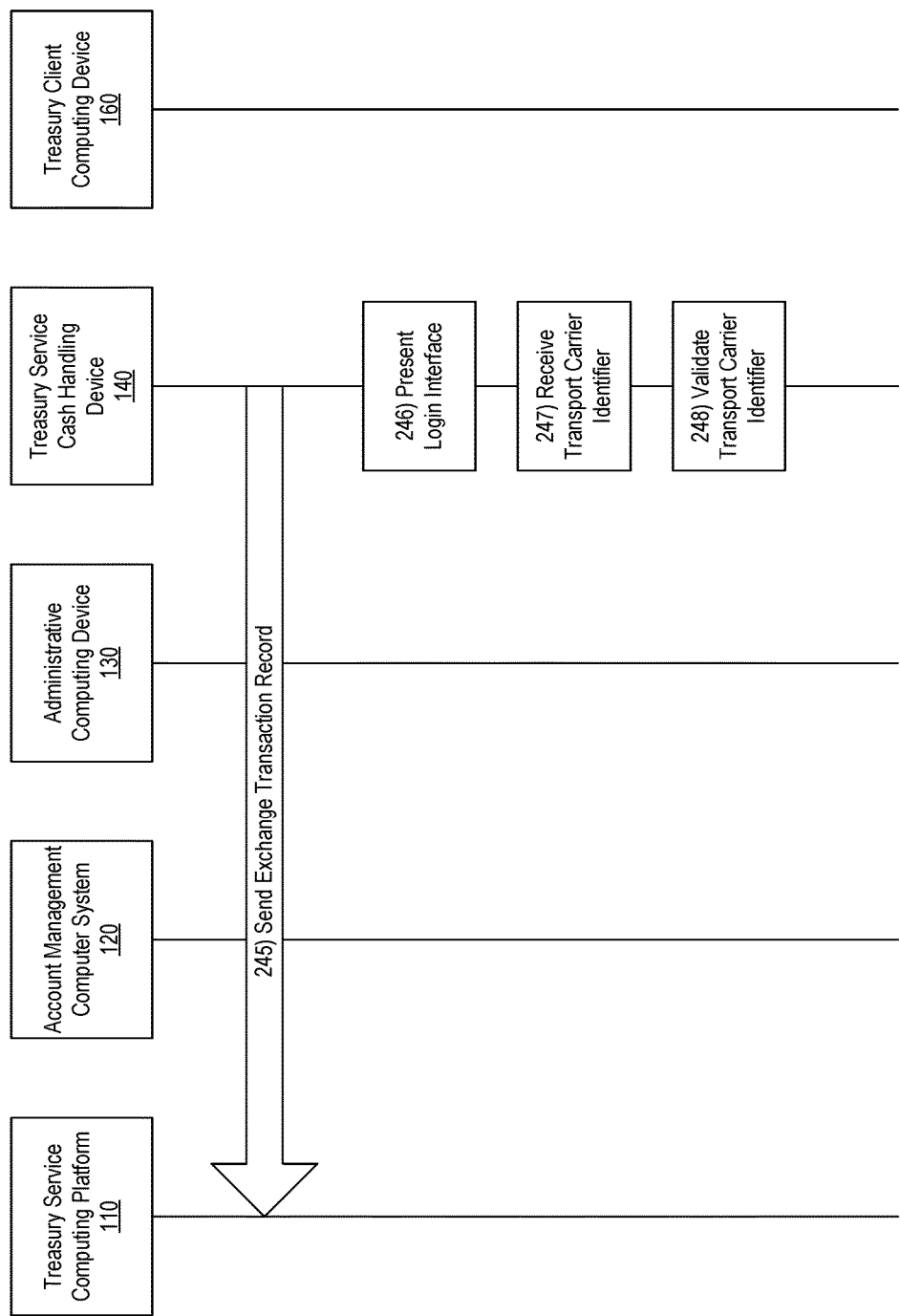

Referring to FIG. 2L, at step 245, treasury service cash handling device 140 may send the exchange transaction record to treasury service computing platform 110. For example, at step 245, treasury service cash handling device 140 may send, via the communication interface (e.g., communication interface 148), and to the at least one banking server (e.g., treasury service computing platform 110), the change order transaction record. Treasury service cash handling device 140 may, for instance, send the change order transaction record (which may, e.g., also be referred to as an "exchange transaction record") to treasury service computing platform 110 to facilitate the updating of one or more account history records in connection with the exchange, to facilitate the generation of one or more alerts, notifications, and/or reports, and/or to facilitate inventory monitoring and/or restocking of treasury service cash handling device 140. In some instances, in sending the exchange transaction record to treasury service computing platform 110, treasury service cash handling device 140 may send the exchange transaction record directly to treasury service computing platform 110 (e.g., via a connection established between treasury service computing platform 110 and treasury service cash handling device 140), while in other instances, in sending the exchange transaction record to treasury service computing platform 110, treasury service cash handling device 140 may send the exchange transaction record to treasury service computing platform 110 via treasury device support server 150. For instance, treasury service cash handling device 140 may send the exchange transaction record to treasury device support server 150, which in turn may send the exchange transaction record to treasury service computing platform 110.

After sending the exchange transaction record to treasury service computing platform 110, treasury service cash handling device 140 may repeat one or more steps of the example event sequence discussed above, for instance, to perform additional deposit transactions and/or change order transactions. Additionally or alternatively, treasury service cash handling device 140 may perform other transactions, such as withdrawal transactions, inquiry transactions, and/or other transactions. In addition to performing one or more additional transactions, treasury service cash handling device 140 also may perform a refill process (which may, e.g., also be referred to as a "restocking process") in which treasury service cash handling device 140 may authenticate a user associated with a transport carrier company, receive a refill, and/or update one or more counts and/or other records, among other things, as illustrated in greater detail below.

At step 246, treasury service cash handling device 140 may present a login interface. At step 247, treasury service cash handling device 140 may receive a transport carrier identifier. For example, at step 247, treasury service cash handling device 140 may receive user input that includes a transport carrier identifier associated with a transport company and/or an authorized user associated with such a transport company (which may, e.g., be an organization with which a financial institution operating treasury service cash handling device 140 and/or treasury service computing platform 110 has contracted to physically visit, load, unload, and/or refill one or more cash handling devices with currency and/or other items). At step 248, treasury service cash handling device 140 may validate the transport carrier identifier received at step 247.

Figure 2M:
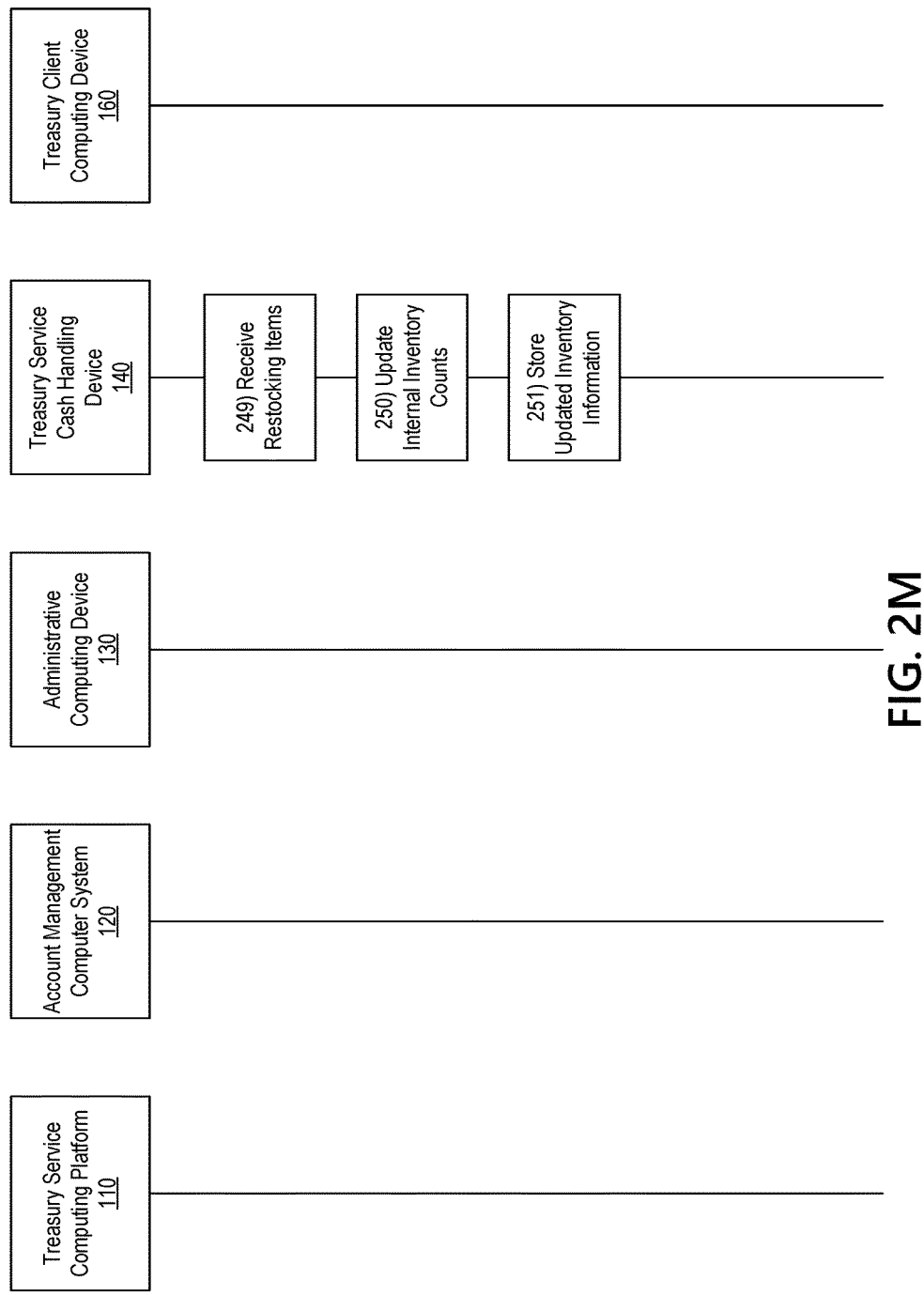

Referring to FIG. 2M, at step 249, treasury service cash handling device 140 may receive one or more restocking items. For example, at step 249, treasury service cash handling device 140 may receive one or more refilled cartridges having currency notes, rolls of coins, and/or the like. Such restocking items may, for instance, be processed and/or organized by the internal storage and transport systems of treasury service cash handling device 140 (which may, e.g., utilize one or more rollers, belts, cartridges, and/or other components to organize and/or store currency within treasury service cash handling device 140 and/or for use by treasury service cash handling device 140). At step 250, treasury service cash handling device 140 may update one or more internal inventory counts. At step 251, treasury service cash handling device 140 may store updated inventory information.

FIGS. 3A-3H depict another illustrative event sequence for utilizing cash handling devices to provide treasury functions and implementing a computing platform to control a plurality of cash handling devices in accordance with one or more example embodiments. As discussed in greater detail below, the event sequence shown in FIGS. 3A-3H illustrates, among other things, how a server, such as treasury service computing platform 110, may receive aggregated activity information from various cash handling devices, process deposit transactions, generate alerts for clients, transport companies, and/or other entities, monitor currency levels at various cash handling devices, provide portal interfaces and/or reports to client devices, and/or perform other functions.

Figure 3A:
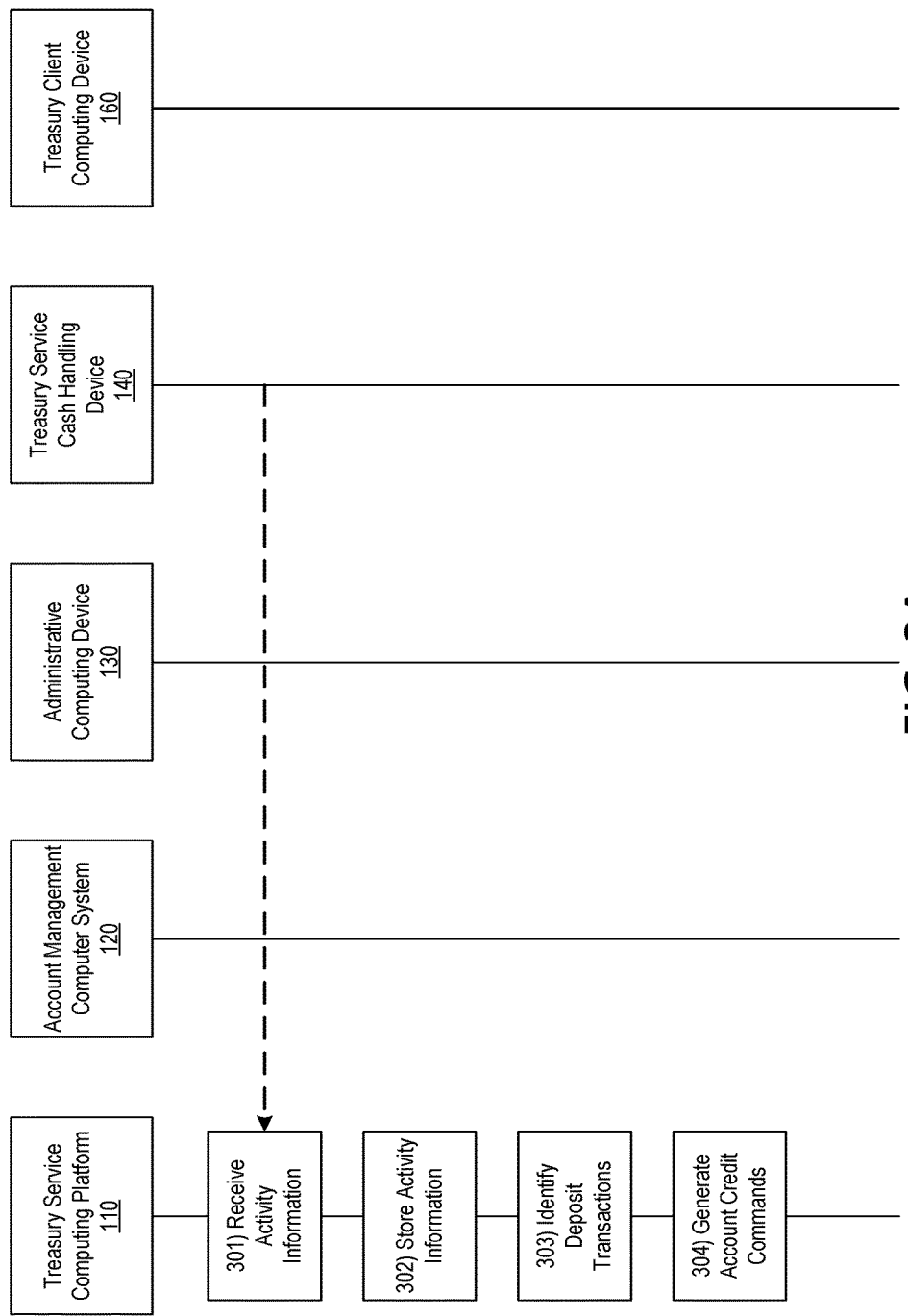

Referring to FIG. 3A, at step 301, treasury service computing platform 110 may receive activity information (e.g., from treasury service cash handling device 140, from one or more other cash handling devices, from treasury device support server 150, from one or more other servers or devices). For example, at step 301, treasury service computing platform 110 may receive, via the communication interface (e.g., communication interface 115), and from one or more cash handling devices (e.g., treasury service cash handling device 140), aggregated activity information comprising a plurality of transaction records. For instance, treasury service computing platform 110 may receive transaction records identifying each transaction performed at treasury service cash handling device 140, which user performed the particular transaction, the amount of funds involved in the particular transaction, the type of the particular transaction (e.g., deposit, change order, withdrawal, and/or the like), the time the particular transaction was performed, the machine on which the particular transaction was performed, and/or other information. The aggregated activity information received by treasury service computing platform 110 at step 301 may include transactions records from treasury service cash handling device 140 and/or one or more other cash handling devices, which may be located at one or more different locations than the location at which treasury service cash handling device 140 is located. In some instances, treasury service computing platform 110 may receive aggregated activity information directly from treasury service cash handling device 140 and/or one or more other cash handling devices, while in other instances, treasury service computing platform 110 may receive the aggregated activity information from treasury device support server 150 (which may, e.g., receive and/or aggregate activity information from a plurality of cash handling devices, including treasury service cash handling device 140).

In some embodiments, the plurality of transaction records received from the one or more cash handling devices may include information identifying, for each transaction, a specific user who performed the transaction, an amount of currency involved in the transaction, a time at which the transaction occurred, and a specific cash handling device on which the transaction was performed. For example, the plurality of transaction records received by treasury service computing platform 110 from the one or more cash handling devices (e.g., treasury service cash handling device 140) may include information identifying, for each transaction, a specific user who performed the transaction, an amount of currency involved in the transaction, a time at which the transaction occurred, and a specific cash handling device on which the transaction was performed. In some instances, a transaction record may additionally or alternatively identify the type of transaction that was performed, as well as other information about the transaction, such as one or more denominations of currency received by the cash handling device, one or more quantities of specific denominations of currency received by the cash handling device, a time at which the deposit transaction was completed, a user that performed the deposit transaction, a quantity of deposit items rejected, and one or more destination accounts into which currency was deposited, as discussed above.

In some embodiments, receiving the aggregated activity information may include: receiving, via the communication interface, and from a first cash handling device of the one or more cash handling devices, first activity information comprising a first plurality of transaction records associated with transactions performed by the first cash handling device; and receiving, via the communication interface, and from a second cash handling device of the one or more cash handling devices, second activity information comprising a second plurality of transaction records associated with transaction performed by the second cash handling device. For example, in receiving the aggregated activity information, treasury service computing platform 110 may receive, via the communication interface (e.g., communication interface 115), and from a first cash handling device of the one or more cash handling devices (e.g., treasury service cash handling device 140), first activity information comprising a first plurality of transaction records associated with transactions performed by the first cash handling device. In addition, treasury service computing platform 110 may receive, via the communication interface (e.g., communication interface 115), and from a second cash handling device of the one or more cash handling devices (e.g., a cash handling device different from treasury service cash handling device 140), second activity information comprising a second plurality of transaction records associated with transaction performed by the second cash handling device. In some instances, the first cash handling device may be located at a first deployment location, and the second cash handling device may be located at a second deployment location different from the first deployment location. In some instances, the first deployment location may be a retail banking center operated by a financial institution, and the second deployment location may be a shopping mall in which a plurality of retailers operate retail stores.

At step 302, treasury service computing platform 110 may store the activity information received at step 301. For example, treasury service computing platform 110 may store the aggregated activity information in treasury service database 114. At step 303, treasury service computing platform 110 may identify one or more deposit transactions (e.g., based on the activity information received at step 301). For example, at step 303, treasury service computing platform 110 may identify one or more deposit transactions based on the aggregated activity information comprising the plurality of transaction records received from the one or more cash handling devices (e.g., treasury service cash handling device 140).

At step 304, treasury service computing platform 110 may generate one or more account credit commands (e.g., based on identifying the one or more deposit transactions at step 303). For example, at step 304, based on identifying the one or more deposit transactions based on the aggregated activity information comprising the plurality of transaction records received from the one or more cash handling devices (e.g., treasury service cash handling device 140), treasury service computing platform 110 may generate one or more account credit commands, the one or more account credit commands directing at least one account management computer system (e.g., account management computer system 120) to apply one or more provisional credits to one or more treasury accounts associated with the one or more deposit transactions.

Figure 3B:
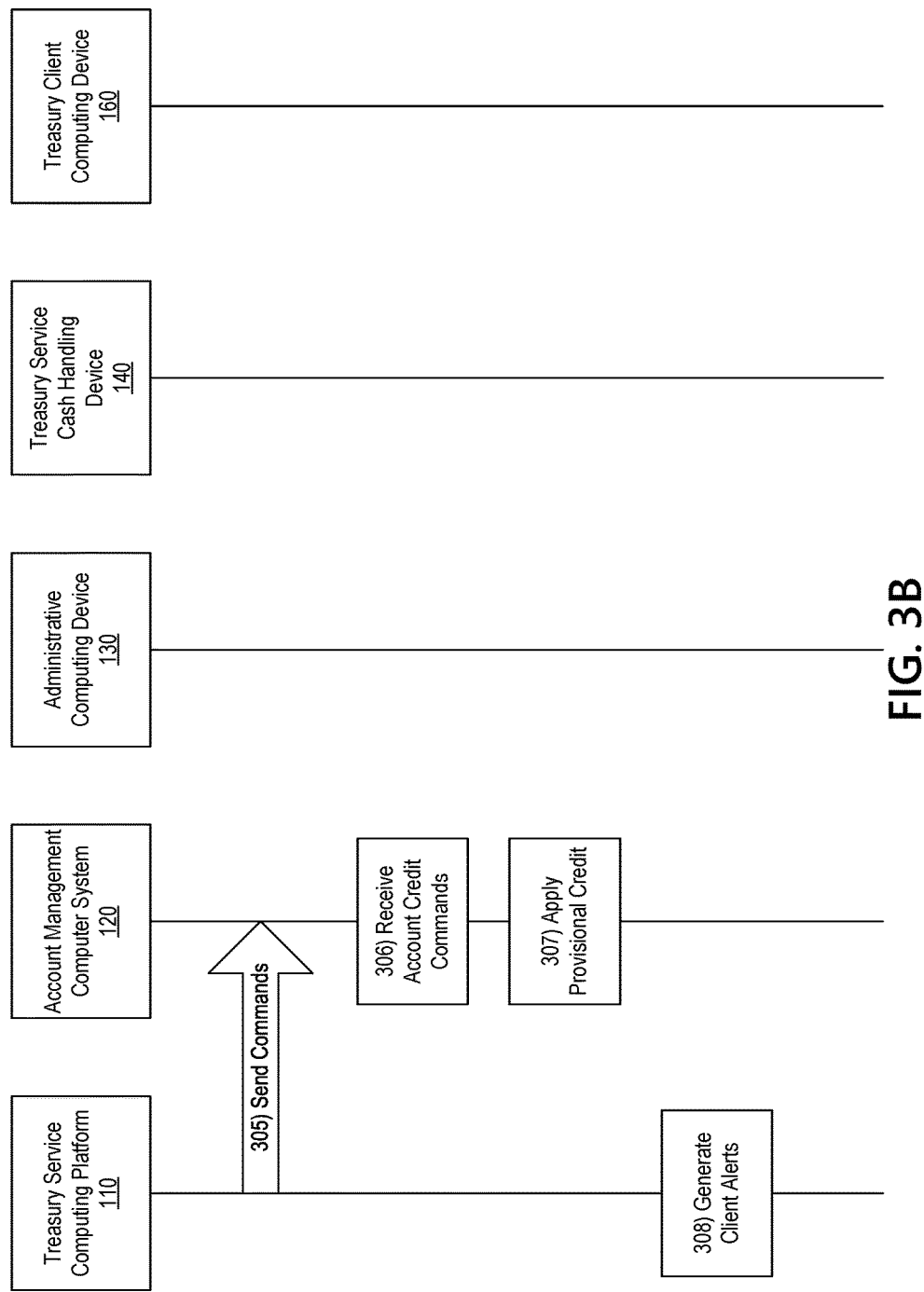

Referring to FIG. 3B, at step 305, treasury service computing platform 110 may send the one or more account credit commands to account management computer system 120. For example, at step 305, treasury service computing platform 110 may send, via the communication interface (e.g., communication interface 115), to the at least one account management computer system (e.g., account management computer system 120), the one or more account credit commands directing the at least one account management computer system (e.g., account management computer system 120) to apply the one or more provisional credits to the one or more treasury accounts associated with the one or more deposit transactions. For instance, in this way, treasury service computing platform 110 may control, direct, and/or otherwise cause account management computer system 120 to provisionally credit corresponding treasury client accounts maintained by the financial institution operating treasury service computing platform 110 and/or treasury service cash handling device 140.

At step 306, account management computer system 120 may receive the one or more account credit commands from treasury service computing platform 110. At step 307, account management computer system 120 may apply one or more provisional credits based on the one or more account credit commands received from treasury service computing platform 110. For example, account management computer system 120 may update one or more account records to provisionally credit one or more specific accounts based on the account credit commands received from treasury service computing platform 110.

As illustrated in greater detail below, treasury service computing platform 110 also may generate and/or send various alerts to client computing devices, such as treasury client computing device 160, based on specific transactions exceeding specific alert thresholds, based on specific transactions occurring or not occurring, and/or based on other factors and/or circumstances. In some instances, treasury service computing platform 110 may generate one or more alerts based on messages received from treasury device support server 150 (e.g., a mid-day message indicating that an expected deposit or exchange has not occurred by a particular time, such as an expected deposit from a particular client by 2:30 pm).

At step 308, treasury service computing platform 110 may generate one or more client alerts (e.g., based on the activity information received at step 301). For example, at step 308, treasury service computing platform 110 may generate a client alert message based on the aggregated activity information comprising the plurality of transaction records received from the one or more cash handling devices (e.g., treasury service cash handling device 140).

Figure 3C:
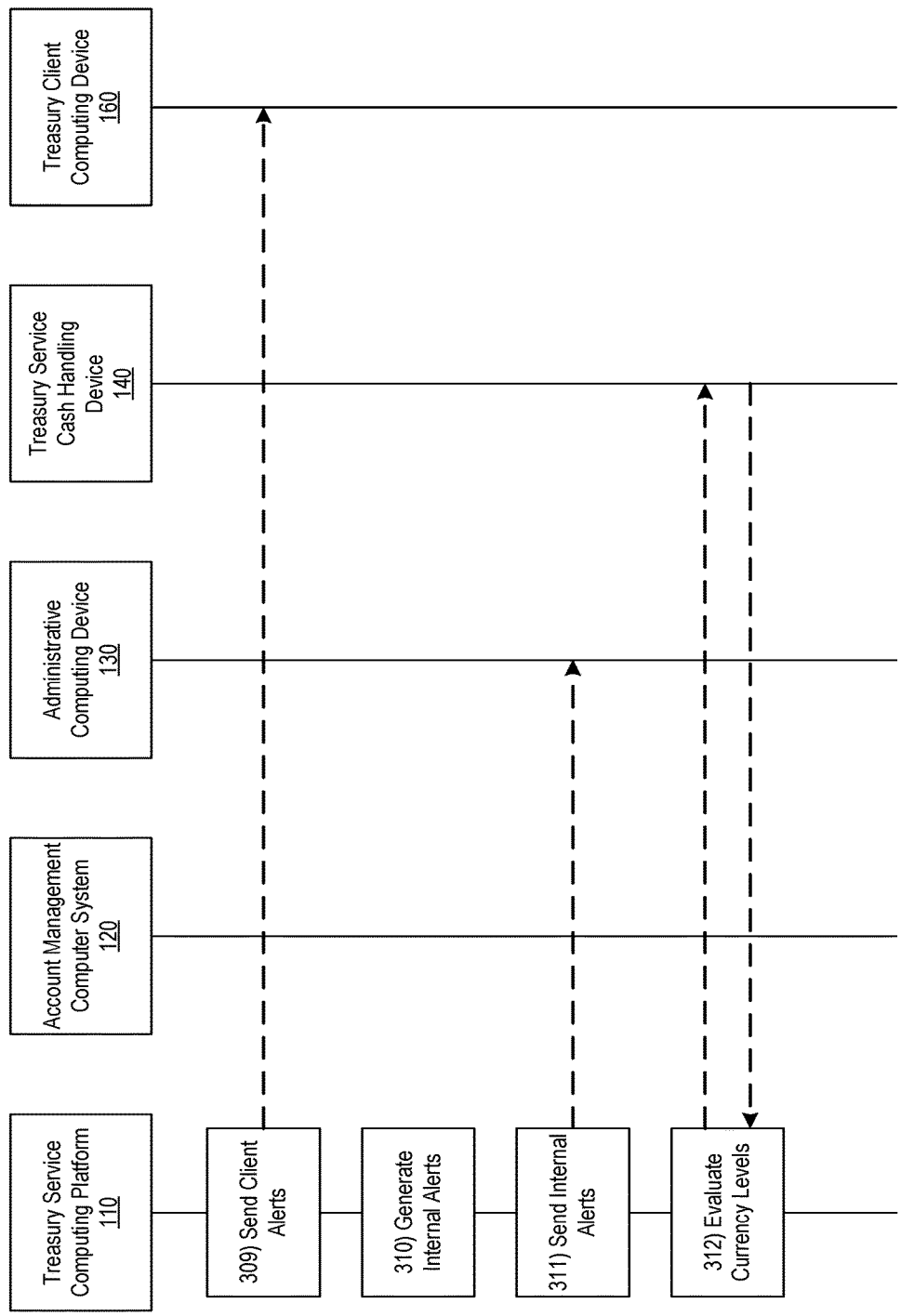

Referring to FIG. 3C, at step 309, treasury service computing platform 110 may send one or more client alerts (e.g., to treasury client computing device 160 and/or to one or more other client computing devices, based on one or more configuration settings stored by treasury service computing platform 110 and/or specific to one or more treasury clients). For example, at step 309, treasury service computing platform 110 may send, via the communication interface (e.g., communication interface 115), to a client computing device (e.g., treasury client computing device 160), the client alert message generated based on the aggregated activity information comprising the plurality of transaction records received from the one or more cash handling devices (e.g., treasury service cash handling device 140).

At step 310, treasury service computing platform 110 may generate one or more internal alerts (e.g., based on the activity information received at step 301). For example, at step 310, treasury service computing platform 110 may generate an internal alert message based on the aggregated activity information comprising the plurality of transaction records received from the one or more cash handling devices (e.g., treasury service cash handling device 140). Such an internal alert message may, for instance, include information identifying attempts to deposit more than a permitted maximum amount, information identifying rejected notes (which may, e.g., have been rejected by treasury service cash handling device 140 in connection with a particular transaction), and/or information identifying other circumstances and/or issues exceeding one or more internal alert thresholds.

At step 311, treasury service computing platform 110 may send the one or more internal alerts (e.g., to administrative computing device 130 and/or one or more other computing devices associated with the organization operating treasury service computing platform 110). For example, at step 311, treasury service computing platform 110 may send, via the communication interface (e.g., communication interface 115), to an administrative computing device (e.g., administrative computing device 130), the internal alert message generated based on the aggregated activity information comprising the plurality of transaction records received from the one or more cash handling devices (e.g., treasury service cash handling device 140). For instance, treasury service computing platform 110 may send such an alert message to administrative computing device 130 and/or one or more devices internal to the financial institution operating treasury service computing platform 110 based on one or more configuration settings. For example, different alerts associated with different clients may be directed to different financial institution devices and/or users who may support and/or serve those specific clients.

At step 312, treasury service computing platform 110 may evaluate one or more currency levels of one or more cash handling devices (e.g., treasury service cash handling device 140 and/or one or more other cash handling devices). For example, at step 312, treasury service computing platform 110 may evaluate a currency level indicative of an amount of currency stored in a first cash handling device of the one or more cash handling devices (e.g., treasury service cash handling device 140). For instance, treasury service computing platform 110 may evaluate current currency levels to identify expected and/or urgent restocking needs, so as to identify, prevent, and/or correct shortfalls in currency inventory at the one or more cash handling devices (e.g., treasury service cash handling device 140). Treasury service computing platform 110 may, for instance, evaluate currency levels for a plurality of cash handling devices at various locations, including treasury service cash handling device 140.

Referring to FIG. 3D, at step 313, treasury service computing platform 110 may identify one or more restocking needs (e.g., based on evaluating the one or more currency levels of the one or more cash handling devices at step 312). For example, at step 313, treasury service computing platform 110 may identify a restocking need based on evaluating the currency level indicative of the amount of currency stored in the first cash handling device of the one or more cash handling devices (e.g., treasury service cash handling device 140). Treasury service computing platform 110 may identify such a restocking need, for instance, by forecasting usage of treasury service cash handling device 140 and comparing future/expected currency requirements for treasury service cash handling device 140 to current currency levels of treasury service cash handling device 140.

At step 314, treasury service computing platform 110 may generate one or more restocking requests (e.g., based on identifying the one or more restocking needs at step 313 for various cash handling devices, including treasury service cash handling device 140). For example, at step 314, based on identifying the restocking need, treasury service computing platform 110 may generate a restocking request, and the restocking request may direct a transport agent to restock the first cash handling device of the one or more cash handling devices (e.g., treasury service cash handling device 140).

At step 315, treasury service computing platform 110 may send the one or more restocking requests (e.g., to transport carrier computer system 170 and/or one or more other transport carrier devices). For example, at step 315, treasury service computing platform 110 may send, via the communication interface (e.g., communication interface 115), to a transport computer system (e.g., transport carrier computer system 170), the restocking request directing the transport agent to restock the first cash handling device of the one or more cash handling devices (e.g., treasury service cash handling device 140). For instance, treasury service computing platform 110 may send one or more non-urgent (e.g., scheduled) requests and/or one or more urgent (e.g., unscheduled) requests to transport carrier computer system 170 to restock specific cash handling devices, such as treasury service cash handling device 140, so as to direct and/or control one or more armored transport carrier vehicles and/or a transport carrier company to visit and physically restock one or more specific cash handling devices, such as treasury service cash handling device 140.

As illustrated in greater detail below, treasury service computing platform 110 also may provide one or more management interfaces to one or more administrative devices (e.g., administrative computing device 130) and/or administrative users (who may, e.g., be associated with the financial institution operating treasury service computing platform 110 and/or treasury service cash handling device 140). Such management interfaces may, for instance, allow an administrative user to update various settings, including bank-imposed and/or compliance-imposed transaction limits, alerts, and/or other settings. In addition, treasury service computing platform 110 may update one or more cash handling devices, such as treasury service cash handling device 140, and/or support servers, such as treasury device support server 150, in accordance with the settings and/or any changes to the settings.

At step 316, treasury service computing platform 110 may receive a request for one or more administrative interfaces (e.g., from administrative computing device 130). For example, at step 316, treasury service computing platform 110 may receive, via the communication interface (e.g., communication interface 115), from an administrative computing device (e.g., administrative computing device 130), a request for an administrative portal.

Figure 3E:
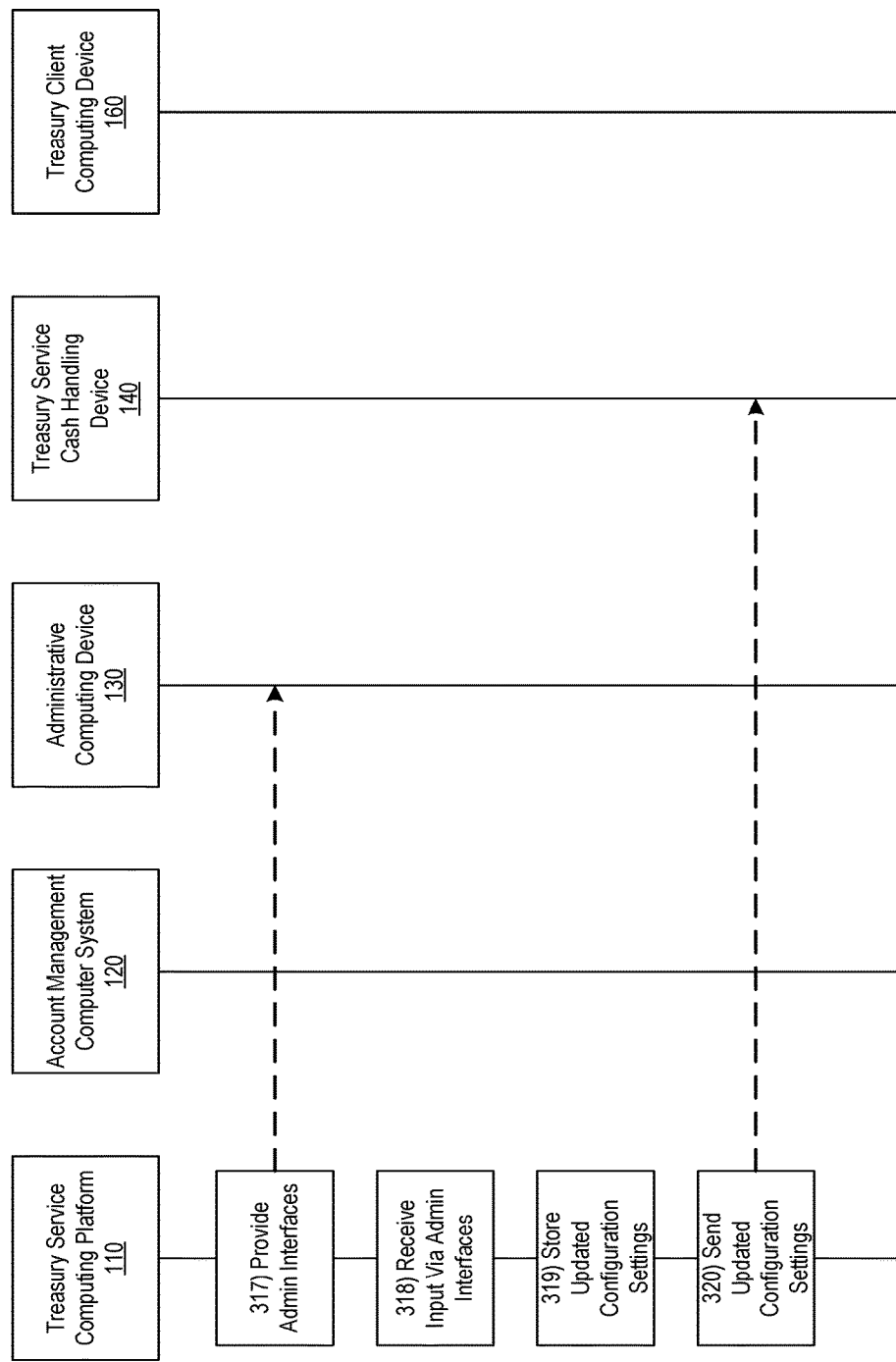

Referring to FIG. 3E, at step 317, treasury service computing platform 110 may provide one or more administrative interfaces (e.g., to administrative computing device 130). For example, at step 317, based on receiving the request for the administrative portal, treasury service computing platform 110 may provide, via the communication interface (e.g., communication interface), to the administrative computing device (e.g., administrative computing device 130), at least one administrative interface.

Figure 8:
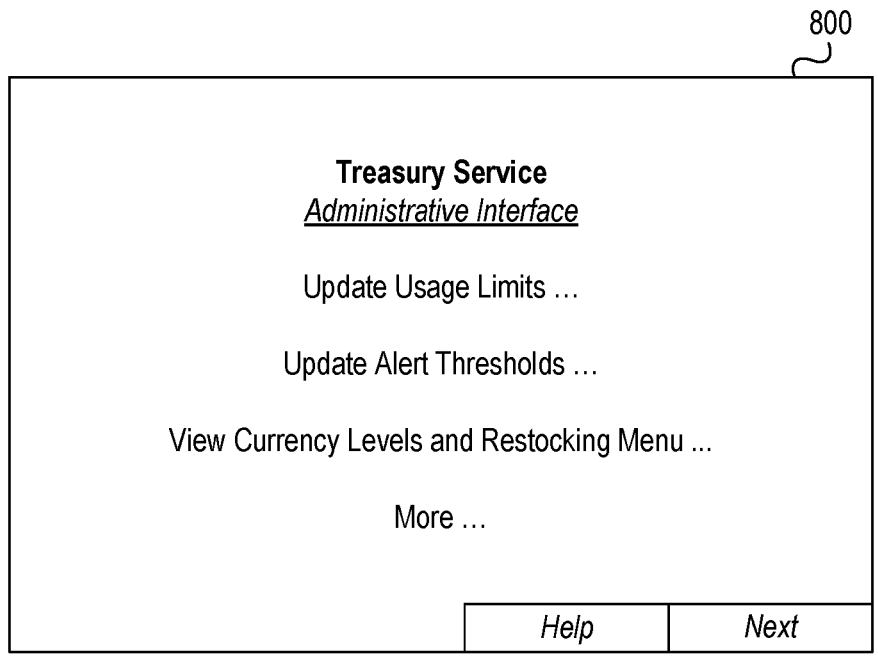
Figure 9:
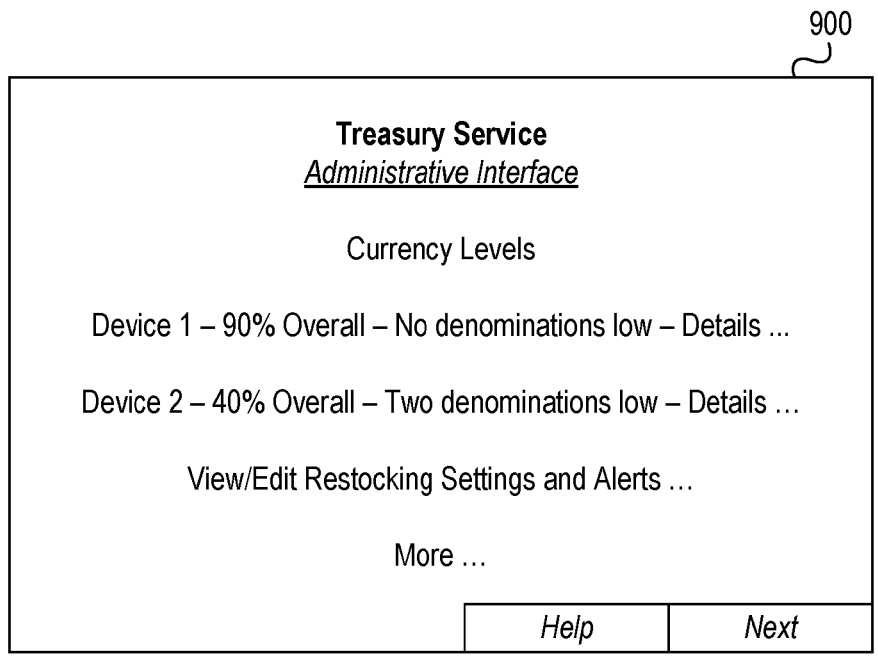

For example, in providing the one or more administrative interfaces to administrative computing device 130, treasury service computing platform 110 may cause, control, and/or direct administrative computing device 130 to display and/or otherwise present a graphical user interface similar to graphical user interface 800, which is illustrated in FIG. 8. As seen in FIG. 8, graphical user interface 800 may include one or more user interface controls and/or other elements that may enable a user of administrative computing device 130 interacting with graphical user interface 800 to update various settings, including usage limit settings, alert threshold settings, and/or other settings, and/or may enable a user of administrative computing device 130 interacting with graphical user interface 800 to access a menu providing access to information and controls over cash handling device currency levels and restocking functions. Additionally or alternatively, in providing the one or more administrative interfaces to administrative computing device 130, treasury service computing platform 110 may cause, control, and/or direct administrative computing device 130 to display and/or otherwise present a graphical user interface similar to graphical user interface 900, which is illustrated in FIG. 9. As seen in FIG. 9, graphical user interface 900 may include one or more user interface controls and/or other elements that may enable a user of administrative computing device 130 interacting with graphical user interface 900 to view currency levels at various cash handling devices, view and/or edit restocking settings and alerts, and/or access and/or control other information.

At step 318, treasury service computing platform 110 may receive input via the one or more administrative interfaces. For example, at step 318, treasury service computing platform 110 may receive, via the communication interface (e.g., communication interface 115), from the administrative computing device (e.g., administrative computing device 130), configuration input defining one or more configuration settings for at least one cash handling device of the one or more cash handling devices (e.g., treasury service cash handling device 140), and the configuration input may have been received by the administrative computing device (e.g., administrative computing device 130) via the at least one administrative interface (which may, e.g., have been provided to administrative computing device 130 by treasury service computing platform 110 at step 317).

At step 319, treasury service computing platform 110 may store one or more updated configuration settings for one or more cash handling devices (e.g., based on the input received via the one or more administrative interfaces at step 318). At step 320, treasury service computing platform 110 may send the one or more updated configuration settings to the one or more cash handling devices (e.g., to treasury service cash handling device 140 and/or to one or more other cash handling devices). For example, at step 320, treasury service computing platform 110 may send, via the communication interface (e.g., communication interface 115), and to the at least one cash handling device of the one or more cash handling devices (e.g., treasury service cash handling device 140), configuration information directing the at least one cash handling device of the one or more cash handling devices (e.g., treasury service cash handling device 140) to implement the one or more configuration settings. In some instances, treasury service computing platform 110 may send the configuration information directly to treasury service cash handling device 140 and/or one or more other cash handling devices, while in other instances, treasury service computing platform 110 may send such configuration information to treasury service cash handling device 140 and/or one or more other cash handling devices via treasury device support server 150.

As illustrated in greater detail below, treasury service computing platform 110 also may provide one or more client portal interfaces to one or more client devices (e.g., treasury client computing device 160) and/or one or more client users (who may, e.g., be employees and/or agents of one or more treasury clients of a financial institution operating treasury service computing platform 110 and/or treasury service cash handling device 140). Such client portal interfaces may, for instance, allow a client user to define and/or update one or more client-specific settings, such as client-specific transaction limit settings, alert settings (e.g., mid-day alerts if no transactions are made by certain stores), user settings, and/or other settings. In addition, treasury service computing platform 110 may update one or more cash handling devices, such as treasury service cash handling device 140, and/or support servers, such as treasury device support server 150, in accordance with the settings and/or any changes to the settings.

Figure 3F:
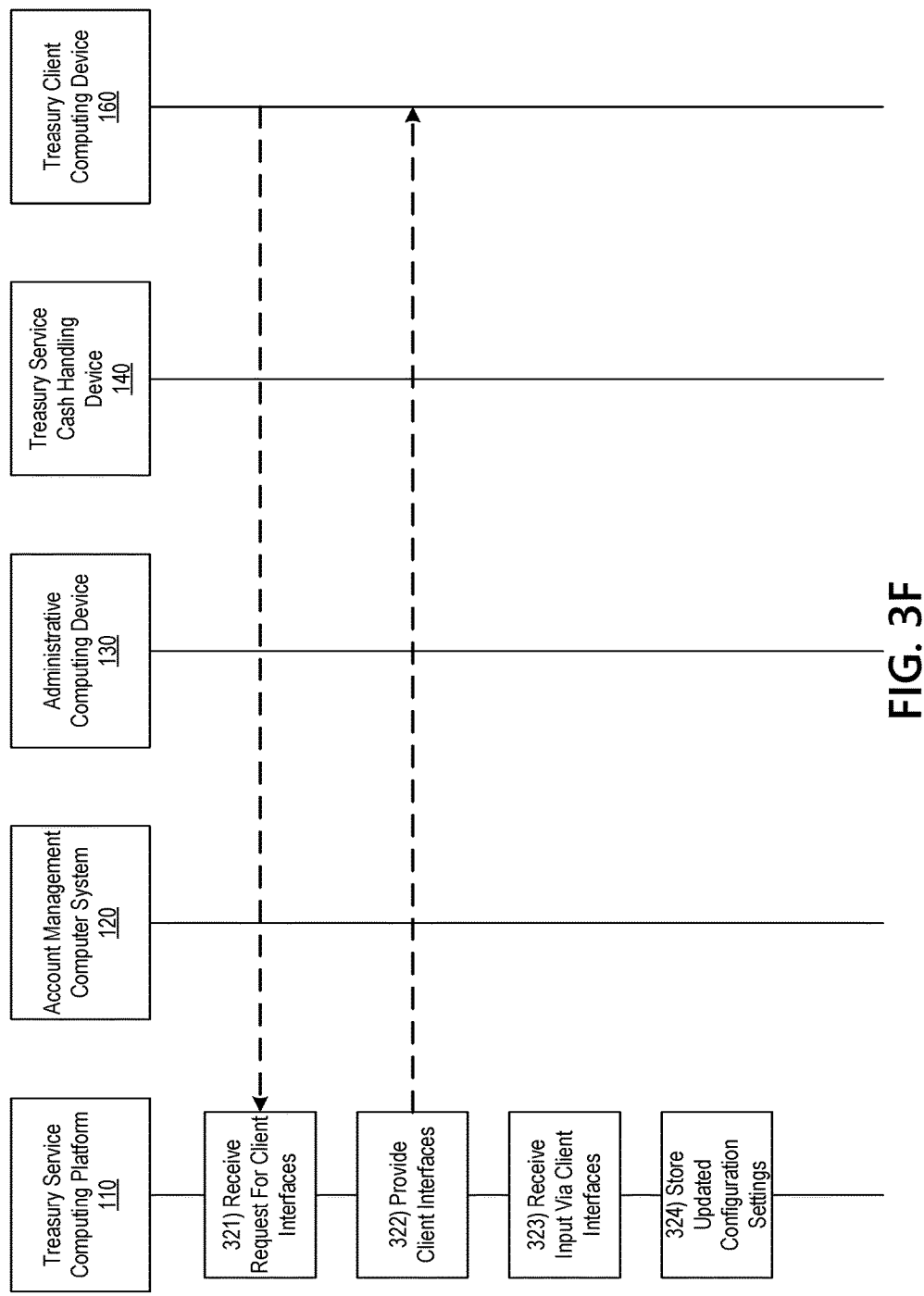

Referring to FIG. 3F, at step 321, treasury service computing platform 110 may receive a request for one or more client management interfaces (e.g., from treasury client computing device 160). For example, at step 321, treasury service computing platform 110 may receive, via the communication interface (e.g., communication interface), from a client computing device (e.g., treasury client computing device 160), a request for a client management portal.

At step 322, treasury service computing platform 110 may provide one or more client management interfaces (e.g., to treasury client computing device 160, based on receiving the request for the one or more client management interfaces at step 321). For example, at step 322, based on receiving the request for the client management portal, treasury service computing platform 110 may provide, via the communication interface (e.g., communication interface 115), to the client computing device (e.g., treasury client computing device 160), at least one client management interface.

Figure 10:
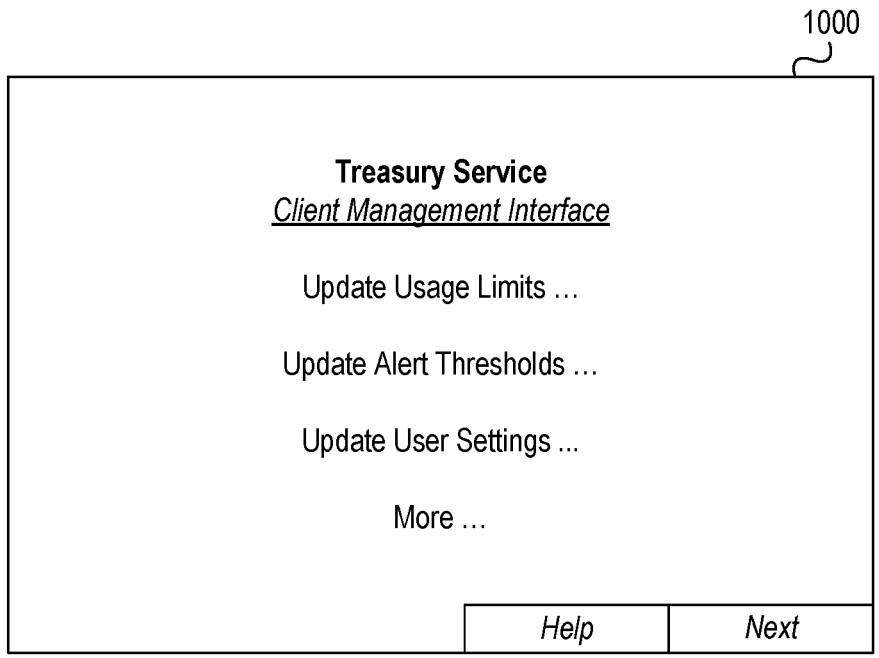

For example, in providing the at least one client management interface to treasury client computing device 160, treasury service computing platform 110 may cause, control, and/or direct treasury client computing device 160 to display and/or otherwise present a graphical user interface similar to graphical user interface 1000, which is illustrated in FIG. 10. As seen in FIG.

Figure 11:
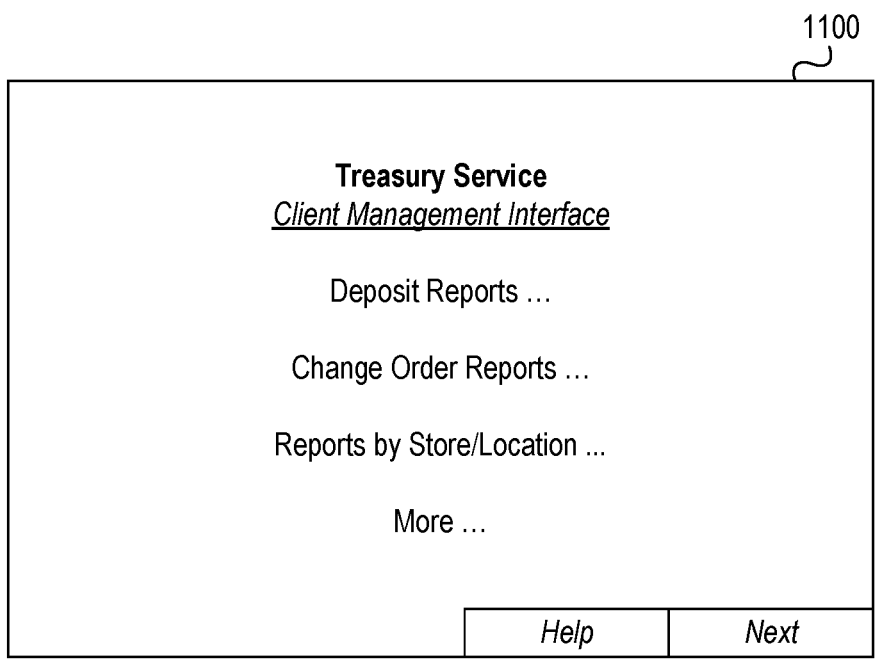

10, graphical user interface 1000 may include one or more user interface controls and/or other elements that may enable a user of treasury client computing device 160 interacting with graphical user interface 1000 to define and/or update one or more client-specific settings for various cash handling devices, such as client-specific usage limit settings, alert threshold settings, user settings, and/or other settings. Additionally or alternatively, in providing the at least one client management interface to treasury client computing device 160, treasury service computing platform 110 may cause, control, and/or direct treasury client computing device 160 to display and/or otherwise present a graphical user interface similar to graphical user interface 1100, which is illustrated in FIG. 11. As seen in FIG. 11, graphical user interface 1100 may include one or more user interface controls and/or other elements that may enable a user of treasury client computing device 160 interacting with graphical user interface 1100 to view one or more reports generated by treasury service computing platform 110 based on cash handling device activity information, such as one or more deposit reports, change order reports, store/location reports, and/or other reports.

At step 323, treasury service computing platform 110 may receive input via the one or more client management interfaces. For example, at step 323, treasury service computing platform 110 may receive, via the communication interface (e.g., communication interface 115), from the client computing device (e.g., treasury client computing device 160), configuration input defining one or more configuration settings for at least one cash handling device of the one or more cash handling devices (e.g., treasury service cash handling device 140), and the configuration input may have been received by the client computing device (e.g., treasury client computing device 160) via the at least one client management interface (which may, e.g., have been provided to treasury client computing device 160 by treasury service computing platform 110 at step 322). At step 324, treasury service computing platform 110 may store one or more updated configuration settings for one or more cash handling devices (e.g., based on the input received via the one or more client management interfaces at step 323).

Figure 3G:
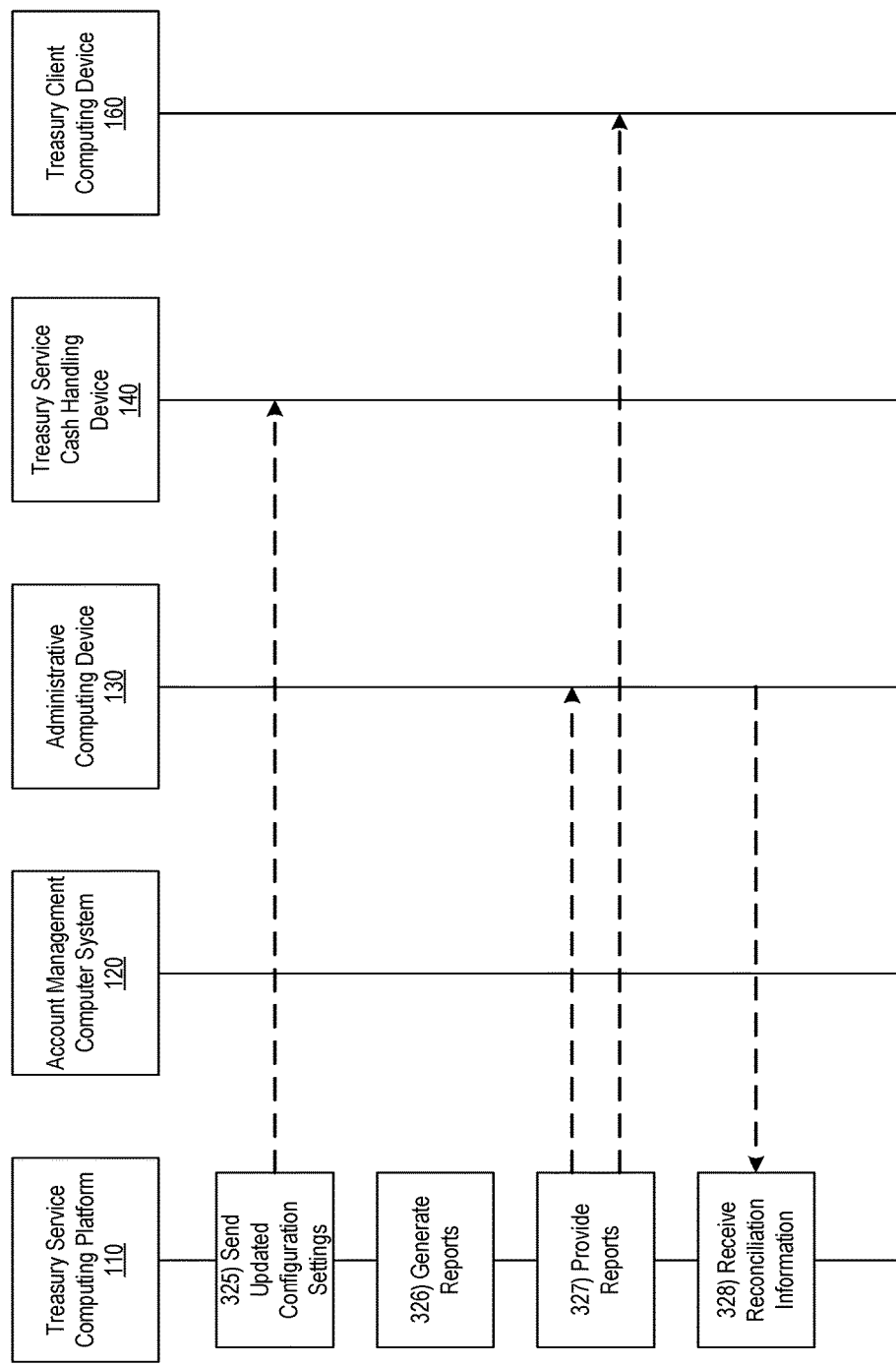

Referring to FIG. 3G, at step 325, treasury service computing platform 110 may send the one or more updated configuration settings to the one or more cash handling devices (e.g., to treasury service cash handling device 140 and/or to one or more other cash handling devices). For example, at step 325, treasury service computing platform 110 may send, via the communication interface (e.g., communication interface 115), and to the at least one cash handling device of the one or more cash handling devices (e.g., treasury service cash handling device 140), configuration information directing the at least one cash handling device of the one or more cash handling devices (e.g., treasury service cash handling device 140) to implement the one or more configuration settings. In some instances, treasury service computing platform 110 may send the configuration information directly to treasury service cash handling device 140 and/or one or more other cash handling devices, while in other instances, treasury service computing platform 110 may send such configuration information to treasury service cash handling device 140 and/or one or more other cash handling devices via treasury device support server 150.

As illustrated in greater detail below, treasury service computing platform 110 also may generate and/or send various reports (e.g., based on cash handling device activity information, via one or more interfaces, portals, email communications, and/or the like) to various users and/or devices (e.g., administrative computing device 130, treasury client computing device 160, and/or other devices). For example, treasury service computing platform 110 may generate one or more administrative reports and/or one or more client reports identifying what deposits and/or change orders were made, who made them, when they were made, what the denominational breakdown was, whether there were any rejected notes or unauthenticated notes, and/or other information. Additionally or alternatively, such reports (which may, e.g., be generated by treasury service computing platform 110) may include information about usage patterns and/or trends in when deposits and/or change orders are made. Treasury service computing platform 110 may, for instance, generate some reports specific to an administrative user (e.g., of administrative computing device 130) that may include information identifying when particular cash handling devices are busy and/or not busy, when a transport carrier restocked particular cash handling devices, whether any large deposits or large denomination deposits (which may, e.g., need to be reported for compliance purposes) occurred, and/or the like.

At step 326, treasury service computing platform 110 may generate one or more reports (e.g., based on the activity information received at step 301). For example, at step 326, treasury service computing platform 110 may generate one or more reports based on the aggregated activity information comprising the plurality of transaction records received from the one or more cash handling devices (e.g., treasury service cash handling device 140). At step 327, treasury service computing platform 110 may provide the one or more reports (e.g., to administrative computing device 130, treasury client computing device 160, and/or one or more other computing devices). For example, at step 327, treasury service computing platform 110 may provide, via the communication interface (e.g., communication interface 115), to at least one computing device (e.g., administrative computing device 130, treasury client computing device 160), the one or more reports generated based on the aggregated activity information comprising the plurality of transaction records received from the one or more cash handling devices (e.g., treasury service cash handling device 140).

Figure 12:
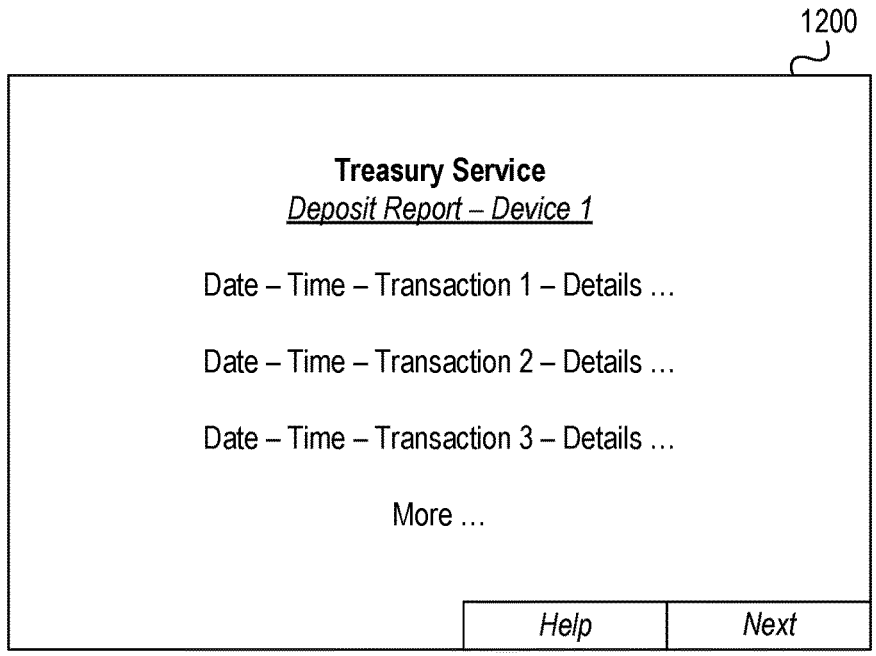

For example, in providing the one or more reports generated based on the aggregated activity information to administrative computing device 130 and/or treasury client computing device 160, treasury service computing platform 110 may cause, control, and/or direct administrative computing device 130 and/or treasury client computing device 160 to display and/or otherwise present a graphical user interface similar to graphical user interface 1200, which is illustrated in FIG. 12. As seen in FIG. 12, graphical user interface 1200 may include one or more user interface controls and/or other elements that may enable a user of administrative computing device 130 and/or treasury client computing device 160 interacting with graphical user interface 1200 to view, edit, and/or otherwise access information associated with one or more deposit transactions performed at a particular cash handling device (e.g., treasury service cash handling device 140).

Figure 13:
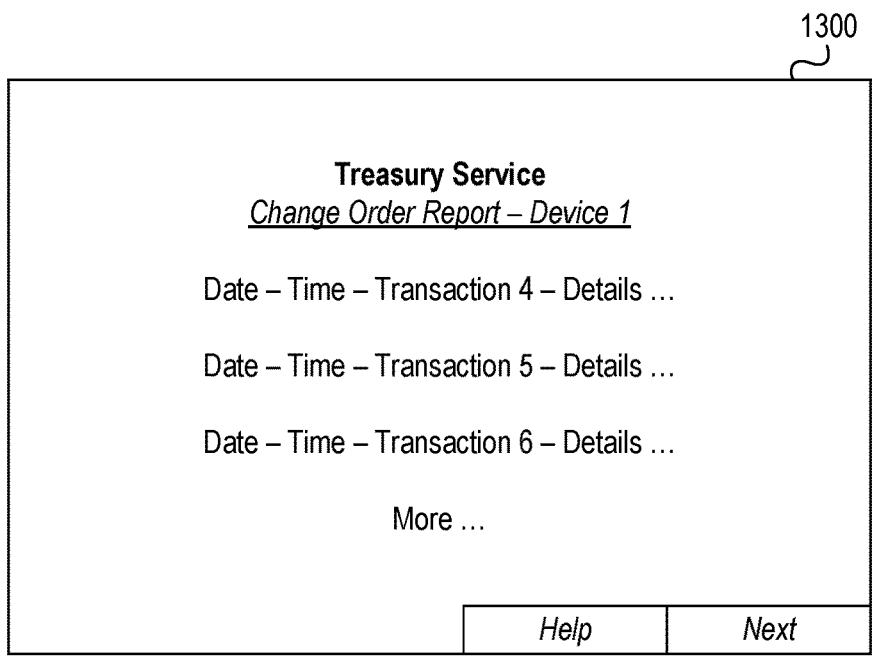

Additionally or alternatively, in providing the one or more reports generated based on the aggregated activity information to administrative computing device 130 and/or treasury client computing device 160, treasury service computing platform 110 may cause, control, and/or direct administrative computing device 130 and/or treasury client computing device 160 to display and/or otherwise present a graphical user interface similar to graphical user interface 1300, which is illustrated in FIG. 13. As seen in FIG. 13, graphical user interface 1300 may include one or more user interface controls and/or other elements that may enable a user of administrative computing device 130 and/or treasury client computing device 160 interacting with graphical user interface 1300 to view, edit, and/or otherwise access information associated with one or more change order transactions performed at a particular cash handling device (e.g., treasury service cash handling device 140).

As illustrated in greater detail below, after applying provisional credit to one or more accounts in connection with one or more deposit transactions, treasury service computing platform 110 may subsequently receive reconciliation information (e.g., from administrative computing device 130) based on deposits being physically counted and/or manually verified after being transported to and/or received by a financial institution operating treasury service computing platform 110 and/or treasury service cash handling device 140. Based on receiving such reconciliation information, treasury service computing platform 110 may, for instance, control and/or direct account management computer system 120 to convert one or more provisional credits into non-provisional credits and/or may revoke one or more previously applied provisional credits for non-verified funds.

At step 328, treasury service computing platform 110 may receive reconciliation information (e.g., from administrative computing device 130 and/or from one or more other computing devices). For example, at step 328, treasury service computing platform 110 may receive, via the communication interface (e.g., communication interface 115), from an administrative computing device (e.g., administrative computing device 130), reconciliation information associated with at least one deposit transaction completed at the one or more cash handling devices (e.g., treasury service cash handling device 140).

Figure 3H:
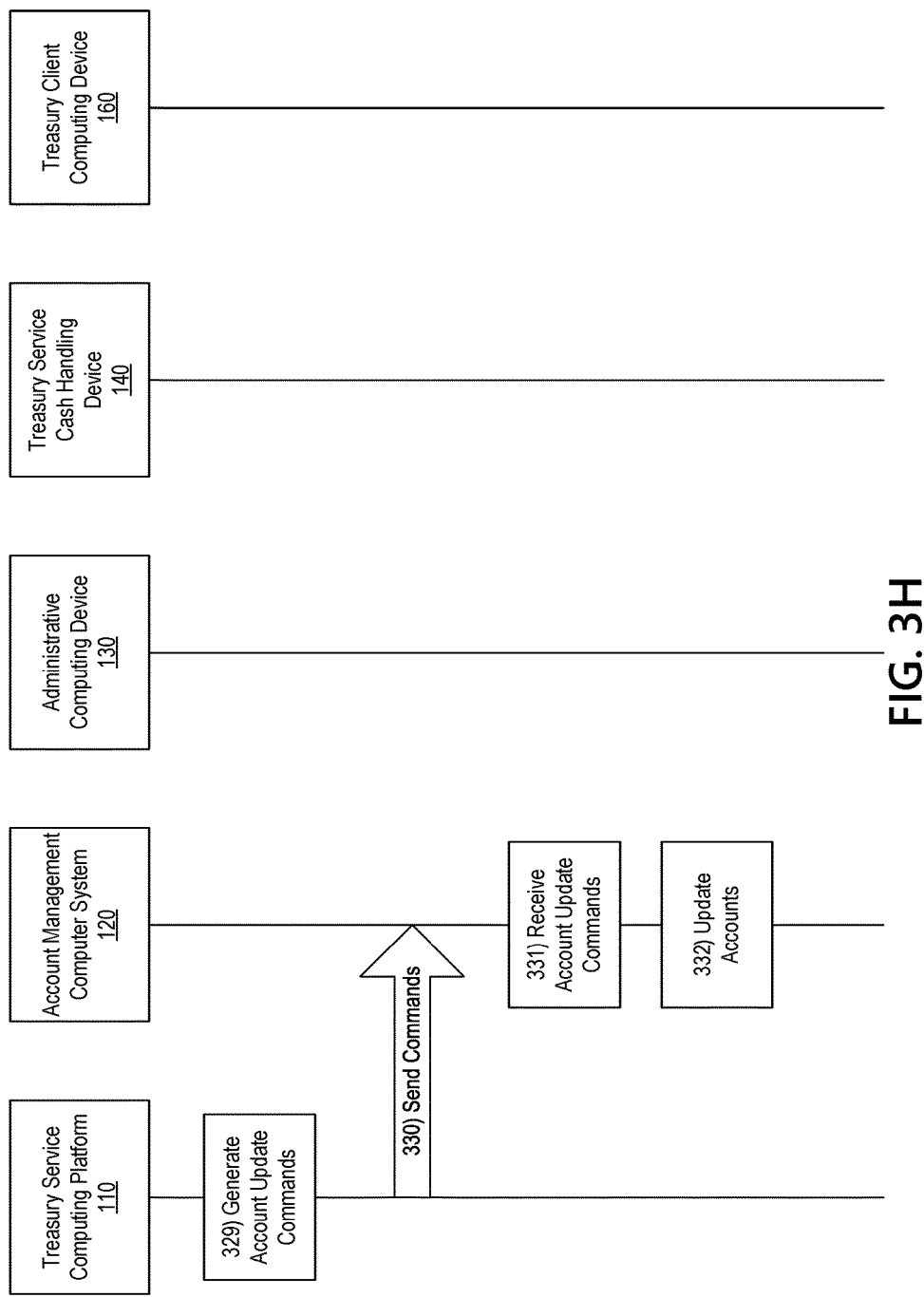

Referring to FIG. 3H, at step 329, treasury service computing platform 110 may generate one or more account update commands (e.g., based on the reconciliation information received at step 328). For example, at step 329, based on receiving the reconciliation information associated with the at least one deposit transaction completed at the one or more cash handling devices (e.g., treasury service cash handling device 140), treasury service computing platform 110 may generate one or more account update commands, the one or more account update commands directing the at least one account management computer system (e.g., account management computer system 120) to convert at least one previously-applied provisional credit to non-provisional credit.

At step 330, treasury service computing platform 110 may send the one or more account update commands to account management computer system 120. For example, at step 330, treasury service computing platform 110 may send, via the communication interface (e.g., communication interface 115), to the at least one account management computer system (e.g., account management computer system 120), the one or more account update commands directing the at least one account management computer system (e.g., account management computer system 120) to convert the at least one previously-applied provisional credit to non-provisional credit. For instance, in this way, treasury service computing platform 110 may control, direct, and/or otherwise cause account management computer system 120 to convert one or more previously applied provisional credits into non-provisional credits (e.g., for verified funds) and/or revoke one or more previously applied provisional credits (e.g., for non-verified funds).

At step 331, account management computer system 120 may receive the one or more account update commands from treasury service computing platform 110. At step 332, account management computer system 120 may update one or more accounts (e.g., based on the one or more account update commands received from treasury service computing platform 110). For example, at step 332, account management computer system 120 may update one or more specific accounts based on the one or more account credit commands received from treasury service computing platform 110 at step 331.

Figure 14:
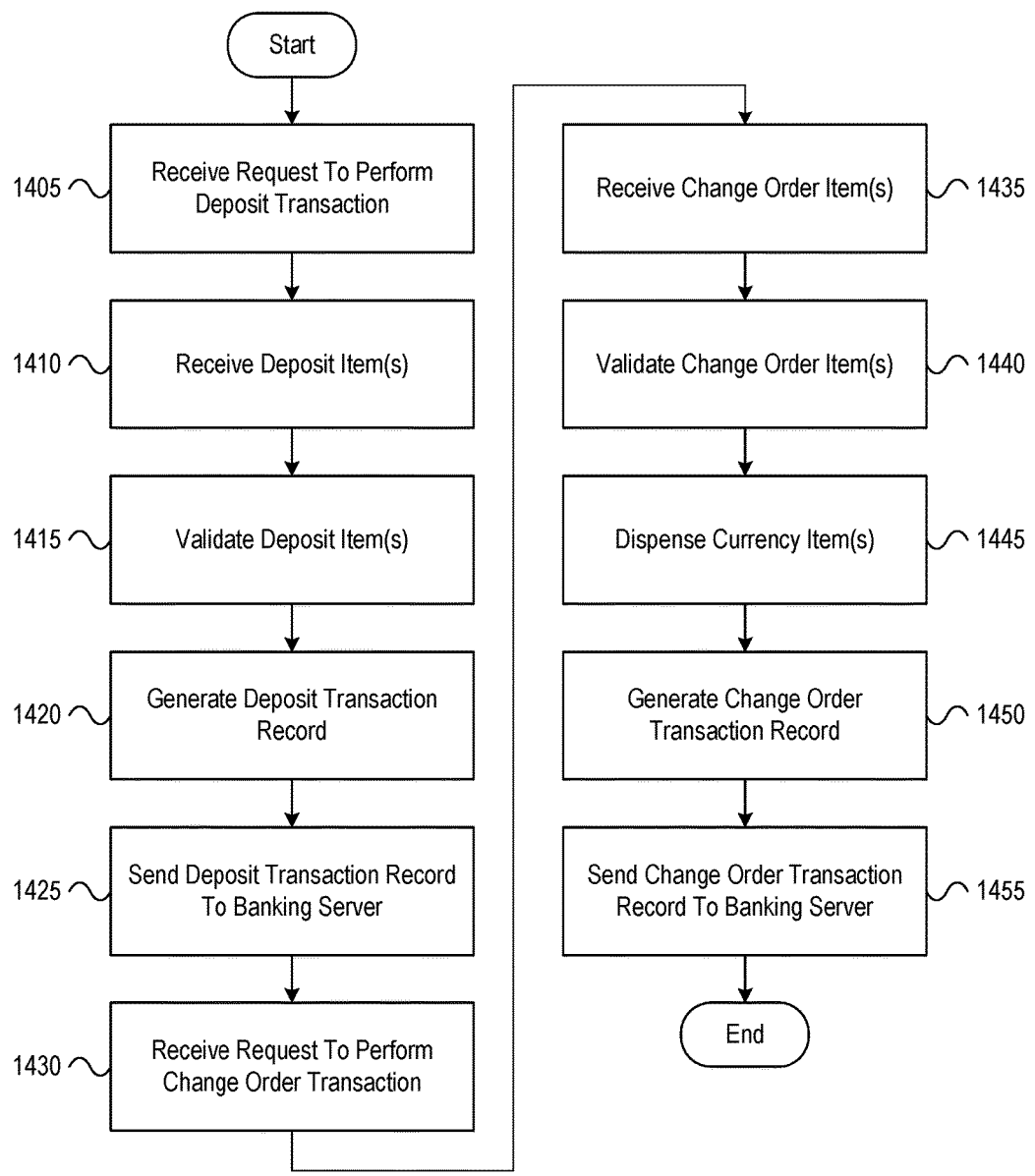
FIG. 14 depicts an illustrative method for utilizing cash handling devices to provide treasury functions and implementing a computing platform to control a plurality of cash handling devices in accordance with one or more example embodiments.

FIG. 14 depicts an illustrative method for utilizing cash handling devices to provide treasury functions and implementing a computing platform to control a plurality of cash handling devices in accordance with one or more example embodiments. Referring to FIG. 14, at step 1405, a cash handling device having at least one processor, a communication interface, an item accepting device, an item dispensing device, and a memory may receive, from a first user of the cash handling device, a request to perform a deposit transaction at a deployment location of the cash handling device. At step 1410, based on receiving the request to perform the deposit transaction at the deployment location of the cash handling device, the cash handling device may receive, via the item accepting device, at least one deposit item for deposit at the deployment location of the cash handling device. At step 1415, the cash handling device may validate the at least one deposit item received for deposit at the deployment location of the cash handling device. At step 1420, based on validating the at least one deposit item received for deposit at the deployment location of the cash handling device, the cash handling device may generate a deposit transaction record associated with the request to perform the deposit transaction, the deposit transaction record comprising deposit information directing at least one banking server to apply a provisional credit to at least one treasury account associated with the first user of the cash handling device. At step 1425, the cash handling device may send, via the communication interface, and to the at least one banking server, the deposit transaction record.

At step 1430, the cash handling device may receive, from a second user of the cash handling device, a request to perform a change order transaction at the deployment location of the cash handling device. At step 1435, based on receiving the request to perform the change order transaction at the deployment location of the cash handling device, the cash handling device may receive, via the item accepting device, at least one change order item for exchange at the deployment location of the cash handling device. At step 1440, the cash handling device may validate the at least one change order item received for exchange at the deployment location of the cash handling device. At step 1445, based on validating the at least one change order item received for exchange at the deployment location of the cash handling device, the cash handling device may dispense, via the item dispensing device, one or more currency items to complete the change order transaction. At step 1450, the cash handling device may generate a change order transaction record associated with the request to perform the change order transaction, the change order transaction record comprising change order information directing the at least one banking server to update one or more transaction history records associated with the second user of the cash handling device. At step 1455, the cash handling device may send, via the communication interface, and to the at least one banking server, the change order transaction record.

Figure 15:
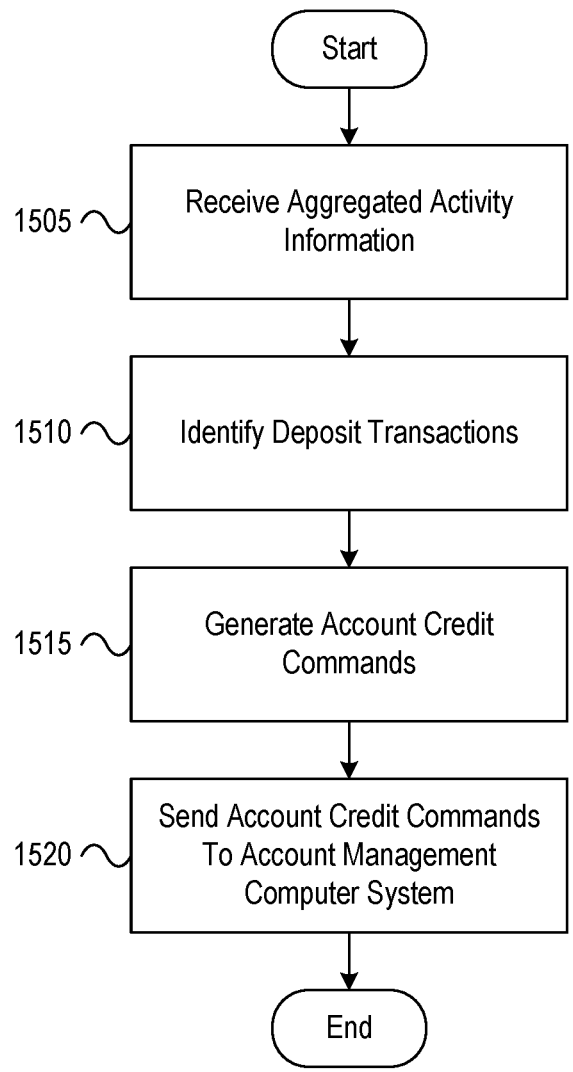
FIG. 15 depicts another illustrative method for utilizing cash handling devices to provide treasury functions and implementing a computing platform to control a plurality of cash handling devices in accordance with one or more example embodiments.

FIG. 15 depicts another illustrative method for utilizing cash handling devices to provide treasury functions and implementing a computing platform to control a plurality of cash handling devices in accordance with one or more example embodiments. Referring to FIG. 15, at step 1505, a computing platform having at least one processor, a memory, and a communication interface may receive, via the communication interface, and from one or more cash handling devices, aggregated activity information comprising a plurality of transaction records. At step 1510, the computing platform may identify one or more deposit transactions based on the aggregated activity information comprising the plurality of transaction records received from the one or more cash handling devices. At step 1515, based on identifying the one or more deposit transactions based on the aggregated activity information comprising the plurality of transaction records received from the one or more cash handling devices, the computing platform may generate one or more account credit commands, the one or more account credit commands directing at least one account management computer system to apply one or more provisional credits to one or more treasury accounts associated with the one or more deposit transactions. At step 1520, the computing platform may send, via the communication interface, to the at least one account management computer system, the one or more account credit commands directing the at least one account management computer system to apply the one or more provisional credits to the one or more treasury accounts associated with the one or more deposit transactions.

Figure 16:
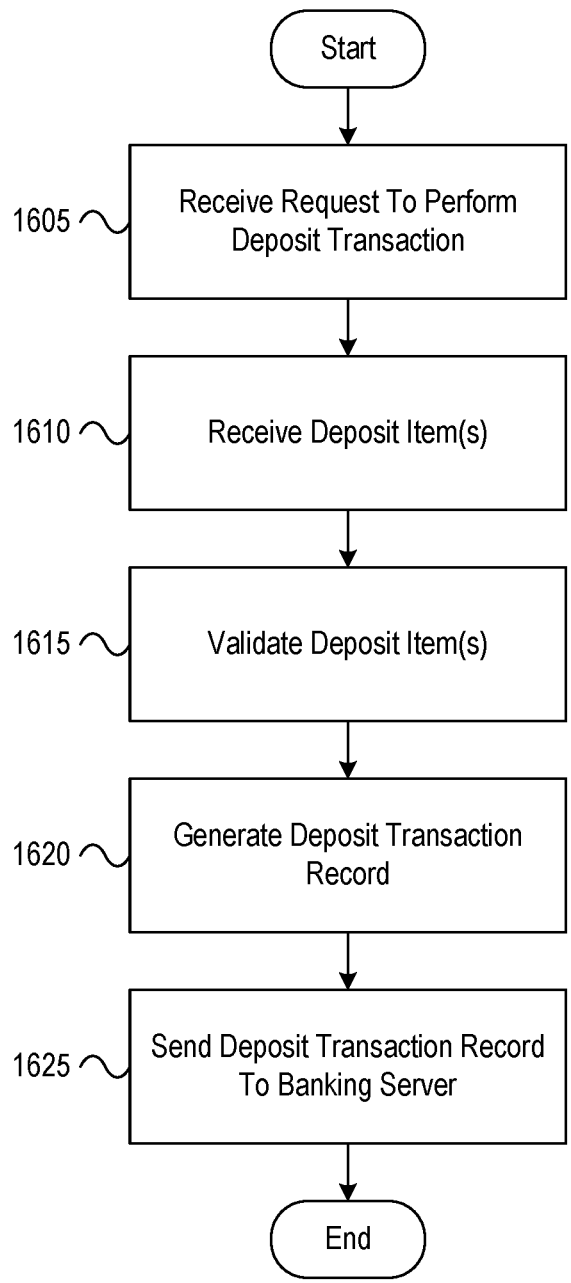
FIG. 16 depicts another illustrative method for utilizing cash handling devices to provide treasury functions and implementing a computing platform to control a plurality of cash handling devices in accordance with one or more example embodiments.

FIG. 16 depicts another illustrative method for utilizing cash handling devices to provide treasury functions and implementing a computing platform to control a plurality of cash handling devices in accordance with one or more example embodiments. Referring to FIG. 16, at step 1605, a cash handling device having at least one processor, a communication interface, an item accepting device, an item dispensing device, an internal currency scanning system, an internal currency transport system, one or more currency storage cartridges, and a memory may receive, from a first user of the cash handling device, a request to perform a deposit transaction at a deployment location of the cash handling device. At step 1610, based on receiving the request to perform the deposit transaction at the deployment location of the cash handling device, the cash handling device may receive, via the item accepting device, at least one deposit item for deposit at the deployment location of the cash handling device. At step 1615, the cash handling device may validate the at least one deposit item received for deposit at the deployment location of the cash handling device. At step 1620, based on validating the at least one deposit item received for deposit at the deployment location of the cash handling device, the cash handling device may generate a deposit transaction record associated with the request to perform the deposit transaction, the deposit transaction record comprising deposit information directing at least one banking server to apply a provisional credit to at least one treasury account associated with the first user of the cash handling device. At step 1625, the cash handling device may send, via the communication interface, and to the at least one banking server, the deposit transaction record.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A cash handling device, comprising:
    at least one processor;
    a communication interface communicatively coupled to the at least one processor;
    an item accepting device communicatively coupled to the at least one processor;
    an item dispensing device communicatively coupled to the at least one processor; and
    memory storing computer-readable instructions that, when executed by the at least one processor, cause the cash handling device to:
        receive, via the communication interface, and from at least one banking server, configuration information defining one or more configuration settings for the cash handling device:
        store the configuration information defining the one or more configuration settings for the cash handling device received from the at least one banking server, wherein the configuration information defining the one or more configuration settings for the cash handling device received from the at least one banking server defines one or more alert thresholds;
        receive, from a first user of the cash handling device, a request to perform a deposit transaction at a deployment location of the cash handling device;
        based on receiving the request to perform the deposit transaction at the deployment location of the cash handling device, receive, via the item accepting device, at least one deposit item for deposit at the deployment location of the cash handling device;
        validate the at least one deposit item received for deposit at the deployment location of the cash handling device;
        based on validating the at least one deposit item received for deposit at the deployment location of the cash handling device, generate a deposit transaction record associated with the request to perform the deposit transaction, the deposit transaction record comprising deposit information directing the at least one banking server to apply a provisional credit to at least one treasury account associated with the first user of the cash handling device;
        send, via the communication interface, and to the at least one banking server, the deposit transaction record;
        receive, from a second user of the cash handling device, a request to perform a change order transaction at the deployment location of the cash handling device;
        based on receiving the request to perform the change order transaction at the deployment location of the cash handling device, receive, via the item accepting device, at least one change order item for exchange at the deployment location of the cash handling device;
        validate the at least one change order item received for exchange at the deployment location of the cash handling device;
        based on validating the at least one change order item received for exchange at the deployment location of the cash handling device, dispense, via the item dispensing device, one or more currency items to complete the change order transaction;
        generate a change order transaction record associated with the request to perform the change order transaction, the change order transaction record comprising change order information directing the at least one banking server to update one or more transaction history records associated with the second user of the cash handling device; and
        send, via the communication interface, and to the at least one banking server, the change order transaction record,
        wherein the one or more alert thresholds defined by the configuration information received from the at least one banking server comprise a first alert threshold for identifying when restocking is required at the cash handling device, a second alert threshold for identifying when inspecting is needed at the cash handling device, and a third alert threshold for indicating when an expected deposit transaction has been missed at the cash handling device, and
        wherein validating the at least one deposit item received for deposit at the deployment location of the cash handling device comprises generating at least one deposit alert based on the one or more alert thresholds defined by the configuration information received from the at least one banking server.

2. The cash handling device of claim 1, wherein the deployment location of the cash handling device is a retail banking center operated by a financial institution.

3. The cash handling device of claim 1, wherein the deployment location of the cash handling device is a shopping mall in which a plurality of retailers operate retail stores.

4. The cash handling device of claim 1, wherein the at least one deposit item received for deposit comprises one or more currency notes.

5. The cash handling device of claim 1, wherein the at least one deposit item received for deposit comprises one or more currency coins.

6. The cash handling device of claim 1, wherein the at least one deposit item received for deposit comprises one or more checks.

7. The cash handling device of claim 1, wherein the deposit information directs the at least one banking server to credit the at least one treasury account associated with the first user of the cash handling device with an amount of funds associated with the at least one deposit item received for deposit at the deployment location of the cash handling device and validated by the cash handling device.

8. The cash handling device of claim 1, wherein the at least one change order item received for exchange comprises one or more currency notes.

9. The cash handling device of claim 1, wherein the at least one change order item received for exchange comprises one or more currency coins.

10. The cash handling device of claim 1, wherein the memory stores additional computer-readable instructions that, when executed by the at least one processor, cause the cash handling device to:
receive, from a third user of the cash handling device, input defining one or more additional configuration settings for the cash handling device; and
store additional configuration information based on receiving the input defining the one or more additional configuration settings for the cash handling device from the third user of the cash handling device.

11. The cash handling device of claim 1,
wherein the configuration information defining the one or more configuration settings for the cash handling device received from the at least one banking server defines one or more usage limits,
wherein validating the at least one deposit item received for deposit at the deployment location of the cash handling device comprises enforcing the one or more usage limits defined by the configuration information received from the at least one banking server, and
wherein validating the at least one change order item received for exchange at the deployment location of the cash handling device comprises enforcing the one or more usage limits defined by the configuration information received from the at least one banking server.

12. The cash handling device of claim 1,
wherein validating the at least one change order item received for exchange at the deployment location of the cash handling device comprises generating at least one exchange alert based on the one or more alert thresholds defined by the configuration information received from the at least one banking server.

13. The cash handling device of claim 1, wherein the memory stores additional computer-readable instructions that, when executed by the at least one processor, cause the cash handling device to:
receive, via the communication interface, and from the at least one banking server, user profile information defining one or more user settings for the cash handling device; and
store the user profile information defining the one or more user settings for the cash handling device received from the at least one banking server.

14. The cash handling device of claim 13, wherein the memory stores additional computer-readable instructions that, when executed by the at least one processor, cause the cash handling device to:
prior to receiving the request to perform the deposit transaction at the deployment location of the cash handling device, authenticate the first user of the cash handling device based on the user profile information defining the one or more user settings for the cash handling device received from the at least one banking server; and
prior to receiving the request to perform the change order transaction at the deployment location of the cash handling device, authenticate the second user of the cash handling device based on the user profile information defining the one or more user settings for the cash handling device received from the at least one banking server.

15. The cash handling device of claim 1, wherein the memory stores additional computer-readable instructions that, when executed by the at least one processor, cause the cash handling device to:
based on validating the at least one deposit item received for deposit at the deployment location of the cash handling device, provide a deposit receipt associated with the request to perform the deposit transaction; and
based on validating the at least one change order item received for exchange at the deployment location of the cash handling device, provide an exchange receipt associated with the request to perform the change order transaction.

16. A method, comprising:
at a cash handling device comprising at least one processor, a communication interface, an item accepting device, an item dispensing device, and a memory:
receiving, by the cash handling device, via the communication interface, and from at least one banking server, configuration information defining one or more configuration settings for the cash handling device;
storing, by the cash handling device, the configuration information defining the one or more configuration settings for the cash handling device received from the at least one banking server, wherein the configuration information defining the one or more configuration settings for the cash handling device received from the at least one banking server defines one or more alert thresholds;
receiving, by the cash handling device, from a first user of the cash handling device, a request to perform a deposit transaction at a deployment location of the cash handling device;
based on receiving the request to perform the deposit transaction at the deployment location of the cash handling device, receiving, by the cash handling device, via the item accepting device, at least one deposit item for deposit at the deployment location of the cash handling device;
validating, by the cash handling device, the at least one deposit item received for deposit at the deployment location of the cash handling device;
based on validating the at least one deposit item received for deposit at the deployment location of the cash handling device, generating, by the cash handling device, a deposit transaction record associated with the request to perform the deposit transaction, the deposit transaction record comprising deposit information directing the at least one banking server to apply a provisional credit to at least one treasury account associated with the first user of the cash handling device;
sending, by the cash handling device, via the communication interface, and to the at least one banking server, the deposit transaction record;
receiving, by the cash handling device, from a second user of the cash handling device, a request to perform a change order transaction at the deployment location of the cash handling device;
based on receiving the request to perform the change order transaction at the deployment location of the cash handling device, receiving, by the cash handling device, via the item accepting device, at least one change order item for exchange at the deployment location of the cash handling device;

validating, by the cash handling device, the at least one change order item received for exchange at the deployment location of the cash handling device;

based on validating the at least one change order item received for exchange at the deployment location of the cash handling device, dispensing, by the cash handling device, via the item dispensing device, one or more currency items to complete the change order transaction;

generating, by the cash handling device, a change order transaction record associated with the request to perform the change order transaction, the change order transaction record comprising change order information directing the at least one banking server to update one or more transaction history records associated with the second user of the cash handling device; and sending, by the cash handling device, via the communication interface, and to the at least one banking server, the change order transaction record, wherein the one or more alert thresholds defined by the configuration information received from the at least one banking server comprise a first alert threshold for identifying when restocking is required at the cash handling device, a second alert threshold for identifying when inspecting is needed at the cash handling device, and a third alert threshold for indicating when an expected deposit transaction has been missed at the cash handling device, and wherein validating the at least one deposit item received for deposit at the deployment location of the cash handling device comprises generating at least one deposit alert based on the one or more alert thresholds defined by the configuration information received from the at least one banking server.

17. The method of claim 16, wherein the deployment location of the cash handling device is a retail banking center operated by a financial institution.

18. One or more non-transitory computer-readable media storing instructions that, when executed by a cash handling device comprising at least one processor, a communication interface, an item accepting device, an item dispensing device, and a memory, cause the cash handling device to:

receive, via the communication interface, and from at least one banking server, configuration information defining one or more configuration settings for the cash handling device;

store the configuration information defining the one or more configuration settings for the cash handling device received from the at least one banking server, wherein the configuration information defining the one or more configuration settings for the cash handling device received from the at least one banking server defines one or more alert thresholds;

receive, from a first user of the cash handling device, a request to perform a deposit transaction at a deployment location of the cash handling device;

based on receiving the request to perform the deposit transaction at the deployment location of the cash handling device, receive, via the item accepting device, at least one deposit item for deposit at the deployment location of the cash handling device;

validate the at least one deposit item received for deposit at the deployment location of the cash handling device;

based on validating the at least one deposit item received for deposit at the deployment location of the cash handling device, generate a deposit transaction record associated with the request to perform the deposit transaction, the deposit transaction record comprising deposit information directing the at least one banking server to apply a provisional credit to at least one treasury account associated with the first user of the cash handling device;

send, via the communication interface, and to the at least one banking server, the deposit transaction record;

receive, from a second user of the cash handling device, a request to perform a change order transaction at the deployment location of the cash handling device;

based on receiving the request to perform the change order transaction at the deployment location of the cash handling device, receive, via the item accepting device, at least one change order item for exchange at the deployment location of the cash handling device;

validate the at least one change order item received for exchange at the deployment location of the cash handling device;

based on validating the at least one change order item received for exchange at the deployment location of the cash handling device, dispense, via the item dispensing device, one or more currency items to complete the change order transaction;

generate a change order transaction record associated with the request to perform the change order transaction, the change order transaction record comprising change order information directing the at least one banking server to update one or more transaction history records associated with the second user of the cash handling device; and send, via the communication interface, and to the at least one banking server, the change order transaction record, wherein the one or more alert thresholds defined by the configuration information received from the at least one banking server comprise a first alert threshold for identifying when restocking is required at the cash handling device, a second alert threshold for identifying when inspecting is needed at the cash handling device, and a third alert threshold for indicating when an expected deposit transaction has been missed at the cash handling device, and wherein validating the at least one deposit item received for deposit at the deployment location of the cash handling device comprises generating at least one deposit alert based on the one or more alert thresholds defined by the configuration information received from the at least one banking server.

* * * * *